US012615178B2

(12) United States Patent     (10) Patent No.:   US 12,615,178 B2

Howard            (45) Date of Patent:     Apr. 28, 2026

(54) TELECOMMUNICATION SYSTEM FAILURES PREDICTION THROUGH MACHINE LEARNING AND ARTIFICIAL INTELLIGENCE

(71) Applicant: Genesis Intelligence, LLC, Jacksonville, FL (US)

(72) Inventor: Newton Howard, Potomac, MD (US)

(73) Assignee: Genesis Intelligence, LLC, Jacksonville, FL (US)

( * ) Notice: Subject to any disclaimer, the term of this patent is extended or adjusted under 35 U.S.C. 154(b) by 22 days.

(21) Appl. No.: 18/795,138

(22) Filed: Aug. 5, 2024

(65) Prior Publication Data

US 2025/0184212 A1     Jun. 5, 2025

Related U.S. Application Data

(63) Continuation-in-part of application No. 17/708,066, filed on Oct. 22, 2020, now abandoned, which is a continuation-in-part of application No. 16/545,205, filed on Aug. 20, 2019.

(60) Provisional application No. 63/530,929, filed on Aug. 4, 2023, provisional application No. 62/924,982, filed on Oct. 23, 2019, provisional application No. 62/726,699, filed on Sep. 4, 2018, provisional application No. 62/783,050, filed on Dec. 20, 2018, (Continued)

(51) Int. Cl.
    *H04L 41/0654*      (2022.01)
    *H04L 41/16*       (2022.01)

(52) U.S. Cl.
    CPC .......... *H04L 41/0654* (2013.01); *H04L 41/16* (2013.01)

(58) Field of Classification Search
    CPC ....... H04L 41/0654; H04L 41/16; G06N 5/01; G06N 20/20; G06N 3/08; G06N 3/126; G06N 7/01; G06N 20/10; G06N 3/006; A61P 25/28
    See application file for complete search history.

(56) References Cited

U.S. PATENT DOCUMENTS

| | | | |
|---|---|---|---|
| 11,201,875 B2 * | 12/2021 | Morgan | ............. H04L 63/1416 |
| 2005/0092939 A1 * | 5/2005 | Coss | .................... H01J 37/304 |
| | | | 700/121 |

(Continued)

*Primary Examiner* — Oanh Duong
(74) *Attorney, Agent, or Firm* — Neo IP

(57) ABSTRACT

In an embodiment, a method may be implemented in a computer system comprising a processor, memory accessible by the processor, and computer program instructions stored in the memory and executable by the processor, the computer system interconnected with a telecommunications system, the method comprising: receiving, at the computer system, data relating to operation of the telecommunication system, obtaining, at the computer system, at least one machine learning model trained to detect and predict faults in the operation of the telecommunication system, selecting, at the computer system, computing infrastructure upon which to execute the at least one machine learning model, wherein the selected computing infrastructure comprises a mesh of interconnected micro-applications, executing, at the computer system, the at least one machine learning model using the selected computing infrastructure to detect and predict faults in the operation of the telecommunication system, and automatically correcting at least some of the detected faults.

18 Claims, 35 Drawing Sheets

Related U.S. Application Data provisional application No. 62/719,849, filed on Aug. 20, 2018.

(56)                    References Cited

U.S. PATENT DOCUMENTS

| | | | | |
|---|---|---|---|---|
| 2005/0256601 | A1* | 11/2005 | Lee ..................... | G05B 19/4184 |
| | | | | 702/182 |
| 2008/0125898 | A1* | 5/2008 | Harvey .............. | G05B 23/0281 |
| | | | | 700/110 |
| 2017/0236060 | A1* | 8/2017 | Ignatyev .................. | G06N 5/01 |
| | | | | 706/46 |
| 2017/0352284 | A1* | 12/2017 | Pao .......................... | G09B 5/08 |
| 2018/0025268 | A1* | 1/2018 | Teig ....................... | G06N 3/063 |
| | | | | 706/25 |
| 2018/0095009 | A1* | 4/2018 | Anenson ............. | G01M 17/027 |
| 2018/0232663 | A1* | 8/2018 | Ross ...................... | G06N 20/00 |
| 2019/0318202 | A1* | 10/2019 | Zhao ..................... | G06F 18/214 |

* cited by examiner

1) Status $(s) :=$ "labeled", $g(s) := t_0$, status $(v) :=$ "unlabeled" for all $v \neq s$ 2) Let $v$ be a "labeled" node with time window $[a_v, b_v]$, $a_v \leq t \leq b_v$, and $t \in T$ is the service and leaving time at node $v$, the smallest $g(v) + h(v, g(v))$. In the case that there are multiple candidates, choose one with the smallest $g(v)$. IF $v = d$ GOTO 11)

Figure 5:
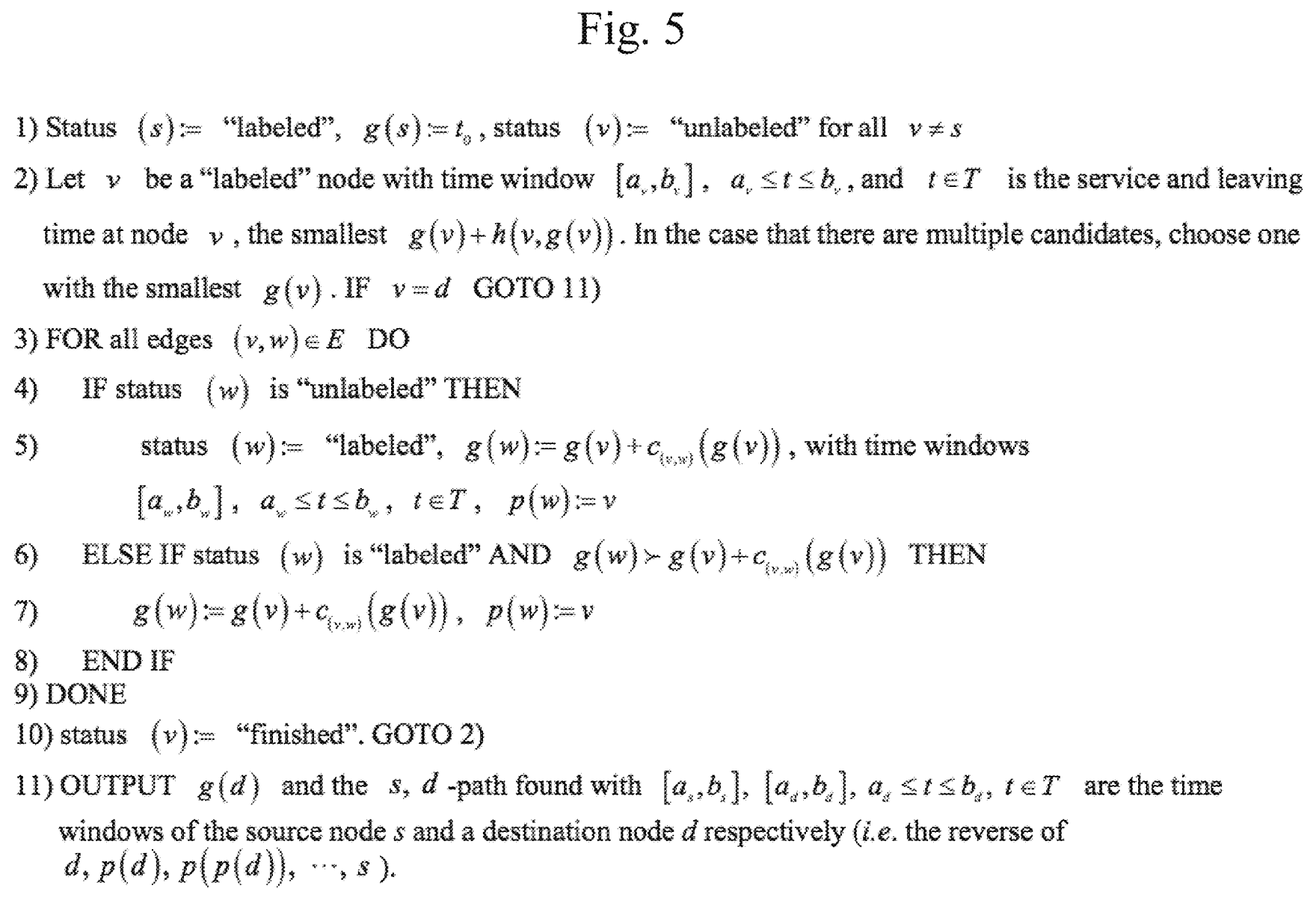

3) FOR all edges $(v, w) \in E$ DO

4)    IF status $(w)$ is "unlabeled" THEN 5)      status $(w) :=$ "labeled", $g(w) := g(v) + c_{(v,w)}(g(v))$, with time windows $[a_w, b_w]$, $a_w \leq t \leq b_w$, $t \in T$, $p(w) := v$ 6)    ELSE IF status $(w)$ is "labeled" AND $g(w) \succ g(v) + c_{(v,w)}(g(v))$ THEN 7)      $g(w) := g(v) + c_{(v,w)}(g(v))$, $p(w) := v$

8)    END IF

9) DONE 10) status $(v) :=$ "finished". GOTO 2)

11) OUTPUT $g(d)$ and the $s$, $d$ -path found with $[a_s, b_s]$, $[a_d, b_d]$, $a_s \leq t \leq b_s$, $a_d \leq t \leq b_d$, $t \in T$ are the time windows of the source node $s$ and a destination node $d$ respectively (i.e. the reverse of $d$, $p(d)$, $p(p(d))$, $\cdots$, $s$).

Figure 8B:
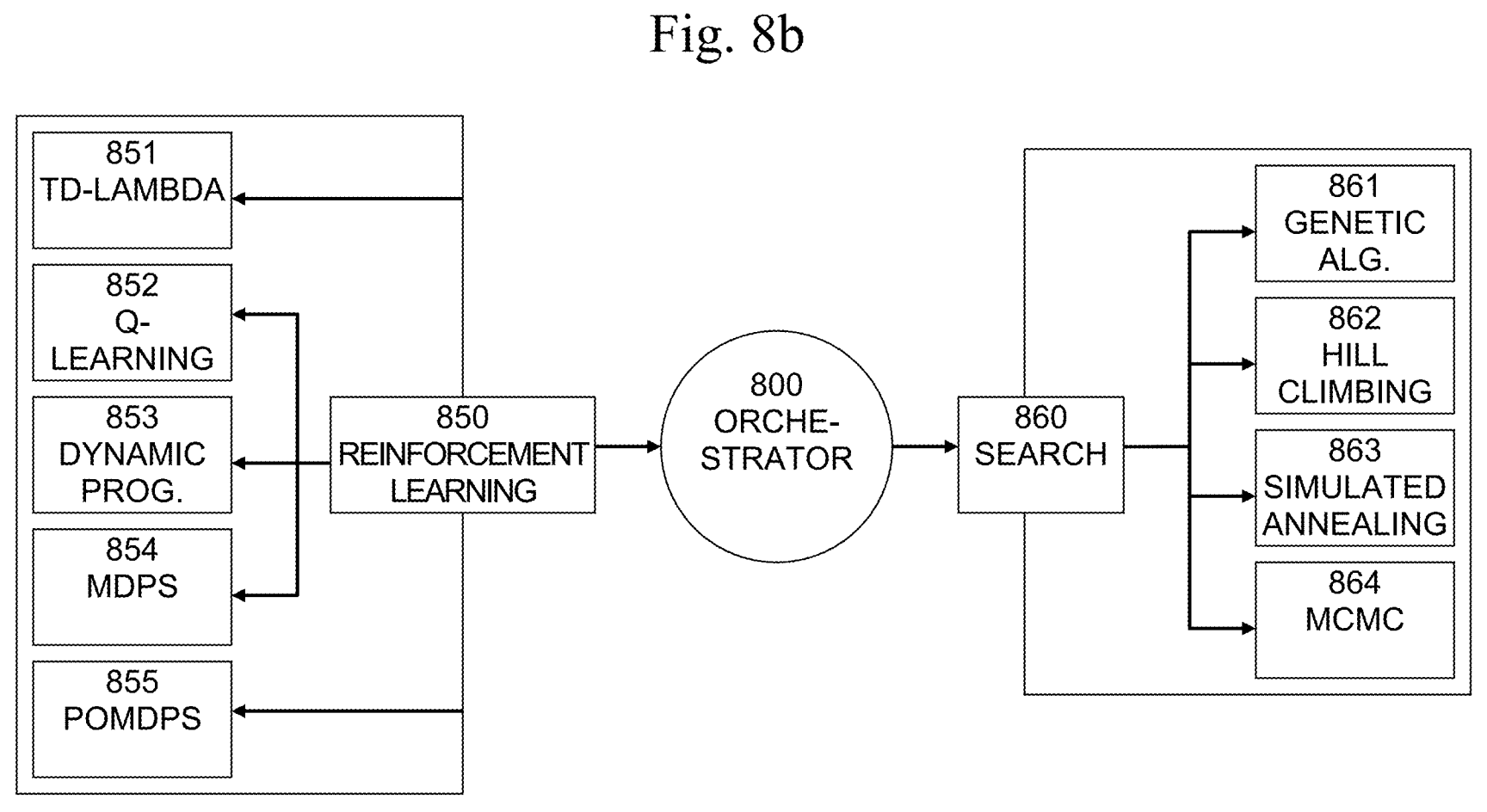

861 GENETIC ALG.

862 HILL CLIMBING

863 SIMULATED ANNEALING

864 MCMC

860 SEARCH

800 ORCHE-STRATOR

850 REINFORCEMENT LEARNING

851 TD-LAMBDA

852 Q-LEARNING

853 DYNAMIC PROG.

854 MDPS

855 POMDPS

1200

```
function GENETIC-ALGORITHM(population, FITNESS-FN) returns an individual
  inputs: population, a set of individuals
          FITNESS-FN, a function that measures the fitness of an individual repeat
    new_population ← empty set
    for i = 1 to SIZE(population) do
      x ← RANDOM-SELECTION(population, FITNESS-FN)
      y ← RANDOM-SELECTION(population, FITNESS-FN)
      child ← REPRODUCE(x, y)
      if (small random probability) then child ← MUTATE(child)
      add child to new_population
    population ← new_population
  until some individual is fit enough, or enough time has elapsed
  return the best individual in population, according to FITNESS-FN function REPRODUCE(x, y) returns an individual
  inputs: x, y, parent individuals n ← LENGTH(x); c ← random number from 1 to n
  return APPEND(SUBSTRING(x, 1, c), SUBSTRING(y, c + 1, n))
```

Fig. 13

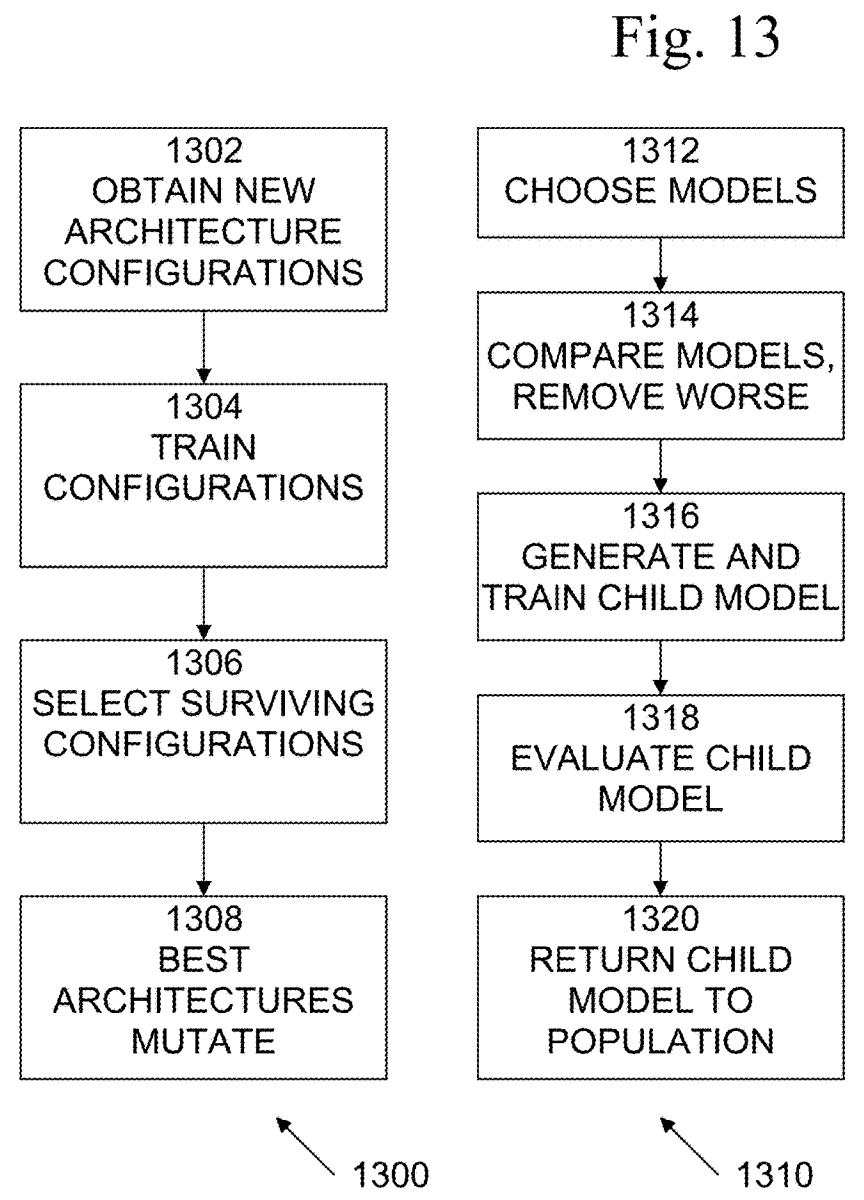

| 1312 CHOOSE MODELS | → | 1314 COMPARE MODELS, REMOVE WORSE | → | 1316 GENERATE AND TRAIN CHILD MODEL | → | 1318 EVALUATE CHILD MODEL | → | 1320 RETURN CHILD MODEL TO POPULATION |

1310

| 1302 OBTAIN NEW ARCHITECTURE CONFIGURATIONS | → | 1304 TRAIN CONFIGURATIONS | → | 1306 SELECT SURVIVING CONFIGURATIONS | → | 1308 BEST ARCHITECTURES MUTATE |

Figure 16:
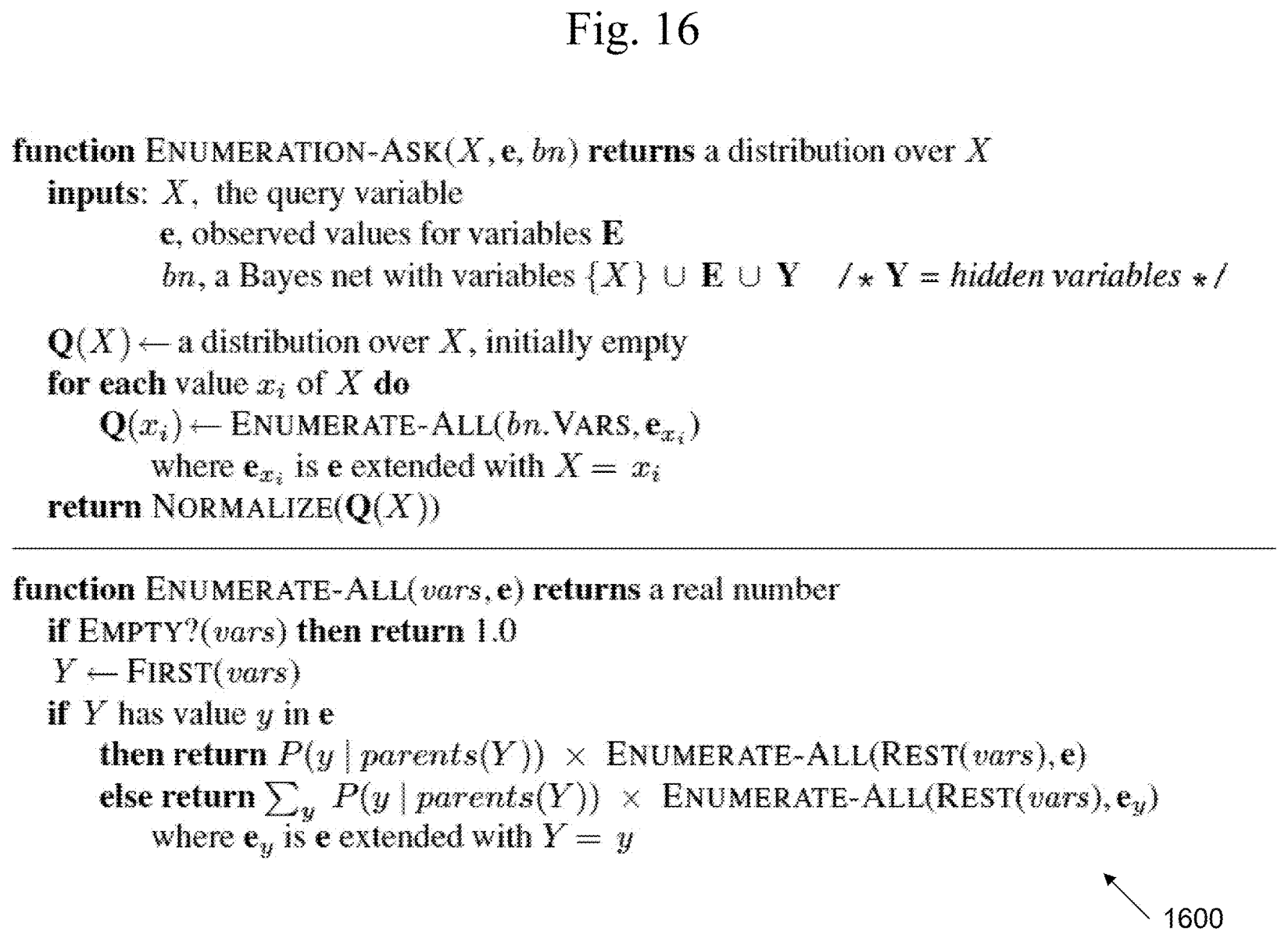

Fig. 16 function ENUMERATION-ASK($X$, e, $bn$) returns a distribution over $X$
  inputs: $X$, the query variable
    e, observed values for variables $E$
    $bn$, a Bayes net with variables $\{X\} \cup E \cup Y$   /* $Y$ = *hidden variables* */

$\mathbf{Q}(X) \leftarrow$ a distribution over $X$, initially empty
for each value $x_i$ of $X$ do
  $\mathbf{Q}(x_i) \leftarrow$ ENUMERATE-ALL($bn$.VARS, $\mathbf{e}_{x_i}$)
    where $\mathbf{e}_{x_i}$ is e extended with $X = x_i$
return NORMALIZE($\mathbf{Q}(X)$)

function ENUMERATE-ALL($vars$, e) returns a real number
if EMPTY?($vars$) then return 1.0
$Y \leftarrow$ FIRST($vars$)
if $Y$ has value $y$ in e
  then return $P(y \mid parents(Y)) \times$ ENUMERATE-ALL(REST($vars$), e)
  else return $\sum_y P(y \mid parents(Y)) \times$ ENUMERATE-ALL(REST($vars$), $\mathbf{e}_y$)
    where $\mathbf{e}_y$ is e extended with $Y = y$

1600

Figure 17:
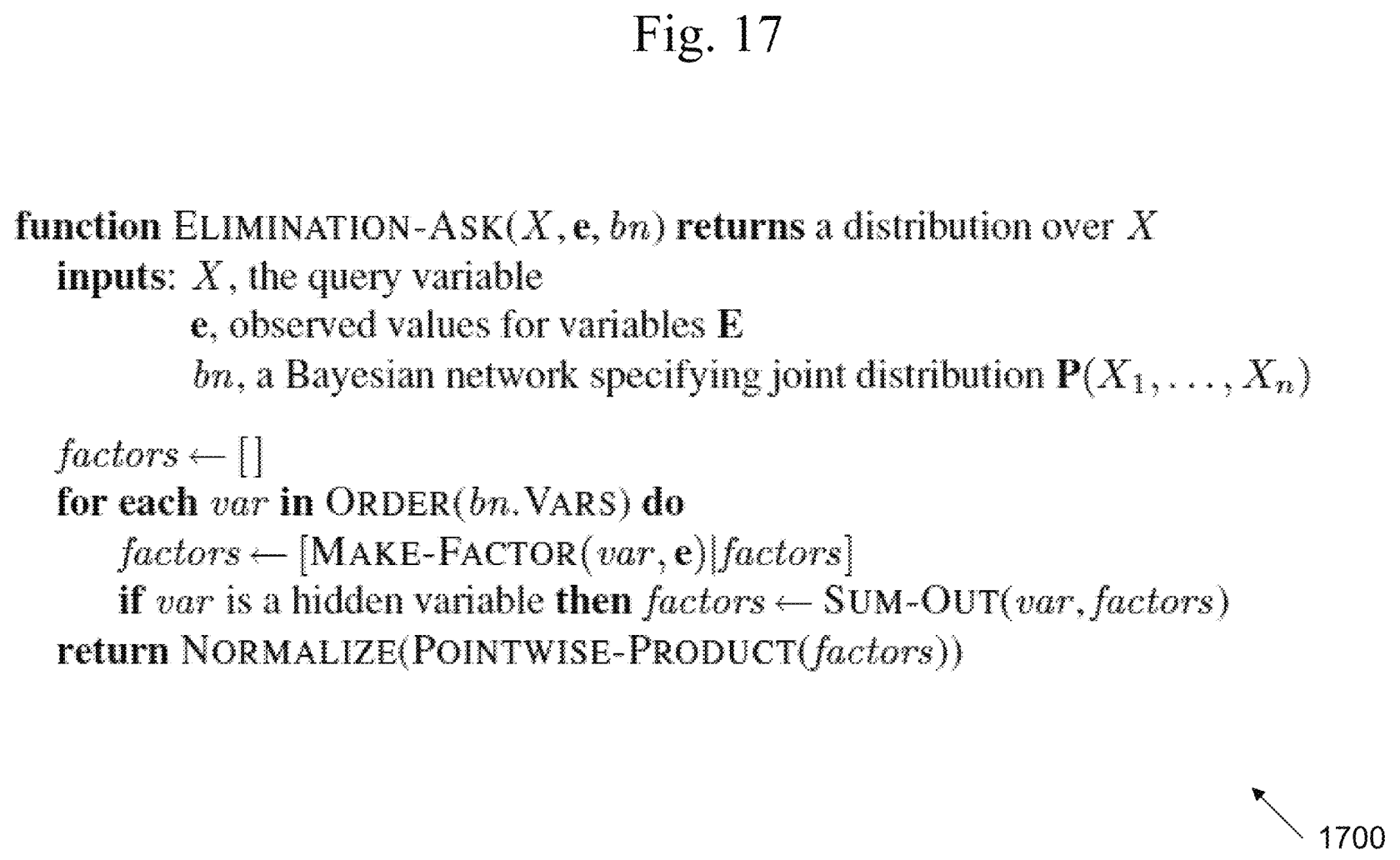

Fig. 17 function ELIMINATION-ASK($X$, $e$, $bn$) returns a distribution over $X$
inputs: $X$, the query variable
    $e$, observed values for variables $E$
    $bn$, a Bayesian network specifying joint distribution $\mathbf{P}(X_1, \ldots, X_n)$ $factors \leftarrow [\,]$
for each $var$ in ORDER($bn$. VARS) do
    $factors \leftarrow [\text{MAKE-FACTOR}(var, e) | factors]$
    if $var$ is a hidden variable then $factors \leftarrow$ SUM-OUT($var, factors$)
return NORMALIZE(POINTWISE-PRODUCT($factors$))

1700

Fig. 18 function LIKELIHOOD-WEIGHTING($X$, $\mathbf{e}$, $bn$, $N$) returns an estimate of $\mathbf{P}(X\,|\,\mathbf{e})$ inputs: $X$, the query variable $\mathbf{e}$, observed values for variables $\mathbf{E}$ $bn$, a Bayesian network specifying joint distribution $\mathbf{P}(X_1, \ldots, X_n)$ $N$, the total number of samples to be generated local variables: $\mathbf{W}$, a vector of weighted counts for each value of $X$, initially zero for $j = 1$ to $N$ do

Figure 18:
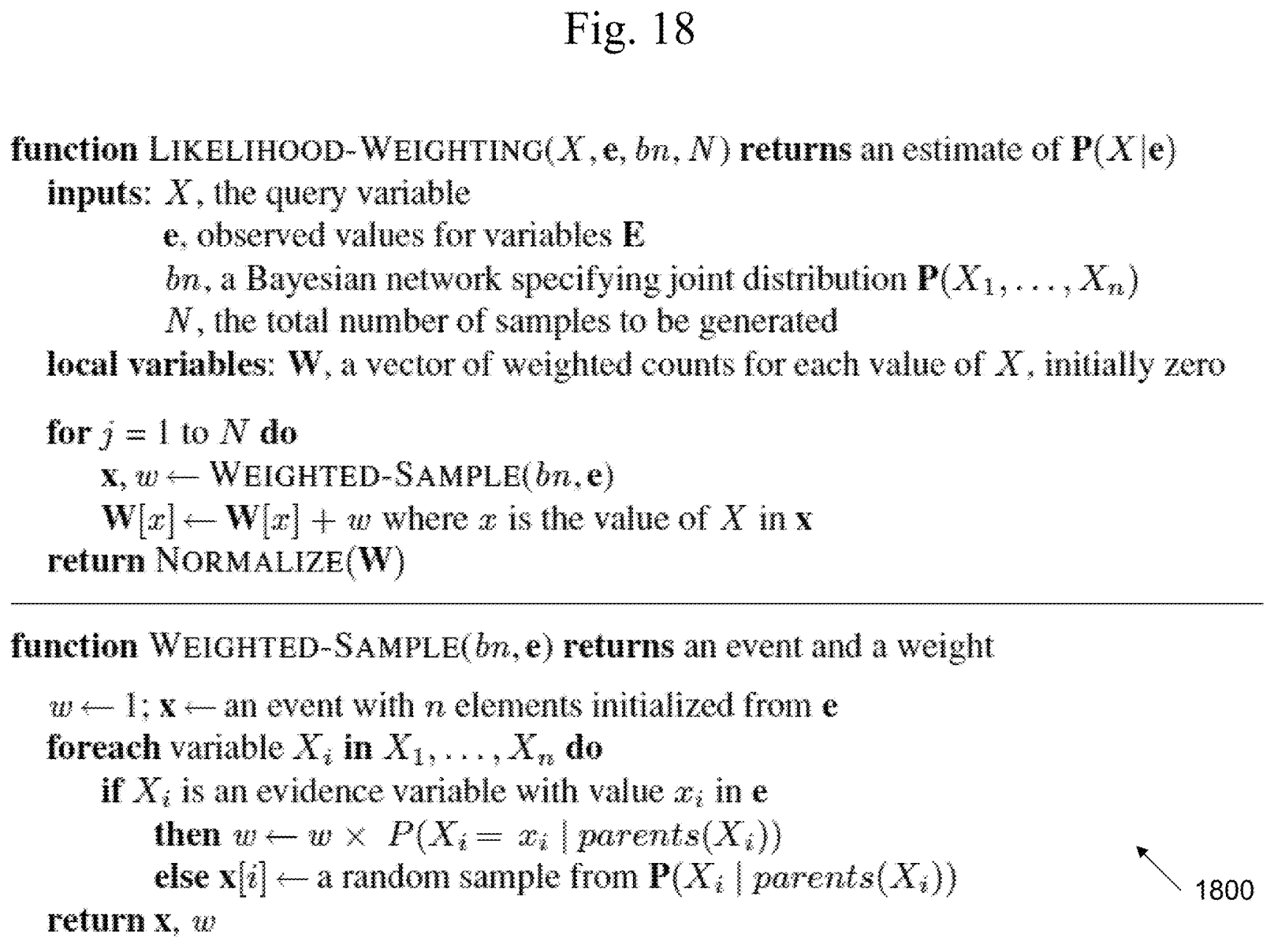

$\mathbf{x}$, $w \leftarrow$ WEIGHTED-SAMPLE($bn$, $\mathbf{e}$)

$\mathbf{W}[x] \leftarrow \mathbf{W}[x] + w$ where $x$ is the value of $X$ in $\mathbf{x}$ return NORMALIZE($\mathbf{W}$)

--- function WEIGHTED-SAMPLE($bn$, $\mathbf{e}$) returns an event and a weight $w \leftarrow 1$; $\mathbf{x} \leftarrow$ an event with $n$ elements initialized from $\mathbf{e}$ foreach variable $X_i$ in $X_1, \ldots, X_n$ do if $X_i$ is an evidence variable with value $x_i$ in $\mathbf{e}$ then $w \leftarrow w \times P(X_i = x_i \,|\, parents(X_i))$ else $\mathbf{x}[i] \leftarrow$ a random sample from $\mathbf{P}(X_i \,|\, parents(X_i))$ return $\mathbf{x}$, $w$

1800

Figure 19:
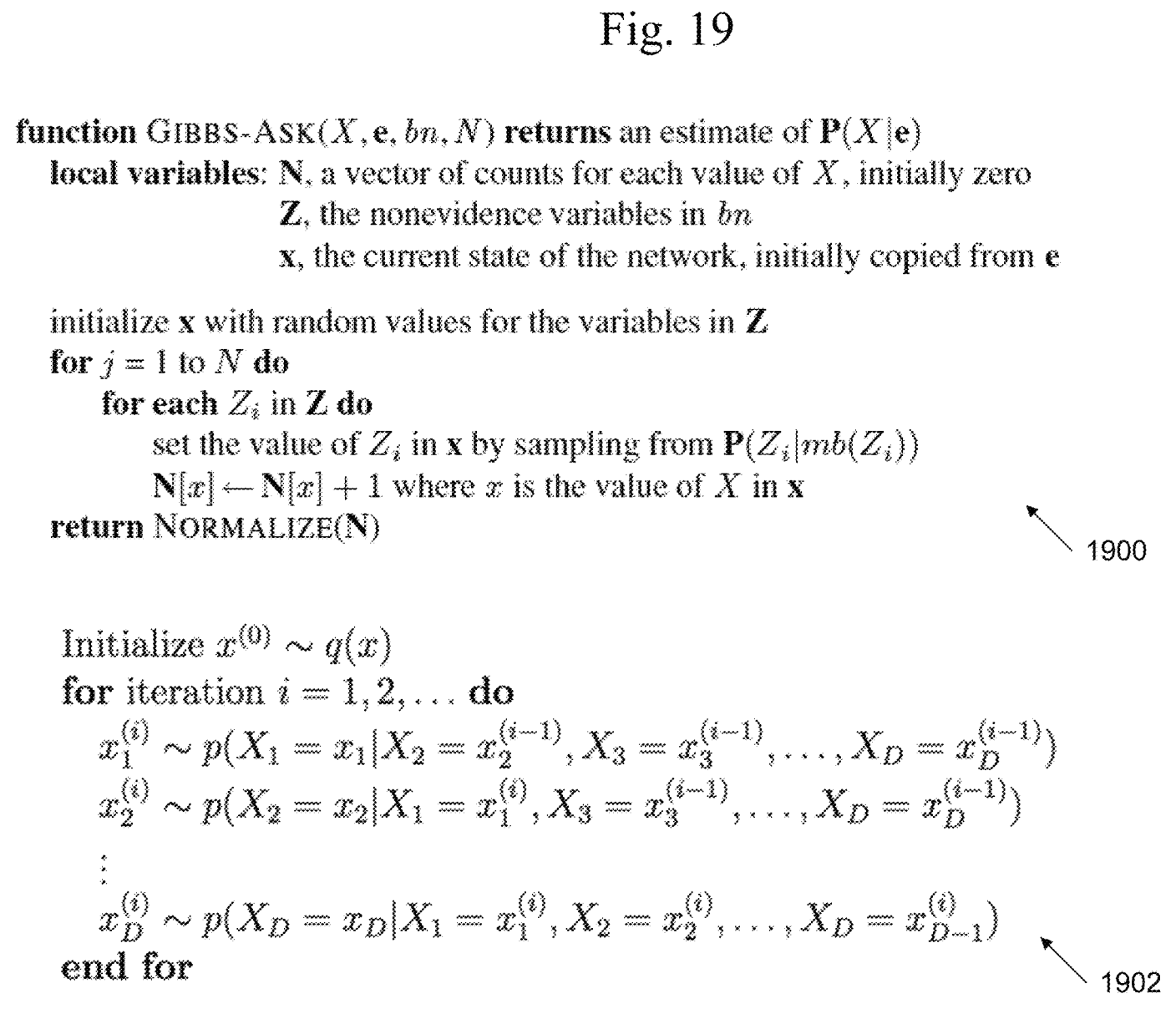

Fig. 19 function GIBBS-ASK($X$, $e$, $bn$, $N$) returns an estimate of $\mathbf{P}(X|e)$
local variables: $\mathbf{N}$, a vector of counts for each value of $X$, initially zero
$\quad\quad$ $\mathbf{Z}$, the nonevidence variables in $bn$
$\quad\quad$ $\mathbf{x}$, the current state of the network, initially copied from $e$ initialize $\mathbf{x}$ with random values for the variables in $\mathbf{Z}$
for $j = 1$ to $N$ do
$\quad$ for each $Z_i$ in $\mathbf{Z}$ do
$\quad\quad$ set the value of $Z_i$ in $\mathbf{x}$ by sampling from $\mathbf{P}(Z_i|mb(Z_i))$
$\quad\quad$ $\mathbf{N}[x] \leftarrow \mathbf{N}[x] + 1$ where $x$ is the value of $X$ in $\mathbf{x}$
return NORMALIZE($\mathbf{N}$)

1900

Initialize $x^{(0)} \sim q(x)$
for iteration $i = 1, 2, \ldots$ do
$\quad$ $x_1^{(i)} \sim p(X_1 = x_1 | X_2 = x_2^{(i-1)}, X_3 = x_3^{(i-1)}, \ldots, X_D = x_D^{(i-1)})$
$\quad$ $x_2^{(i)} \sim p(X_2 = x_2 | X_1 = x_1^{(i)}, X_3 = x_3^{(i-1)}, \ldots, X_D = x_D^{(i-1)})$
$\quad$ $\vdots$
$\quad$ $x_D^{(i)} \sim p(X_D = x_D | X_1 = x_1^{(i)}, X_2 = x_2^{(i)}, \ldots, X_D = x_{D-1}^{(i)})$
end for

BrainOS Infrastructure Operations

EXAMPLE USE CASE

Micro-Applications Interconnected

2604 — Analog in

2602

2606 — Analog out

2600

Mesh of small applications: interfaces are all digital or digital representations of analog except at the edges.

How to implement the layers

Fig. 29

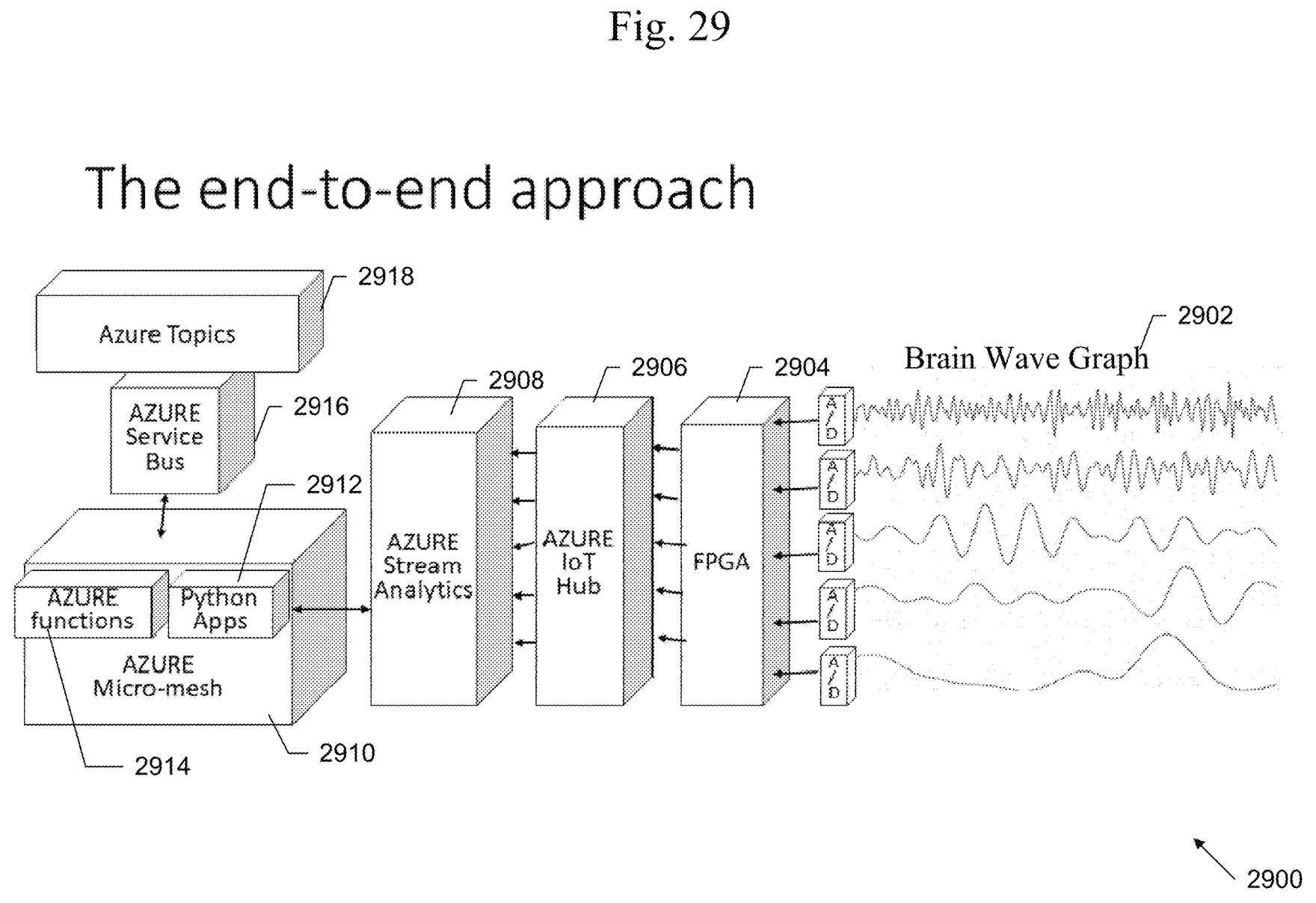

The end-to-end approach

2900

2902 — Brain Wave Graph

2904 — A/D (×5)

2906 — FPGA

2908 — AZURE IoT Hub

AZURE Stream Analytics

2918 — Azure Topics

2916 — AZURE Service Bus

2912 — Python Apps

2910 — AZURE functions

AZURE Micro-mesh

TELECOMMUNICATION SYSTEM FAILURES PREDICTION THROUGH MACHINE LEARNING AND ARTIFICIAL INTELLIGENCE

CROSS-REFERENCE TO RELATED APPLICATIONS

This application claims the benefit of U.S. Provisional Application No. 63/530,929 filed Aug. 4, 2023, and is a continuation-in-part of U.S. application Ser. No. 17/078, 066, filed Oct. 22, 2020, which claims the benefit of U.S. Provisional Application No. 62/924,982, filed Oct. 23, 2019, and is a continuation-in-part of U.S. application Ser. No. 16/545,205, filed Aug. 20, 2019, which claims the benefit of U.S. Provisional Application No. 62/719,849, filed Aug. 20, 2018, which claims the benefit of U.S. Provisional Application No. 62/726,699, filed Sep. 4, 2018, and which claims the benefit of U.S. Provisional Application No. 62/783,050, filed Dec. 20, 2018, the contents of all of which are incorporated herein in their entirety.

BACKGROUND

The present invention relates to machine learning techniques for automatically generating or obtaining models for generating results relating to dynamic error detection and fault prediction.

Simulating human intelligence with artificial intelligence (AI) techniques can significantly improve existing computing-driven reasoning approaches and pave the way to the development of more autonomous and self-adaptable cognitive models. As the human brain exposes multiple cognitive functions, based on the ensemble of stimuli to which the human body is exposed, an artificial form of intelligence may be created and informed by data channels associated with a given scenario, with the end goal of delivering an autonomous problem-adaptive solutions system.

The three challenges that machine learning still faces are 1) it requires a lot of training data and is domain-dependent, 2) it can produce inconsistent results for different types of training or parameter tweaking, and 3) it produces results that may be difficult to interpret when such black-box algorithms are used.

Accordingly, a need arises for machine learning techniques that may address such shortcomings and provide improved performance and results relating to dynamic error detection and fault prediction in a telecommunications network, such as a Radio Access Network (RAN).

SUMMARY

Embodiments of the present systems and methods may provide machine learning techniques that may address such shortcomings and provide improved performance and results. For example, embodiments may address issues in the context of, for example, natural language processing (NLP), in a multidisciplinary approach that aims to bridge the gap between statistical NLP and the many other disciplines necessary for understanding human language such as linguistics, commonsense reasoning, and affective computing. Embodiments may leverage both symbolic and subsymbolic methods as that use models such as semantic networks and conceptual dependency representations to encode meaning, as well as use deep neural networks and multiple kernel learning to infer syntactic patterns from data.

Embodiments may provide an intelligent adaptive system that combines input data types, processing history and objectives, research knowledge and situational context to determine what is the most appropriate mathematical model, choose the most appropriate computing infrastructure on which to perform learning, and propose the best solution for a given problem. Embodiments may have the capability to capture data on different input channels, perform data enhancement, use existing AI models, create others de novo and also finetune, validate, and combine them to create more powerful collections of models. Embodiments may use concepts from the critic-selector model of mind and from the brain pathology treatment approaches.

Embodiments may be used for different types of applications. For example, embodiments may be used for human-machine interaction problems due to their anthropomorphic and data-adaptive capabilities. Anthropomorphism refers to the capability of the system to react differently depending on the profile and preferences of the human with whom the machine interacts, and it is data-adaptive in the sense that it chooses the best fitting mathematical approach to the input data it receives from the human.

For example, in an embodiment, a method may be implemented in a computer system comprising a processor, memory accessible by the processor, and computer program instructions stored in the memory and executable by the processor, the computer system interconnected with a telecommunications system, the method comprising: receiving, at the computer system, data relating to operation of the telecommunication system, obtaining, at the computer system, at least one machine learning model trained to detect and predict faults in the operation of the telecommunication system, selecting, at the computer system, computing infrastructure upon which to execute the at least one machine learning model, wherein the selected computing infrastructure comprises a mesh of interconnected micro-applications, executing, at the computer system, the at least one machine learning model using the selected computing infrastructure to detect and predict faults in the operation of the telecommunication system, and automatically correcting at least some of the detected faults.

In embodiments, the method may further comprise automatically preventing at least some of the predicted faults. The data relating to the problem to be solved may comprise at least one of data from sensors, data from devices, data from servers, data from robots, and data from humans. The at least one machine learning model relevant to the problem may be obtained by at least one of selecting, at the computer system, at least one model from among previously used processed models stored at the computer system, selecting, at the computer system, at least one model from among models obtained from public sources, proprietary sources, or both, and generating, at the computer system, a new model based on type, morphology, and parameter information. The at least one machine learning model relevant to the problem may be further obtained by determining, at the computer system, a combination of the selected and generated models that produces higher accuracy results than the selected and generated models, and assembling, at the computer system, a combination of the selected and generated models based on the determination of the combination of the selected and generated models that produces higher accuracy results than the selected and generated models. The combination of the selected and generated models that produces higher accuracy results than the selected and generated models may be determined by selected and trained heuristics or by a machine learning model.

In an embodiment, a telecommunication system may comprise a computer system comprising a processor, memory accessible by the processor, and computer program instructions stored in the memory and executable by the processor to perform: receiving, at the computer system, data relating to operation of the telecommunication system, obtaining, at the computer system, at least one machine learning model trained to detect and predict faults in the operation of the telecommunication system, selecting, at the computer system, computing infrastructure upon which to execute the at least one machine learning model, wherein the selected computing infrastructure comprises a mesh of interconnected micro-applications, executing, at the computer system, the at least one machine learning model using the selected computing infrastructure to detect and predict faults in the operation of the telecommunication system, and automatically correcting at least some of the detected faults.

In an embodiment, a computer program product may comprise a non-transitory computer readable storage medium having program instructions embodied therewith, the program instructions executable by a computer system interconnected with a telecommunications system, to cause the computer system to perform a method comprising: receiving, at the computer system, data relating to operation of the telecommunication system, obtaining, at the computer system, at least one machine learning model trained to detect and predict faults in the operation of the telecommunication system, selecting, at the computer system, computing infrastructure upon which to execute the at least one machine learning model, wherein the selected computing infrastructure comprises a mesh of interconnected micro-applications, executing, at the computer system, the at least one machine learning model using the selected computing infrastructure to detect and predict faults in the operation of the telecommunication system, and automatically correcting at least some of the detected faults.

BRIEF DESCRIPTION OF THE DRAWINGS

The details of the present invention, both as to its structure and operation, can best be understood by referring to the accompanying drawings, in which like reference numbers and designations refer to like elements.

FIG. 3 is an exemplary block diagram of a Closed Loop Control System that may be used by embodiments of the present systems and methods.

FIGS. 4a-d are an exemplary block diagram of an overall architecture of a system, according to embodiments of the present systems and methods.

FIG. 5 is an exemplary pseudocode diagram of a search process, according to embodiments of the present systems and methods.

FIG. 6 is an exemplary block diagram of a computer system, according to embodiments of the present systems and methods.

FIGS. 8a-c are an exemplary block diagram of an Orchestrator architecture, according to embodiments of the present systems and methods.

FIG. 9 is an exemplary illustration of processing workflow of a Selector Component, according to embodiments of the present systems and methods.

FIG. 12 is an exemplary illustration of a genetic algorithm, according to embodiments of the present systems and methods.

FIG. 13 shows exemplary flow diagrams of genetic algorithms, according to embodiments of the present systems and methods.

FIG. 14 is an exemplary illustration of Bayesian networks, according to embodiments of the present systems and methods.

FIG. 16 is an exemplary pseudocode diagram of an Enumeration-Ask process, according to embodiments of the present systems and methods.

FIG. 17 is an exemplary pseudocode diagram of an Elimination-Ask process, according to embodiments of the present systems and methods.

FIG. 18 is an exemplary pseudocode diagram of a Likelihood Weighting process, according to embodiments of the present systems and methods.

FIG. 19 is an pseudocode flow diagram of an Gibbs Sampling process, according to embodiments of the present systems and methods.

FIG. 20 is an exemplary block diagram of a Critic-selector mechanism on personality layer, according to embodiments of the present systems and methods.

FIG. 29 is an exemplary block diagram of a system, according to embodiments of the present systems and methods.

FIG. 30 is an exemplary flow diagram of a process of Telecommunications System Fault Detection, according to embodiments of the present systems and methods.

DETAILED DESCRIPTION

Figure 1:
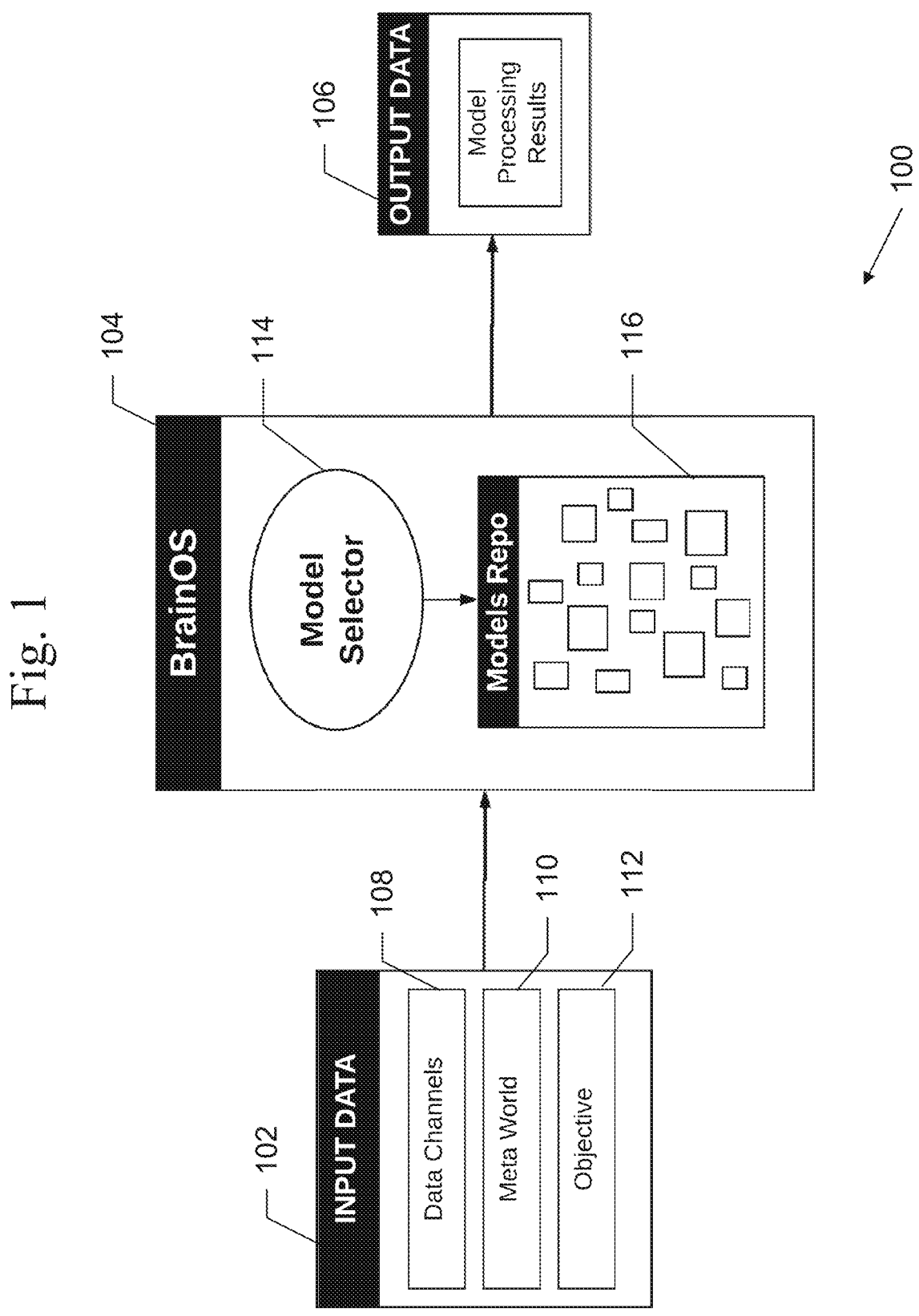
FIG. 1 is an exemplary block diagram of a system, according to embodiments of the present systems and methods.

Embodiments of the present systems and methods may provide machine learning techniques that may address such shortcomings and provide improved performance and results in a Radio Access Network (RAN). A radio access network (RAN) is a major component of a wireless tele-communications system that connects individual devices to other parts of a network through a radio link. The RAN links user equipment, such as a cellphone, computer or any remotely controlled machine, over a fiber or wireless back-haul connection.

A RAN is made up of three essential elements: (1) Antennas, which convert electrical signals into radio waves; (2) Radios, which transmit and receive signals that can be sent wirelessly and that represent digital information; and (3) Baseband units (BBUs), which provide signal processing functions to, among other things, detect errors, secure the wireless signal and ensures that wireless resources are used effectively. Examples of RAN standards may include 5G, 4G, LTE, etc.

For example, embodiments may address issues in the context of, for example, to dynamic error detection and fault prediction. Embodiments may capture data on different input channels, perform data enhancement and use existing AI models or create new ones. It can also fine-tune, validate and combine previously used models to create a more powerful collection of models. To guarantee efficient pro-cessing, embodiments may automatically calibrate the most suitable mathematical model and choose the most appropri-ate computing learning tool based on the task to handle.

Fault detection and diagnosis (FDDs) is a procedure for identifying and isolating system operational flaws. FDDs can be implemented using two major techniques namely, data-driven techniques (AI and machine learning techniques are used to train and test FDD models using historical operational data) and knowledge-driven techniques (FDD specialist uses qualitative methods to analyze the fault scenario).

Embodiments may provide an intelligent adaptive system that combines input data types, processing history and objectives, research knowledge and situational context to determine what is the most appropriate mathematical model, choose the most appropriate computing infrastructure on which to perform learning, and propose the best solution for a given problem. Embodiments may have the capability to capture data on different input channels, perform data enhancement, use existing AI models, create others de novo and also finetune, validate, and combine them to create more powerful collections of models. Embodiments may use concepts from the critic-selector model of mind and from the brain pathology treatment approaches.

Embodiments may be modeled after neural networks and information exchange in the human brain. Just like the human brain, embodiments may receive massive amounts of data points in different formats and then parse, organize and filter out irrelevant information. With each new data point received, the embodied solution learns, trains itself and builds its repository for future analysis. The system is capable of learning from data and distributions, distinguish-ing patterns and making autonomous decisions. These fea-tures considerably decrease the need for human intervention.

Once the system is developed, it will autonomously and automatically ingest, process and filter new data, update and build out its databases, and commit new data and models to memory. Instead of using black-box algorithms, digital arithmetic units or Boolean gates, it uses multi-layer, neural networks and multi-core ML, which aids user adoption. Embodiments may integrate both convolutional feedforward and recurrent network principles, and employs a novel queuing theory driven design to create perception and rea-soning characteristics similar to the human brain. The friendly development and user environment may provide users the ability to quickly classify, extract, and analyze data without writing custom code. This innovative heuristic framework will require minimal annotation, training and human intervention, saving time and resources.

Embodiments may involve a BrainOS system uniquely tailored to meet the intricate demands and operational chal-lenges inherent to telecommunication networks. Embodi-ments may utilize a brain-inspired artificial intelligence model customized for the data and needs of telecom fault and failure prediction. Given its reliability in predicting neurodegenerative disease, military conflicts, pain and other complex, high-level problems, embodiments may be able to detect and predict Radio Access Network (RAN) failures at least 24 hours in advance with 95% accuracy. With our tailored solution, Organization will be able to anticipate disruptions before they affect service quality, enhancing system reliability and ultimately, the end-user experience.

Embodiments may deliver higher accuracy and reliability than other fault management systems. Each component of the Brain OS system will be designed and developed accord-ing to the specifications and unique requirements of the input data, objectives, situational context and infrastructure.

In embodiments, a BrainOS system may be built for efficiency and durability, creating an adaptable, long term solution through its ability to choose the most suitable learning model and automatically recalibrate based on incoming data and task at hand. In addition, our embodi-ments may streamline the complex process of issue resolu-tion by providing an adaptable collection of predictive insights. Embodiments may provide enhanced alerts with suggested opportunities to rectify issues before they escalate into significant problems. These alerts translate into faster recovery times, reduced downtime, and improved opera-tional efficiency. Leveraging the incredible power of BrainOS may provide a permanent solution to inadequacies in an Organization's fault management system.

An exemplary block diagram of a system 100 according to the present techniques is shown in FIG. 1. System 100 may include, for example, three layers, Input Data Layer 102, BrainOS Data Processing Layer 104, and output data layer 106. Input Data Layer 102 may include data-capturing points from data channels 108 associated with types of data: video, image, text, audio, etc., as well as meta world data 110 and objective data 112. The data channels layer may include several stages of data retrieval and manipulation, such as: identification of input points and types for each data channel, retrieval of data and data preprocessing, and data sampling techniques and storage.

BrainOS Data Processing Layer 104 may include a model selector 114 and a model repository 116. Model selector 114 identify a set of methods and operations from model reposi-tory 116 to apply on the input data in relation to intelligence inferring and pattern determination. Such mechanisms may include the stages such as a Critic-Selector Mechanism, which may be based on combining input data types from data channels 108, meta world data 110, such as processing history, and objective data 112, including research knowl-edge and situational context to determine what is the most appropriate Artificial Intelligence (AI) model for existing data and how the system should manage the processing resources, be it models or computing infrastructure. Such mechanisms may further include data processing using AI/ML algorithms in pipelines and a models training loop and transfer learning mechanism.

Output Data Layer 106 may include the results of running the resulting model or ensemble of models on the automatically selected computing infrastructure.

Embodiments of the present systems and methods may operate on data channels, data processing methods and model selector components, and utilizes a repository of intelligent models (similar to the specific neural networks in the human brain). Embodiments may be underpinned by a complex qualifier-orchestrator meta-component, which is based on a critic-model selector component that performs automated determination of models to be employed for solving any given scenarios.

Figure 2:
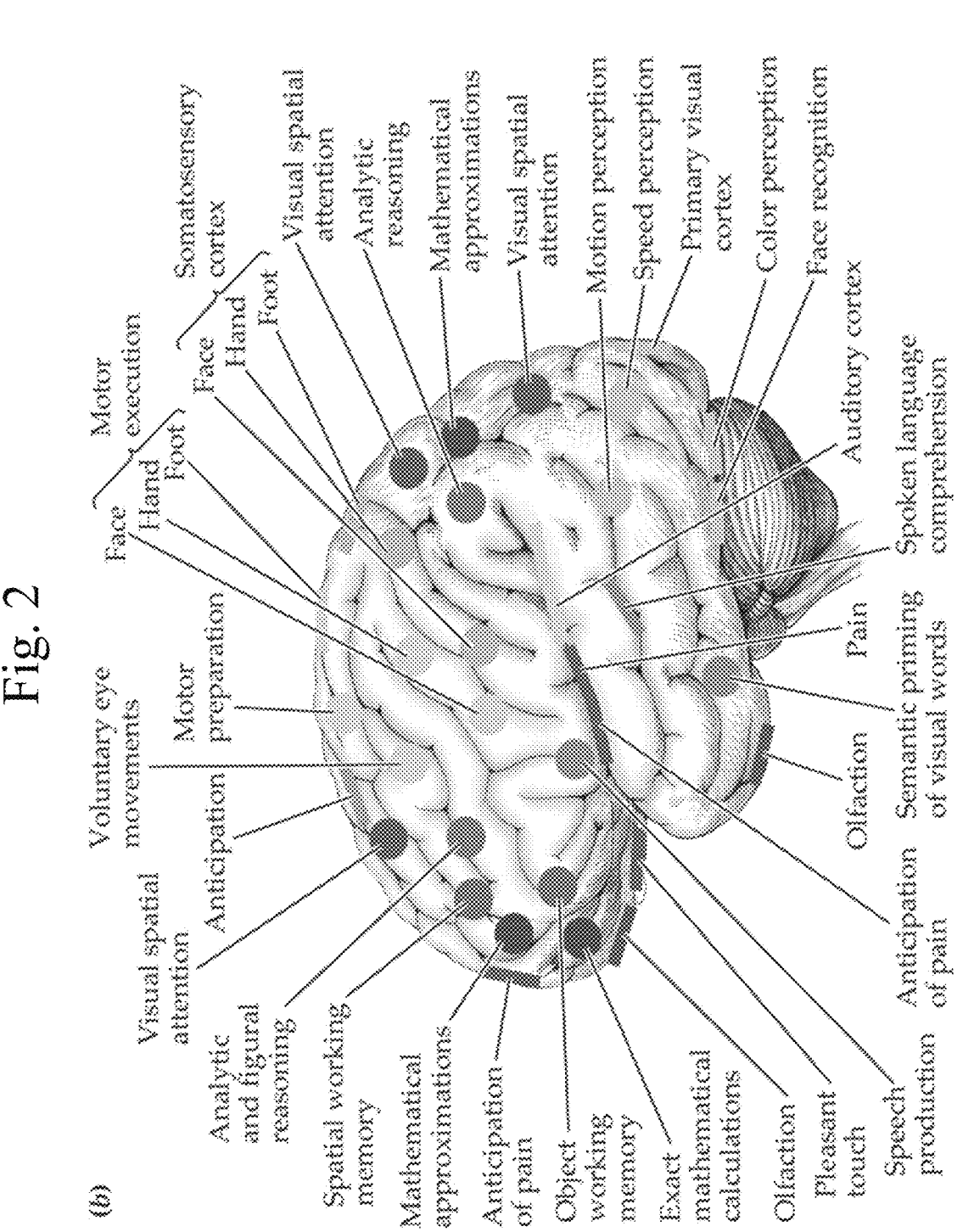
FIG. 2 is an exemplary representation of the brain areas and associated functions.

Embodiments may use available computing infrastructure as a set of resources that can be turned on and off through a critic-selector mechanism, much in the way the human mind seems to work. This principle can be applied at different layers, as described further below. The human brain uses different neuronal areas to process input data, depending on the receptor type. There are specific neural networks associated to different brain functions, as illustrated in FIG. 2.

Figure 4A:
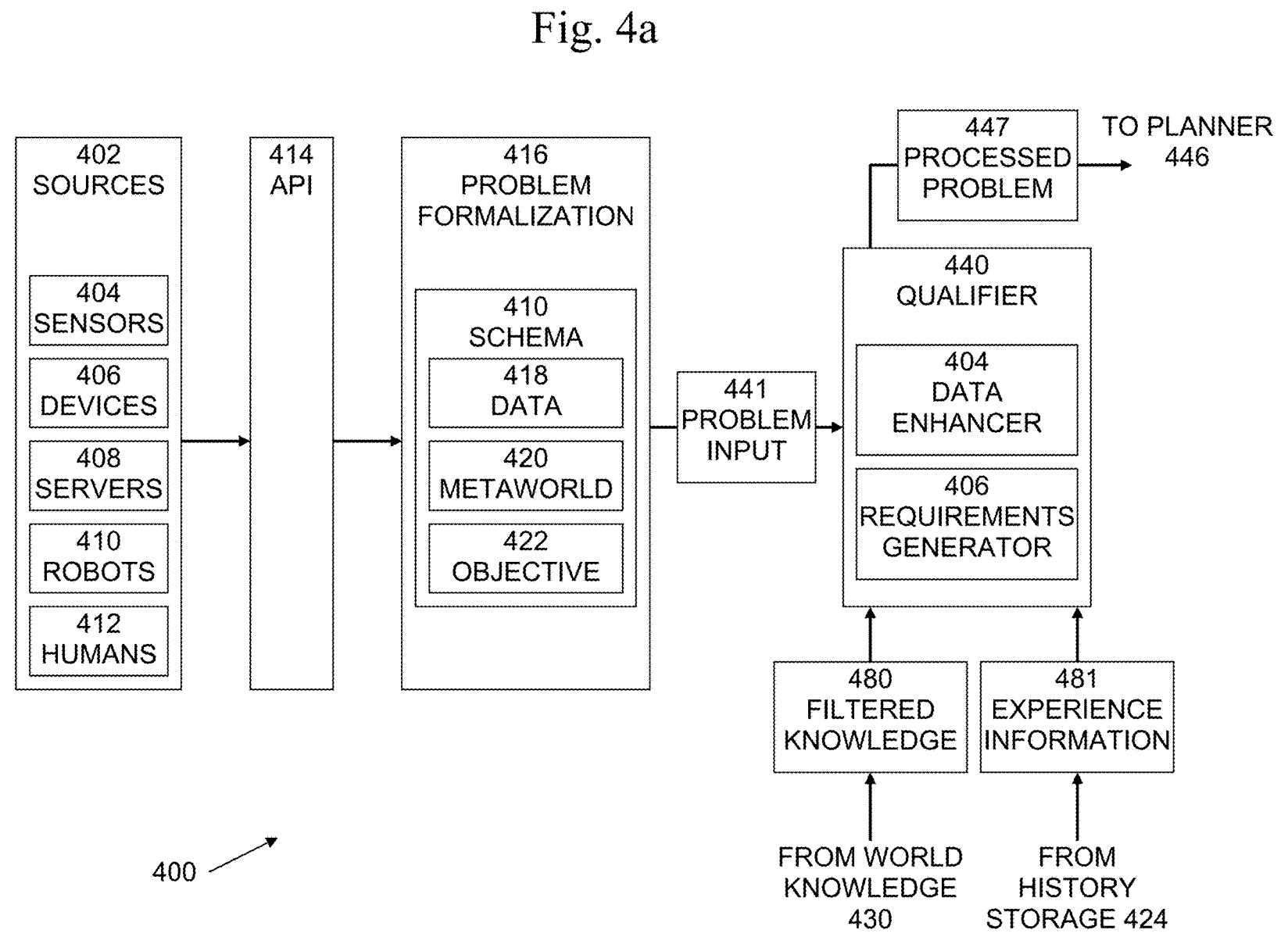
Figure 4B:
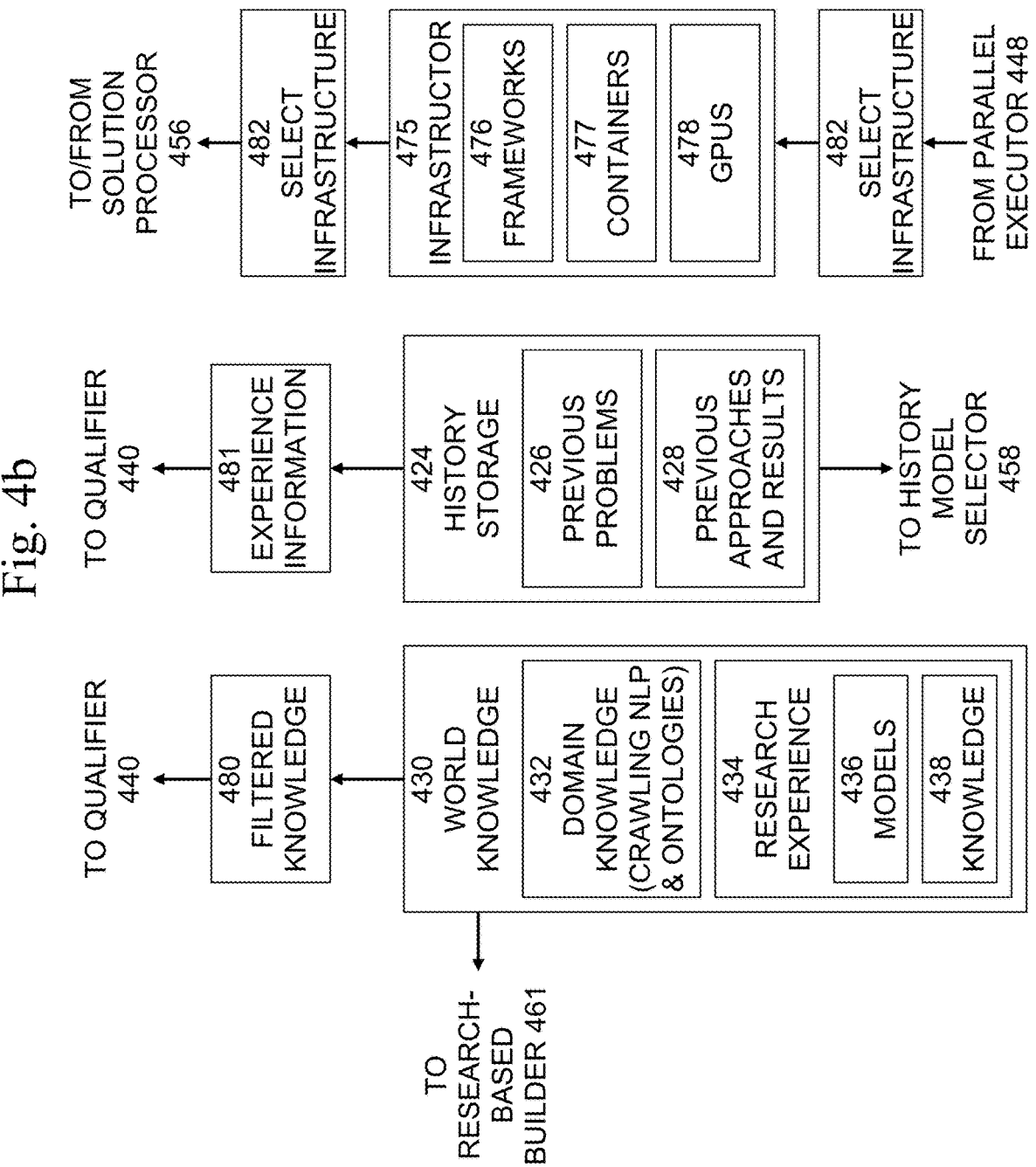
Figure 4C:
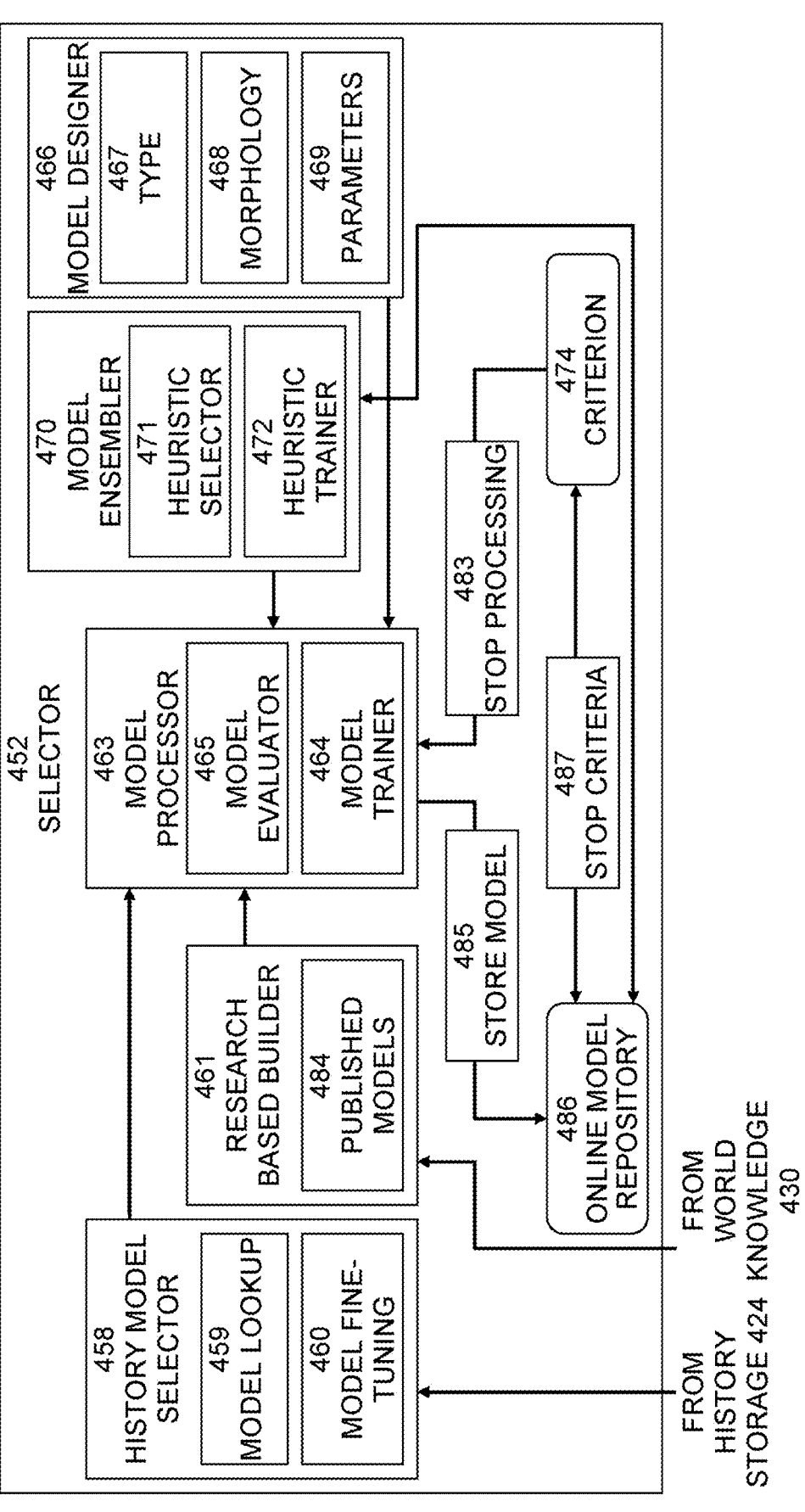
Figure 4D:
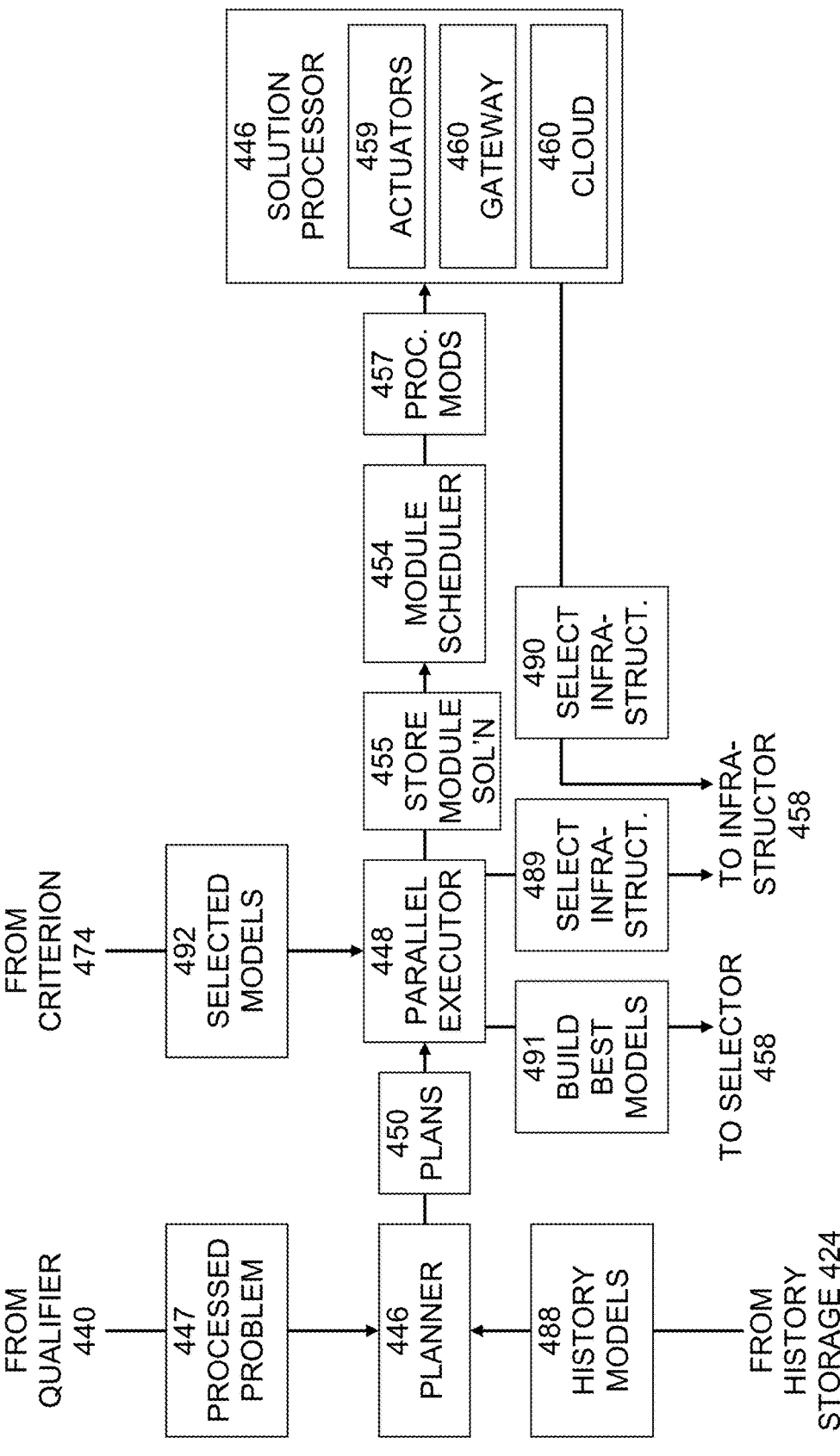

Mimicking the brain, embodiments may feature a critic-selector mechanism (shown in FIG. 4). The critic-selector mechanism may process the problem description, recognize the problem type, and then activate the selector component. The selector may start up several sets of resources (models or combination of models), which were learned from experience as the most probable viable approaches for the given situation at hand.

Embodiments may feature multi-modal processing combining data, which maps to the human senses of vision, hearing, etc., and a multitude of "data senses", meaning other cross-correlated data streams which can be mined for information.

The Brain Pathology Treatment Mimetic. The human brain, which has been referred to as a "three pound enigma," is considered the grand research challenge of the 21st century. We understand the brain as a multidimensional, densely wired matter made of tens of billions of neurons, which interact at the millisecond timescale, connected by trillions of transmission points that generate complex output such as behavior and information processing. Neurons can send to and receive signals from up to 105 synapses and can combine and process synaptic inputs to implement a rich repertoire of operations that process information.

Parkinson's Disease Example. Neurodegeneration is a progressive loss of neuron function or structure, including death of neurons, which occurs at many different levels of neuronal circuitry. One of the most devastating and currently incurable neurodegenerative diseases (NDD) is Parkinson's Disease (PD).

PD is a chronic, progressive NDD usually found in patients over 50 years of age. PD is the most common form of Parkinsonism, a group of conditions that share similar symptoms. Symptoms and severity vary from patient to patient, making diagnosis difficult. The classic triad of symptoms comprise tremor at rest, muscle rigidity and bradykinesia (slowing of all movements, particularly walking). Postural instability, grossly impaired motor skills and general lethargy are also common. These symptoms are caused by the death of neurons in the substantia nigra pars compacta in the midbrain that control movement by releasing dopamine into the striatum of the basal ganglia; dopamine is a neurotransmitter that modulates neural pathways to select appropriate movements for individual circumstances. Some studies have found that PD patients also exhibit abnormal production of the neurotransmitter norepinephrine. Norepinephrine may be linked to non-motor symptoms of PD including fatigue, irregular blood pressure, and anxiety.

Treatment Approaches. There currently exists no way to stop the progression of the disease, but it can be managed using mainly two kinds of interventions-Pharmaceutical treatment and Surgical treatment.

The most common pharmaceutical intervention relies on using levodopa (L-DOPA), which is converted to dopamine by the surviving neurons in order to compensate for the degeneration of the dopamine-producing cells. Although it is the most effective pharmaceutical treatment for PD to date, L-DOPA can have severe side effects such as dyskinesias and motor fluctuations. Among the dyskinesia adverse effects we can mention tics, writhing movements, dystonias, as well as periods of time when the medication has no effect. Moreover, patients can develop unresponsiveness to L-DOPA requiring increased doses over time, which can lead to more severe side effects.

A promising therapeutic approach free from the side effects of levodopa treatment is using implanted devices for neural modulation through electrophysiology or optogenetics.

Figure 3:
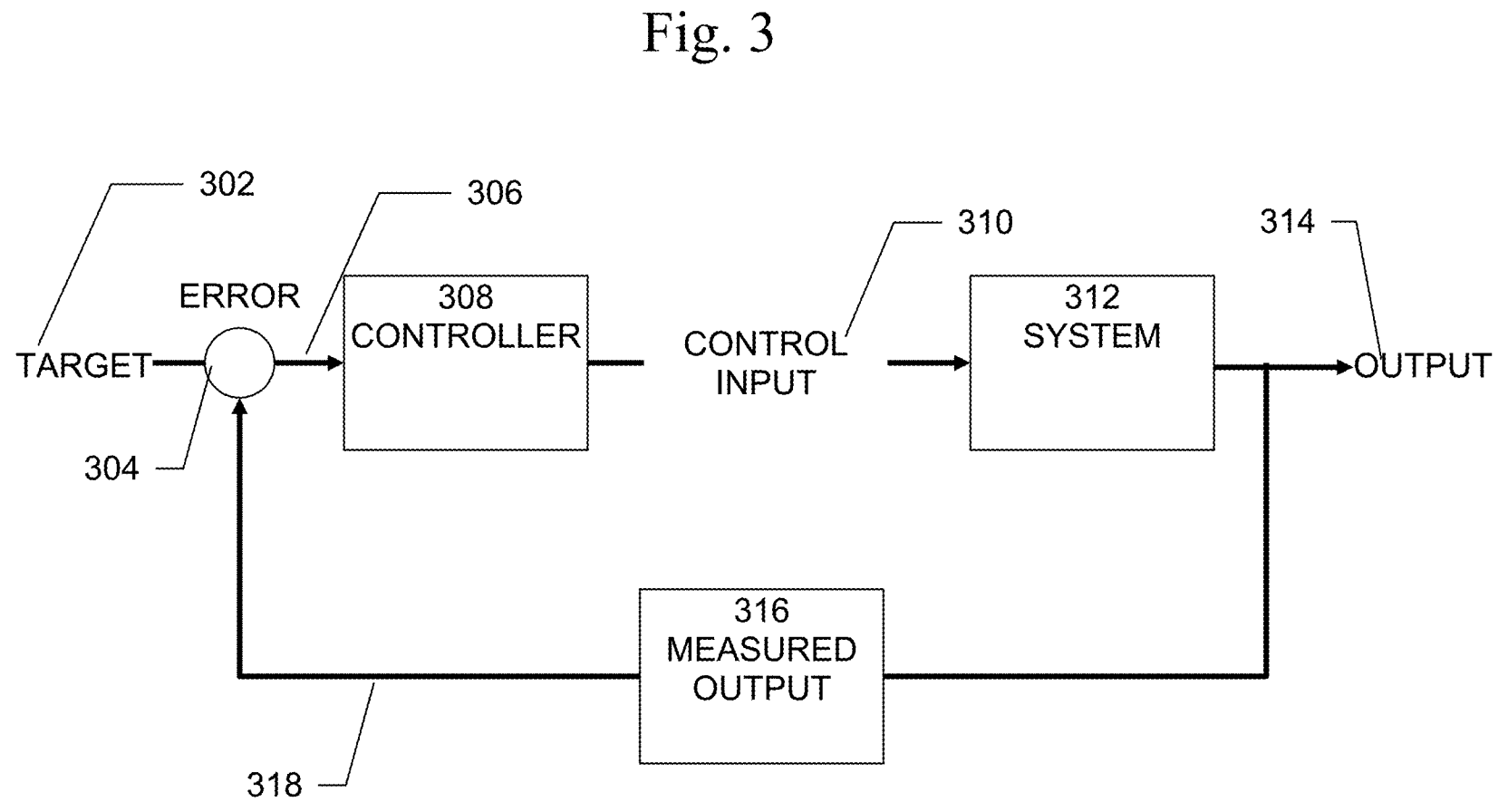

The Neural Modulation Treatment Approach. Using electrophysiology and/or optogenetics the chemical behavior of the neurons may be controlled. Brain stimulation is more effective when it is applied in response to specific brain states, via, for example, Closed Loop Monitoring, as opposed to continuous, open loop stimulation. A conceptual sketch of a closed loop control system can be seen in FIG. 3. As shown in FIG. 3, a target input 302 may be applied to an error component 304, which may generate an error signal 306 that may be input to controller 308. Controller 308 may generate a control input signal 310 based on error signal 306, which may be applied to system under control 312. System 312 may generate an output, which may be measured 316 and a signal 318 representing the measured output may be input to error component 304.

Embodiments may provide closed-loop, activity-guided control of neural circuit dynamics using optical and electrical stimulation, while simultaneously factoring in observed dynamics in a principled way. This may provide a powerful strategy for causal investigation of neural circuitry. In particular, observing and feeding back the effects of circuit interventions on physiologically relevant timescales is valuable for directly testing whether inferred models of dynamics, connectivity, or causation is as accurate in vivo.

Embodiments may use an evaluation function to measure how well the model performs on the validation data. If the error is larger than the defined tolerance, the controller modifies the tested model architectures and then proceeds again with the evaluation step.

In embodiments, depending on the complexity of the model and the number of features the algorithm needs to search, the evaluation function can become more elaborate. If there are multiple features for which we want to optimize, a multi-parameter evaluation function can be used, for example a combination of multiple heuristic functions. Then, based on the feedback from all the heuristic functions, a decision can be made concerning how the set of model architectures can be improved.

There are many approaches to implement a closed loop control algorithm. The simplest one is an on/off algorithm, illustrated in the pseudocode sequence below for a neural modulation application.

```
List<Channels> channels_to_read;
List<Channels> channels_to_stimulate;
while ( !stopped) {
    neuron_data = read_channels(channels_to_read);
    next_state = calculate_next_state(neuron_data);
    if (next_state < threshold) {
        duration = calculate_duration(neuron_data);
            apply_stimulation(channels_to_stimulate, duration);
    }}
```

Architecture. Embodiments may provide the capability to adapt learning modules and resources to a specific input problem so as to propose the best solution for a given problem formalization. An exemplary embodiment of an overall architecture of a system 400 is shown in FIG. 4. As shown in FIG. 4, data sources 402 may include sensors 404, devices 406, such as Internet of Things (IoT) devices, servers 408, robots 410, humans 412, etc. Data from data sources 402 may be input to system 400 through an exposed API 414, and may adhere to a given schema. Data from API 414 may be input to problem formalization component 416.

Problem Formalization. Problem formalization component 416 may be the main entry point in the system 400 flow, and may include components such as Data channels 418, Meta-World information 420, and Task Objective 422. These 3 components may include the entire set of available information with regards to a given input problem.

Data channels 418 may include the information about a problem. Meta-World information 420 may include information about the real world context and specific descriptions of the variables available in the input dataset, while the Task Objective 422 may describe the main purpose of the processing task, and its desired results.

For reasons of consistency, the input to Problem Formalization component 416 may comply to a problem formalization schema or format, which can be exposed through an API for connecting system 400 to any other machine or system. Likewise, the output from Problem Formalization component 416 may comply to a defined schema or format. Hence, problem formalization component 416 may also play the role of maintaining the problem's integrity and consistency, to provide for the proper functioning of the next modules in the pipeline of the system.

History Databases. The task of proposing an adaptive learning system for solution proposal in a dynamic environment is an elaborate undertaking, bringing us closer to the realms of human reasoning and understanding. It is clearly known that humans make use of complex and vast fields of knowledge and experiences when they are trying to search for solutions to even simple issues and obstacles in their daily lives. To mimic the extraordinary human cognitive ability, system 400 may include at least two storage systems.

One storage system, History Storage Component 424 may include experience acquired over the entire life of the system, in terms of encountered data sets, previous used resources (models) and achieved results. For example, History Storage Component 424 may include storage of information 426 relating to previous problems presented to system 400 and information 428 relating to previous approaches that were used to solve the previous problems and the results of such approaches. Such a memory resource may be valuable in situations in which the system is confronted with similar problems to those processed in the past, conferring to system 400 the capability of a "reflex response" when the encountered problem formulation is already known.

As a second layer of history, the World Knowledge Component 430 may include "common sense" knowledge of the world, spanning from general concepts to domain-specific ones. World Knowledge Component 430 may include Domain Knowledge information 432, which may include information for a diverse range of disciplines and areas in which the system may have expertise, and Integrated Research Experience information 434, which may serve as a bridge between the real world's interdisciplinarity and the system's homogeneous structure. Integrated Research Experience information 434 may include Stored Models 436—resources discovered in the past and open for direct use without any property constraints and the more abstract Research Knowledge 438—a vast field of information, parts of which could be applied to specific problem formulations, distinct problem solutions, or precise data sets. Such information may be obtained from public and proprietary sources, for example, from the Internet.

World knowledge component 430 may include both code and ontologies and may be built using the available information on the web and in the online and offline academic contexts, by using an ensemble of Natural Language Processing (NLP) and web-crawling techniques.

Qualifier (Critic) Component 440. The first processing phase may be accomplished using Qualifier (Critic) Component 440, which may use Problem Formalization 416 in the form of problem input 441, Experience Information 481 from history storage component 424, and Filtered Knowledge 480 from World knowledge component 430 for processing such as:

Enhancing the data with any previously used data sets that match or complement the current input characteristics, in a Data Enhancer component 442. Here the input data may be enhanced by parsing the entire available history of data sets (using their characteristics for finding their added value in enhancing the current data set) and exploring the correlations between vital concepts in the problem formulation.

Making qualifications and applying constraints on the problem at hand, for achieving an intermediate qualification result that can be used for narrowing down the reasoning search space in the next steps of the flow. This may be performed by Requirements Generator (Restrainer) component 444. The Requirements Generator (Restrainer) component 444 may apply "common sense" knowledge and may filter out data that is outside the current situational context.

Planner component 446. The input data that Planner component 446 works with may be the processed problem 447 from Qualifier (Critic) Component 440, which may include the problem formulation and the history of models used 488 from history storage component 424, together with their problem formulations and their results. Planner component 446 may have the ability to determine the most appropriate processing flow for the current problem based on the World Knowledge, Objective, and the similarity of the current task with problems processed in the past.

As an example, for a problem of intent extraction from an image, planner component 446 might prescribe the following steps:

1. Run captioning algorithms on the image to obtain a narrativization of the image
2. Run object detection and activity recognition on the image
3. Run an algorithm to obtain an ontology for the previously extracted concepts
4. Infer intent using all the previously obtained entities and ontologies Planner component 446 may be seen as a large bidirectional graph knowledge in which specific heuristic search algorithms may be run for the detection of the proper node sequences for a given task. For example, an embodiment may use multi-directional advanced versions of ALT search algorithm with Shortcuts and Reach.

An example of pseudocode for such an embodiment is shown in FIG. 5. Even the best search algorithms can be really expensive to run on large graphs. Table 1 below presents a summary of the running time for different classic search algorithms:

TABLE 1

| Criterion | Breadth-First | Uniform-Cost | Depth-First | Depth-Limited | Iterative Deepening | Bidirectional (if applicable) |
|---|---|---|---|---|---|---|
| Complete? | Yes[a] | Yes[a, b] | No | No | Yes[a] | Yes[a, d] |
| Time | $O(b^d)$ | $O(b^{1+\lfloor O^*/\epsilon \rfloor})$ | $O(b^m)$ | $O(b^l)$ | $O(b^d)$ | $O(b^{d/2})$ |
| Space | $O(b^d)$ | $O(b^{1+\lfloor C^*/\epsilon \rfloor})$ | $O(bm)$ | $O(bl)$ | $O(bd)$ | $O(b^{d/2})$ |
| Optimal? | Yes[c] | Yes | No | No | Yes[c] | Yes[c, d] |

Although heuristic search algorithms may improve over the above, still, in reality there is a large set of NP-Complete problems which are not solvable with such an approach. For these cases, embodiments may use optimization approaches using metropolis algorithms, such as simulated annealing, in the planning stage, for searching after improvements in a promising area which was already discovered using a lower level of heuristic search. Simulated Annealing, a version of stochastic hill climbing, uses a Monte Carlo based algorithm and a lowering temperature for converging to a local optimal. In sufficient time, this is expected to converge to a "canonical" distribution, such as:

$$v_r \propto \exp\left(-E_r/kT\right),$$

where E is the potential energy of a system, calculated using the positions of the N particles:

$$E = \frac{1}{2}\sum_{i=1}^{N}\sum_{j=1}^{N} V(d_{ij}),$$
$$i \neq j$$

An example of high-level pseudocode for simulated-annealing is presented below:

```
function SIMULATED-ANNEALING(problem, schedule) returns a
solution state
    inputs: problem, a problem
        schedule, a mapping from time to "temperature"
current ← MAKE-NODE(problem.INITIAL-STATE)
for t = 1 to ∞ do
    T ← schedule(t)
    if T= 0 then return current
    next - a randomly selected successor of current
    ΔE ← next.VALUE − current. VALUE
    if ΔE > 0 then current ← next
    else current ← next only with probability e^{ΔE/T}
```

Parallel Executor 448. Parallel Executor 448 may perform the following:

Based on the plans 450 made by planner component 446, Parallel Executor 448 may initiate different threads of execution for Selector component 452 to generate appropriate models. Based on the models received from Selector 452, such as selected models 492 from criterion component 474, which may be obtained by creation de novo or by a combination of existing models, Parallel Executor 448 may split the processing tasks into multiple parallel threads.

Based on the prepared processing threads, parallel executor 448 may select the corresponding computing infrastructure in terms of hardware and software, such as clusters and virtual instances, etc.

In embodiments, Parallel Executor 448 may instruct 489 Infrastructor component 475 to select the corresponding computing infrastructure in terms of hardware and software, such as clusters and virtual instances, etc. In embodiments, Solution Processor component 456 may instruct 490 Infrastructor component 475 to select the corresponding computing infrastructure in terms of hardware and software, such as clusters and virtual instances, etc. For example, Infrastructor component 475 may include or select frameworks 476, containers 477, graphic processing units 478, etc., to perform the processing tasks, based on the determined amount and types of computing resources needed. In embodiments, Parallel Executor 448 may instruct 491 selector component 458 to build or rebuild models.

Module Scheduler 454. Module Scheduler 454 may receive the stored module solution 455, which may include the prepared threads, prepared by the Parallel Executor 448, and makes a schedule for the solution's execution. This may include different resources at processed at the same time, from the network.

Solution Processor 456. Solution Processor 456 may receive the scheduled tasks or process modules 457 and runs them, if needed in parallel, on the appropriate computing infrastructure.

Figure 6:
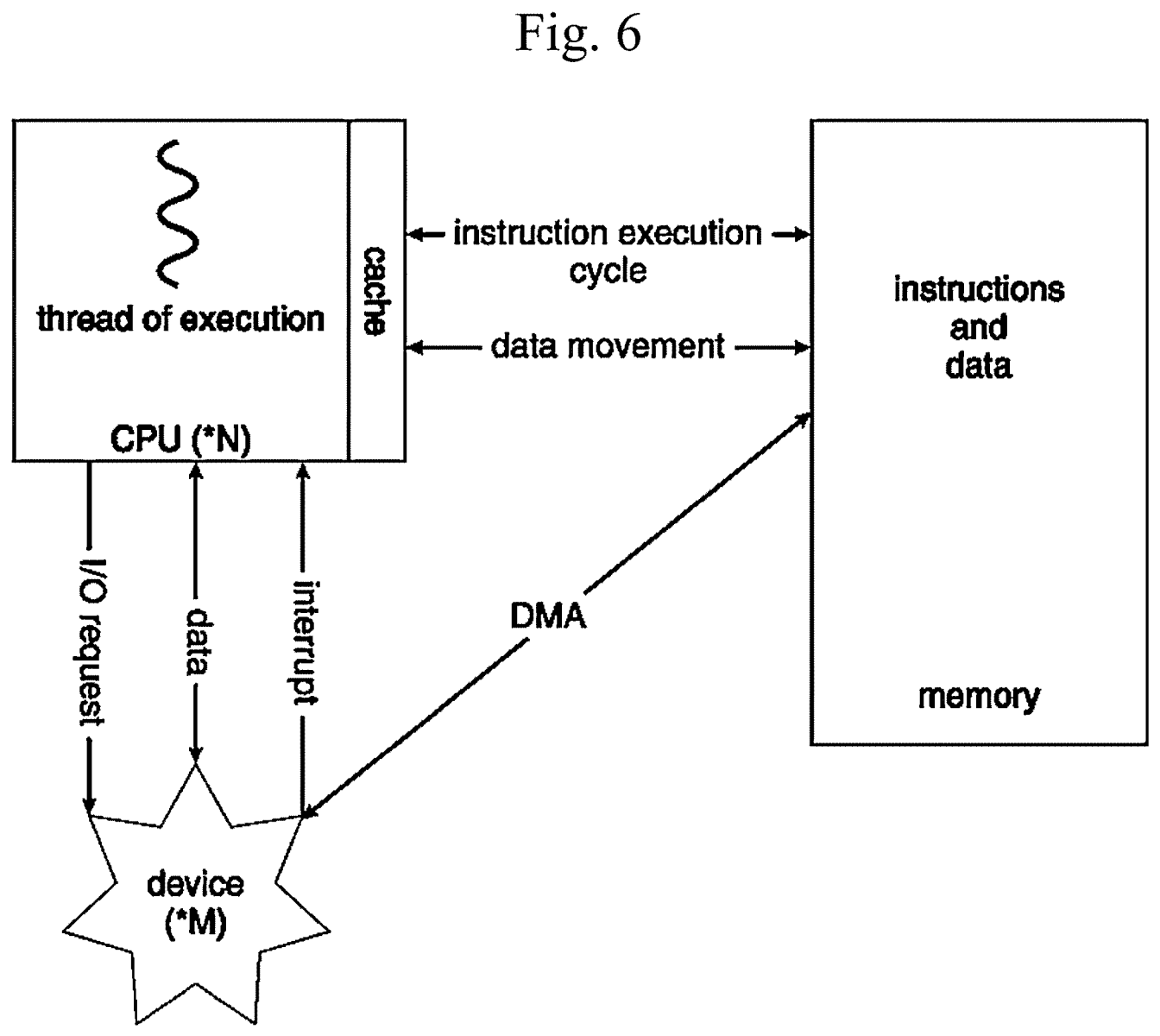
Figure 7:
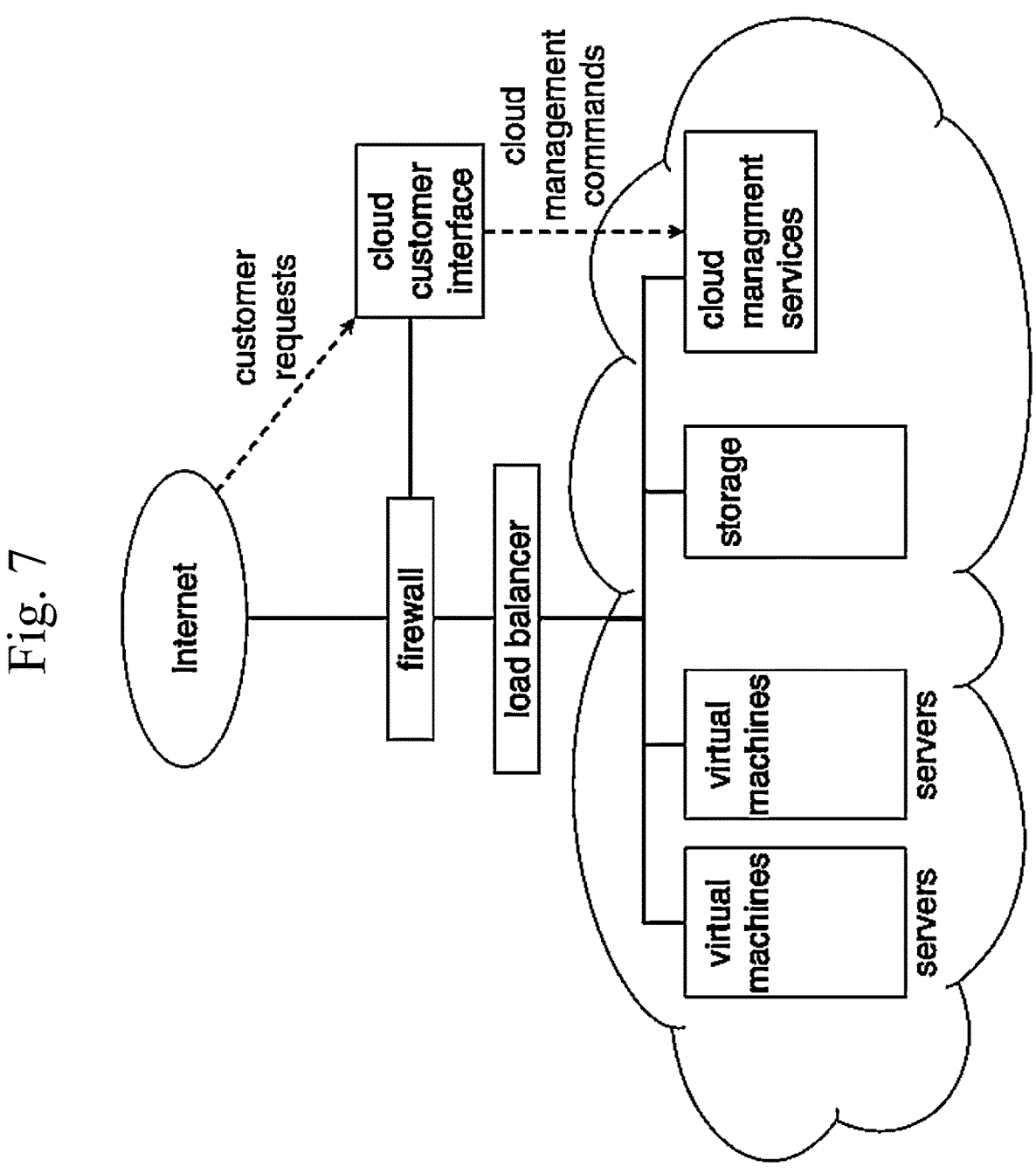
FIG. 7 is an exemplary block diagram of a cloud computing system, according to embodiments of the present systems and methods.

In embodiments, Parallel Executor 448, Module Scheduler 454, Solution Processor 456 may reflect at a higher level the already established and efficient approaches in terms of computer architecture (FIG. 6), and cloud computing (FIG. 7).

Selector component 452. Selector component 452 may prepare the appropriate model for the given problem formulation. To be able to deliver an appropriate model, approaches the Selector may use may include:

History Model Selector component 458 may search for and select 459 one or more appropriate models among previously used processed models stored in history storage component 424. If the Selector component 452 finds a good fit, then the model may be tuned 460, and Model Processor component 463 may train 464 and evaluate 465 the model.

Research Based Builder component 461 may search 462 the Research Knowledge, such as published models 484 and published papers and public code implementations stored in World Knowledge Component 430. If one or more good candidates are found, then the model(s) may be tuned, and Model Processor component 463 may train 464 and evaluate 465 the model(s) and send the models for storage 485 in online model repository 486.

Model Designer component 466 may build one or more new models from scratch after type 467, morphology 468, and parameters 469 are determined. Subsequently the model may be tuned, and Model Processor component 463 may train 464 and evaluate 465 the model(s).

From ensemble learning methods we know that a combination of lower accuracy models may perform better than a higher accuracy model due to overcoming bias. Therefore, before the Selector component 452 adopts the solution model for the given problem formulation, Model Ensembler component 470 may determine, using, for example, selected 471 and trained heuristics 472 and/or machine learning models, whether there is a combination of models that can outperform the selected model. If Selector component 452 finds such a model combination, then the model solution may include an ensemble of models. At least one or more of History Model Selector component 458, Research Based Builder component 461, and Model Designer component 466 may provide one or more models to be evaluated by Model Ensembler component 470. The chosen model or ensemble of models may then be added to models stored in history storage component 424, together with the problem formulation and obtained accuracy.

Any or all such approaches may be run in parallel, and each module may store the current best achieved models in Online Model Repository 473. Criterion component 474 may signal a stop processing event 483 based on stop criteria 487, for example, when a model that is adequate for the objective is found, or when one of the model selector components 458, 461 466, 470 should not be involved in searching anymore given the low probability of finding a proper solution using that approach.

For example, if Selector component 452 is deemed unable to find an appropriate model using History Model Selector component 458 or Research Based Builder component 461, then Criterion component 474 may configure Model Processor component 463 to focus on Model Designer 466 only, and stop the other attempts.

For real-time processing, Criterion component 474 may also flag versions of models from the modules of Selector component 452 that achieved reasonable results in the past, so that they may be used as intermediate solutions until new updates are available.

Figure 8A:
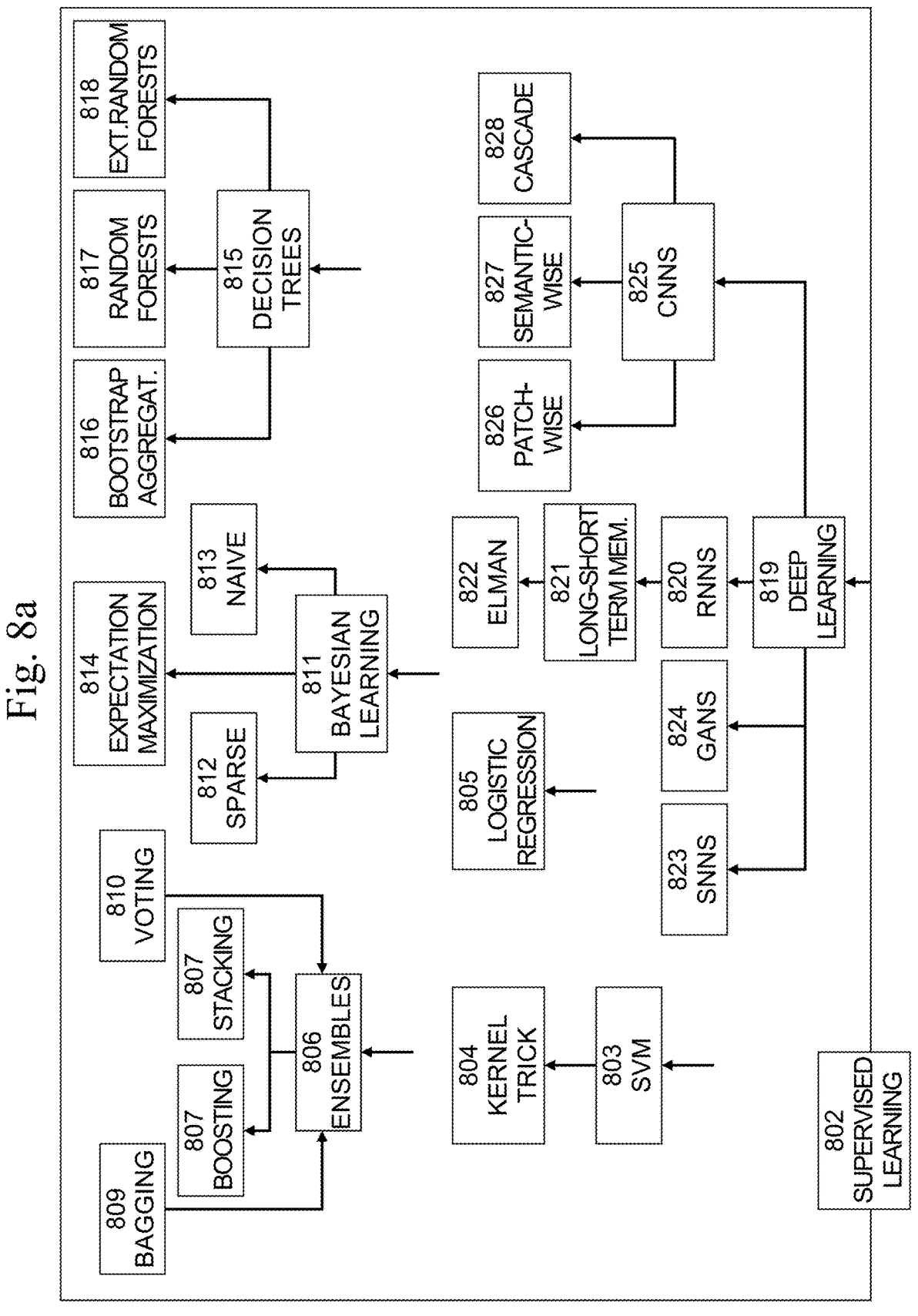
Figure 8C:
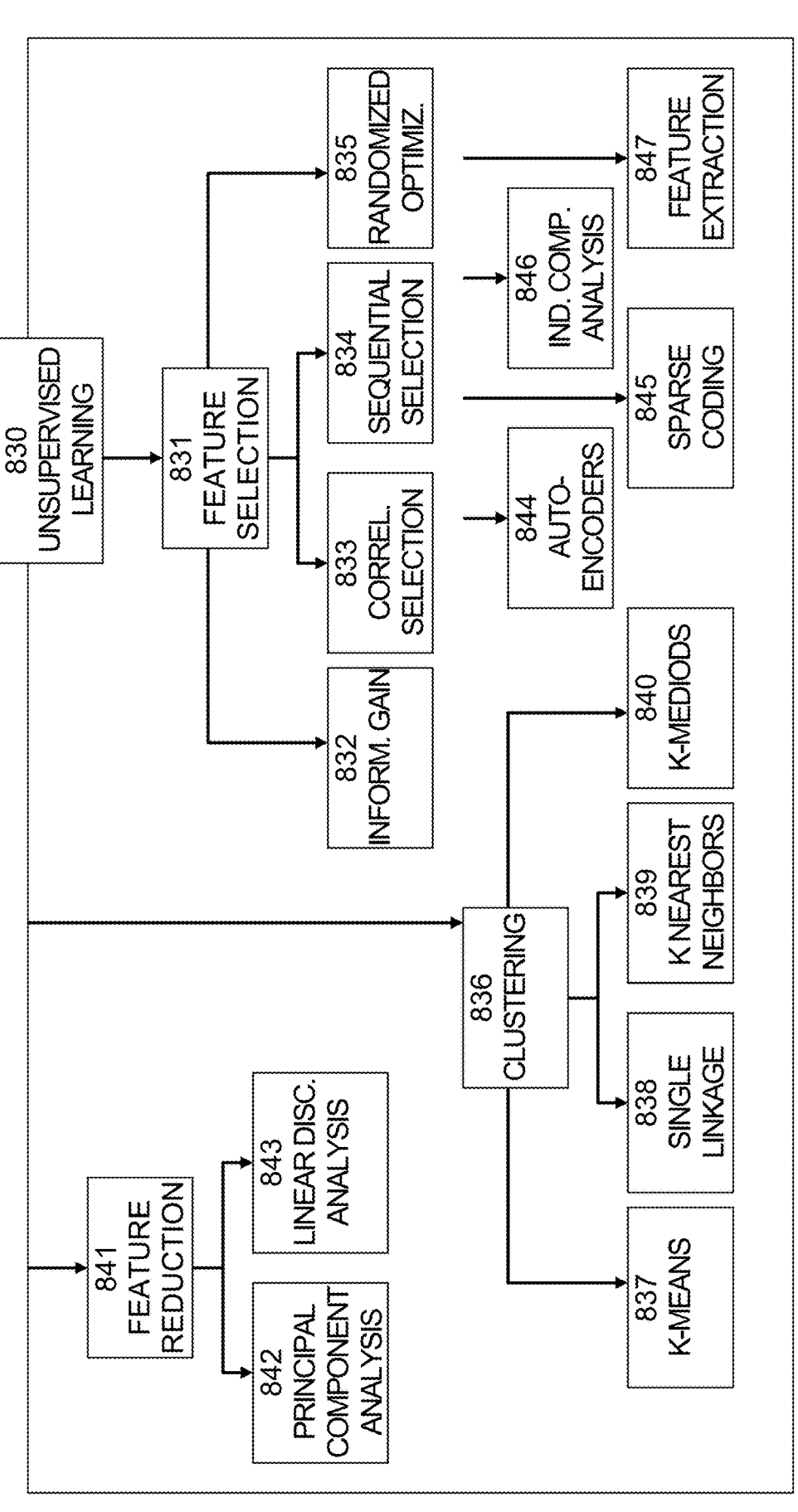

Orchestrator Perspective. From a more abstract, higher level point of view, system 400 may be seen as an orchestrator-centered system 800 managing all possible types of models, which may be organized in a graph, and which can be used for selecting processing paths, as illustrated in FIGS. 8a-c. Orchestrator 800 may use any approach from logic and planning, supervised to unsupervised learning, reinforcement learning, search algorithms, or any combination of those.

Orchestrator 800 may be viewed as a meta-component that combines input data types, processing history and objective, research knowledge, and situational context to determine the most appropriate Artificial Intelligence (AI) model for a given problem formulation, and may decide how the system should manage the processing resources, be it models or computing infrastructure.

Orchestrator 800 may include components such as Model Selectors, such as Selector component 452, Problem Qualifiers, such as Qualifier Component 440, Planners, such as Planner component 446, and Parallel Executors, such as Parallel Executor 448.

Selector Component 448 may generate, select, and prepare the appropriate models corresponding to each section of the processing plan, by searching 458 for models in History Storage Component 424 and searching 461 for models in Research Knowledge in World Knowledge Component 430, building new models from scratch 466 based on determined type and morphology, and forming model ensembles 470. It is to be noted that any type of machine learning model may be utilized by Selector Component 448 for selection of models, as well as generation of models. For example, as shown in FIG. 8a, embodiments may utilize Supervised learning models 802, such as Support Vector Machines models (SVMs) 803, kernel trick models 804, linear regression models (not shown), logistic regression models 805, Bayesian learning models 811, such as sparse Bayes models 812, naive Bayes models 813, and expectation maximization models 814, linear discriminant analysis models (not shown), decision tree models 815, such as bootstrap aggregation models 816, random forest models 817, and extreme random forest models 818, deep learning models 819, such as random, recurrent, and recursive neural network models (RNNs) 820, long-short term memory models 821, Elman models 822, generative adversarial network models (GANs) 824, and simulated, static, and spiking neural network models (SNNs) 823, and convolutional neural network models (CNNs), such as patch-wise models 826, semantic-wise models 827, and cascade models 828.

For example, as shown in FIG. 8c, embodiments may utilize Unsupervised learning models 830, such as Clustering models 836, such as hierarchical clustering models (not shown), k-means models 837, single linkage models 838, k nearest neighbor models 839, k-medioid models 840 mixture models (not shown), DBSCAN models (not shown), OPTICS algorithm models (not shown), etc., feature selection models 831, such as information gain models 832, correlation selection models 833, sequential selection models 834, and randomized optimization models 835, feature reduction models, such as principal component analysis models 842 and linear discriminative analysis models 843, autoencoder models 844, sparse coding models 845, independent component analysis models 846, feature extraction models 847, Anomaly detection models (not shown), such as Local Outlier Factor models (not shown), etc., Deep Belief Nets models (not shown), Hebbian Learning models (not shown), Self-organizing map models (not shown), etc., Method of moments models (not shown), Blind signal separation techniques models (not shown), Non-negative matrix factorization models (not shown), etc., For example, as shown in FIG. 8b, embodiments may utilize Reinforcement learning models 850, such as TD-lambda models 851, Q-learning models 852, dynamic programming models 853, Markov decision process (MDP) models 854, partially observable Markov decision process (POMDP) models 855, etc. Embodiments may utilize search models 860, such as genetic algorithm models 861, hill climbing models 862, simulated annealing models 863, Markov chain Monte Carlo (MCMC) models 864, etc. Likewise, Model Ensembler component 470 may determine whether there is a combination of models that can outperform the selected model using any type of machine learning model.

Embodiments may have different specialized Domain Specific Instances of Selector Component 448, each one optimized for a specific domain knowledge or problem context. Such instances may be deployed only in well delimited knowledge areas to achieve optimal efficiency and speed in problem solving tasks.

Figure 9:
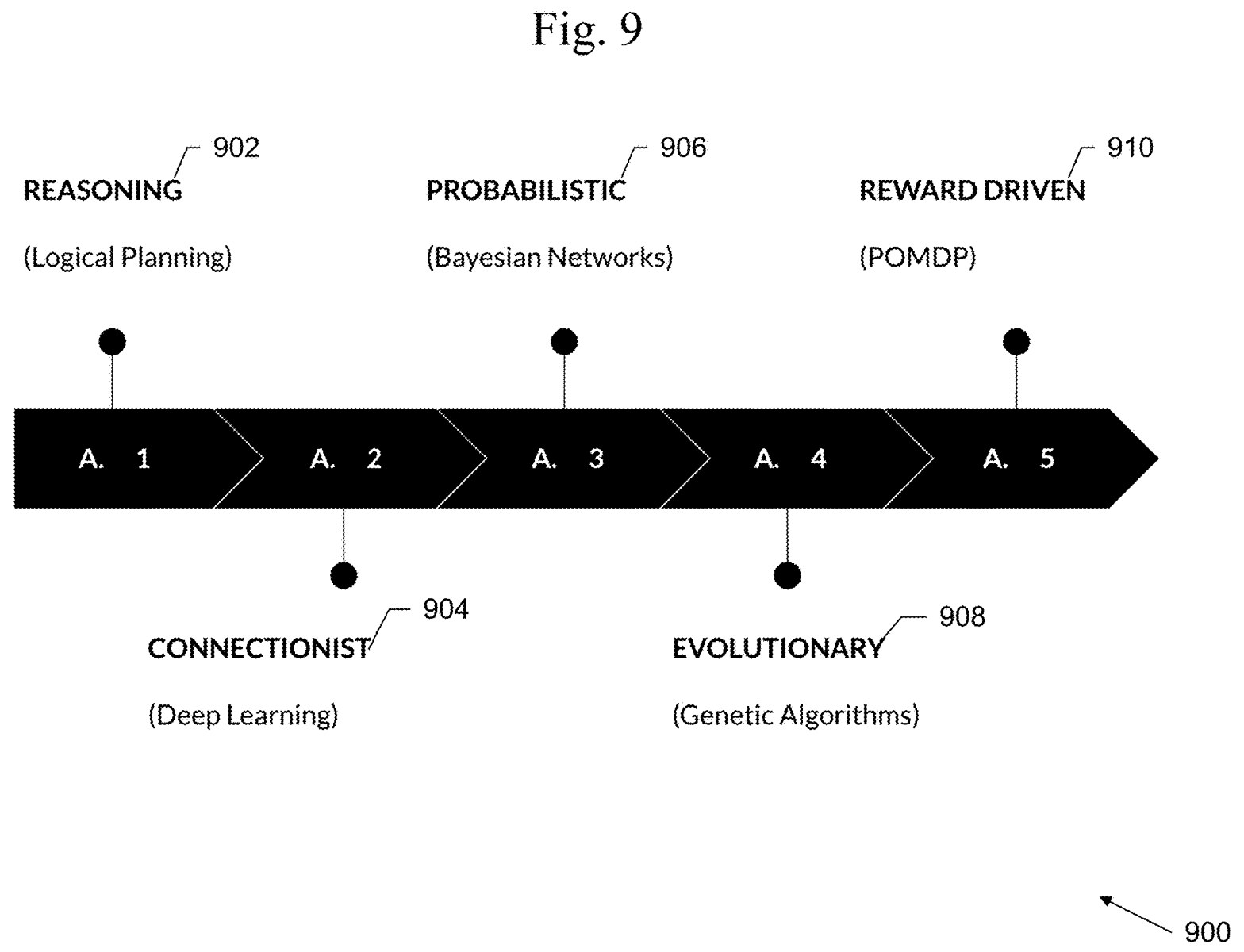

An example of general approaches 900 (and a specific example from each one of them) that can be combined in the processing workflow of Selector Component 448 is shown in FIG. 9. Approaches 900 may include reasoning/logical planning 902, connectionist/deep learning 904, probabilistic/Bayesian networks 906, evolutionary/genetic algorithms 908, and reward driven/partially observable Markov decision process (POMDP) 910.

Genetic Algorithms 908 have been applied recently to the field of architecture search, mainly in the case of deep learning models. Due to improvements in hardware and tweaks in the algorithm implementation, these methods may show good results.

Figure 10:
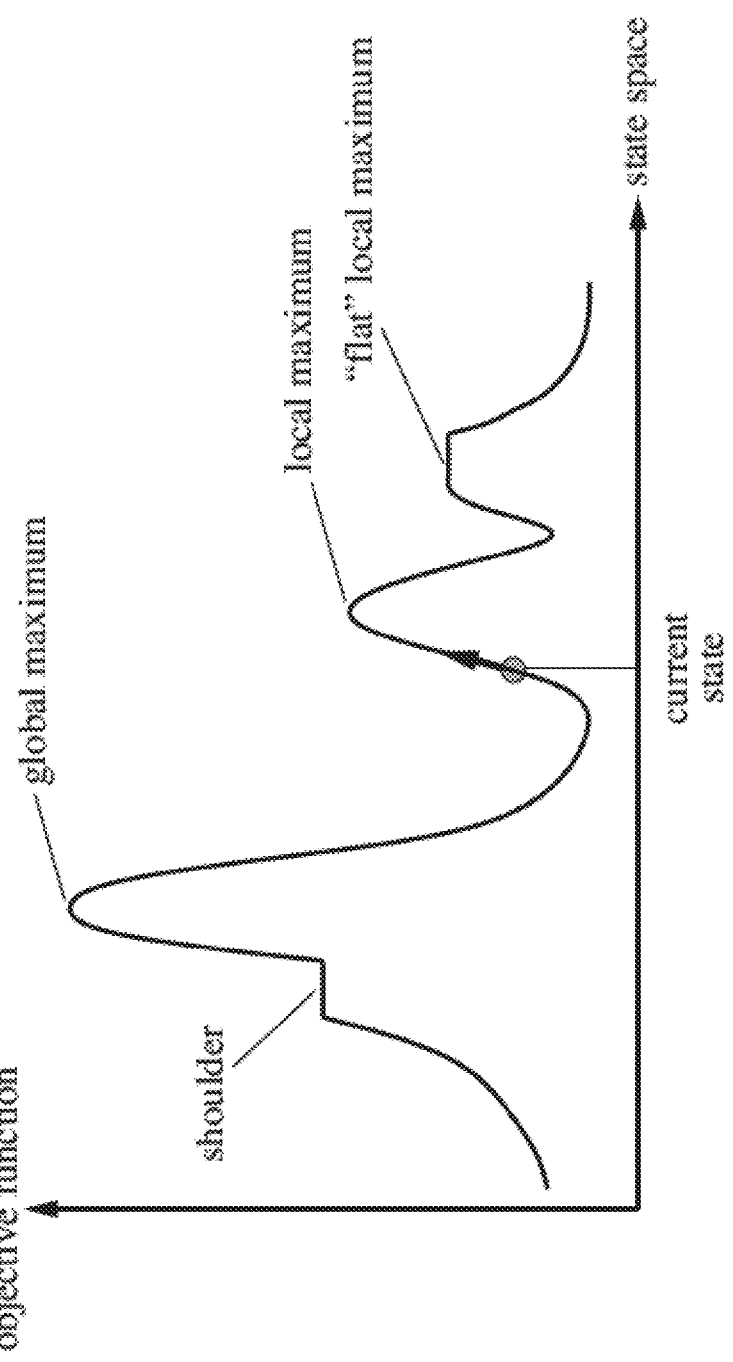
FIG. 10 is an exemplary representation of a family of genetic algorithms, according to embodiments of the present systems and methods.
Figure 11:
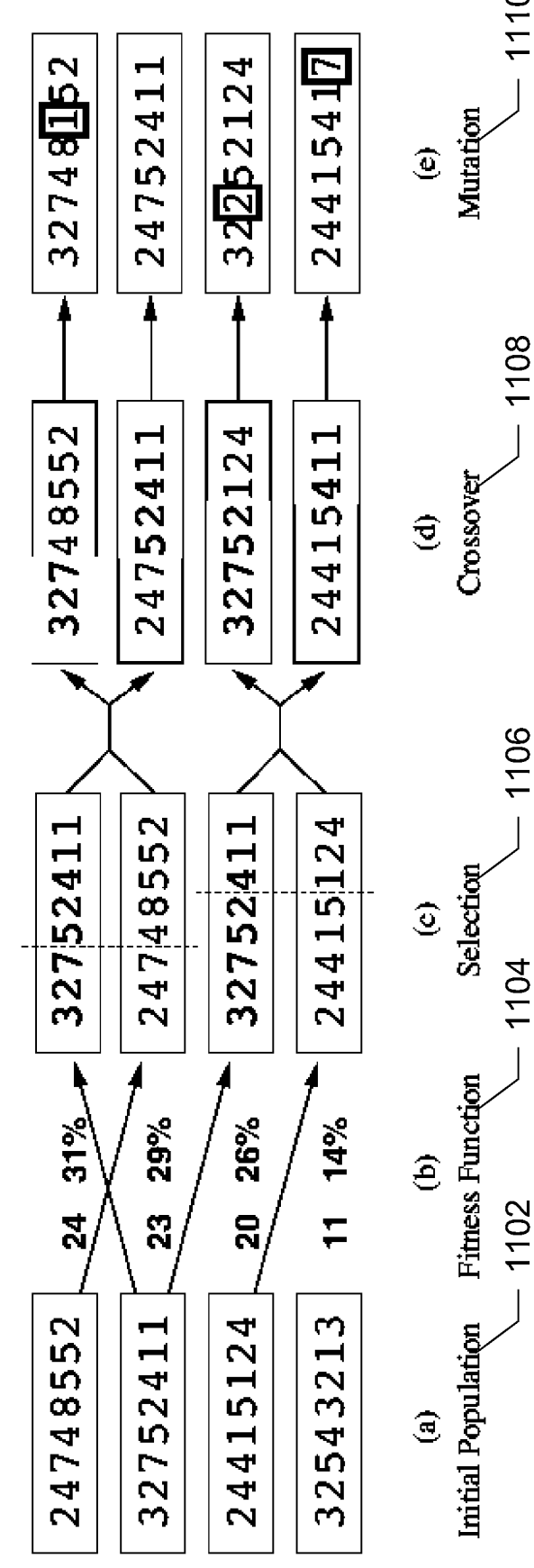
FIG. 11 is an exemplary illustration of a genetic algorithm applied to digit strings, according to embodiments of the present systems and methods.

An exemplary, simple, intuitive, one-dimensional representation of this family of algorithms is shown in FIG. 10. In this example, elevation corresponds to the objective function and the aim is to find the global maximum of the objective function. An example of a genetic algorithm applied to digit strings is shown in FIG. 11. As shown in this example, starting with an initial population 1102, a fitness function 1104 may be applied and a resulting population may be selected 1106. Resulting populations may be comingled using crossover 1108 and mutations 1110 may be applied.

A high level pseudocode example reflecting this approach is given below.

```
START
    Generate the initial population
    Compute fitness
    REPEAT
        Selection
        Crossover
        Mutation
        Compute fitness
    UNTIL population has converged
STOP
```

Another example of a similar genetic algorithm 1200 is shown in FIG. 12. The approach includes an iterative process 1300, shown in FIG. 13. Process 1300 begins with 1302, in which new modeling architectures may be obtained and/or generated based on selection, crossover and mutation. At 1304, the obtained configurations may be trained. At 1306, the surviving configurations may be selected based on how well they perform on a validation set. At 1308, the best architectures at every iteration will mutate to generate new architectures.

There are multiple options in terms of how the genetic algorithm may be implemented. For a deep neural net, an embodiment of a possible approach 1310 is shown in FIG. 13. The goal is to obtain an evolved population of models, each of which is a trained network architecture. At 1310 of process 1300, at each evolutionary step, two models may be chosen at random from the population. At 1312, the fitness of the two models may be compared and the worse model may be removed from population. At 1316, the better model may be chosen to be a parent for another model, through a chosen mechanism, such as mutation, and the child model may be trained. At 1318, the child model may be evaluated on a validation data set. At 1320, the child model may be put back in the population and may be free to give birth to other models in following iterations.

A large set of features may be optimized using genetic algorithms. Although originally genetic algorithms were used to evolve only the weights of a fixed architecture, since then genetic algorithms have been extended also to add connections between existing nodes, insert new nodes, recombine models, insert, or remove whole node layers, and may be used in conjunction with other approaches, such as back-propagation.

Support Vector Machines. In embodiments, Selector Component 448 may train machine learning models for classifying the types of problems in a hierarchical structure. With this approach, the low-level features of the model may be processed and further used for detecting higher level characteristics (in a similar manner to the inner workings of a neural network). The data needed for the training of such models can be created from the corpus of existing research materials and results stored, for example, in History Storage Component 424. and/or World Knowledge Component 430. Machine learning may also be used for automating the task of creating a dataset.

In embodiments, Selector Component 448 may use Support Vector Machine (SVM) processing, which, at its core, represents a quadratic programming problem that uses a separated subset of the training data as support vectors for the actual training.

A support vector machine may construct a hyperplane or set of hyperplanes in a high or infinite dimensional space, which may be used for classification, regression, or other types of tasks. Intuitively, a good separation may be achieved by the hyperplane that has the largest distance to the nearest training data points of any class (so-called functional margin), since in general the larger the margin the lower the generalization error of the classifier.

SVM solves the following problem:

$$\min_{\omega,b,\varsigma} \frac{1}{2}\, \omega^T\omega + C \sum_{i=1}^{n} \varsigma_i$$

$$\text{subject to } y_i\left(\omega^T\phi(x_i) + b\right) \geq 1 - \varsigma_i,$$

$$\varsigma_i \geq 0,\, i = 1, \dots, n$$

for binary training vectors $x_i \in \mathbb{R}^P$ and a vector $y \in \{1, -1\}^n$.

The SVM model may be effective in high dimensional spaces (which gives the possibility of representing the problem formalization in more complex manner), and with smaller data sets (this is important because the existing research corpus has its limits in terms of availability and size). Different approaches may be chosen for multi-class problem classifications ("one against one", "one vs the rest"), and different kernels may also be selected (linear, polynomial, rbf, sigmoid). In embodiments, a set of SVM models may be trained on a dataset that has as its features the problem characteristics and as its labels the solution module's characteristics. This may be done in a hierarchical way, so that different features of the solution may be predicted (model type, model morphology, model parameters, etc.).

The SVM model may take as an input the enhanced dataset and the qualifications for the problem formalization, both of which were constructed in Qualifier (Critic) Component 440 using the History Storage Component 424. and/or World Knowledge Component 430 as primary sources of information.

Bayesian Networks. Embodiments may frame the problem of finding a suitable model for a problem in terms of an agent which tries to find the best action using a belief state in a given environment. Exemplary pseudocode for this formulation is presented below:

```
function DT-AGENT( percept) returns an action
    persistent: belief_state, probabilistic beliefs about the current state of
        the world action, the agent's action
    update belief_state based on action and percept
    calculate outcome probabilities for actions,
        given action descriptions and current belief_state
    select action with highest expected utility
        given probabilities of outcomes and utility information
    return action
```

This brings us to a new perspective, which directly highlights the uncertainty present in the task at hand, through the belief_state. Building on the known Bayesian Rule:

$$P(\text{cause} \mid \text{effect}) = \frac{P(\text{effect} \mid \text{cause})P(\text{cause})}{P(\text{effect})}$$

we can use probabilistic networks for creating a module that is able to handle the uncertainty in the task in a more controlled manner.

A Bayesian network is a statistical model that represents a set of variables and their conditional dependencies. In embodiments, a Bayesian network may represent the probabilistic relationships between input data, situational context and processing objective, and model types and morphologies. The network may be used to compute the probabilities of a model configuration being a good fit for a given problem formulation.

For example, given a problem formulation with two parameters A and B, we can use Bayesian networks to compute what is the probability that model M is a good candidate, given A and B. This may be formulated as shown at 1402 in FIG. 14.

For the simple independent causes network above we can write: p(M,A,B)=p(M|A,B)p(A)p(B). It can be seen in the relationship above, features A and B are independent causes, but become dependent once M is known.

Figure 14:
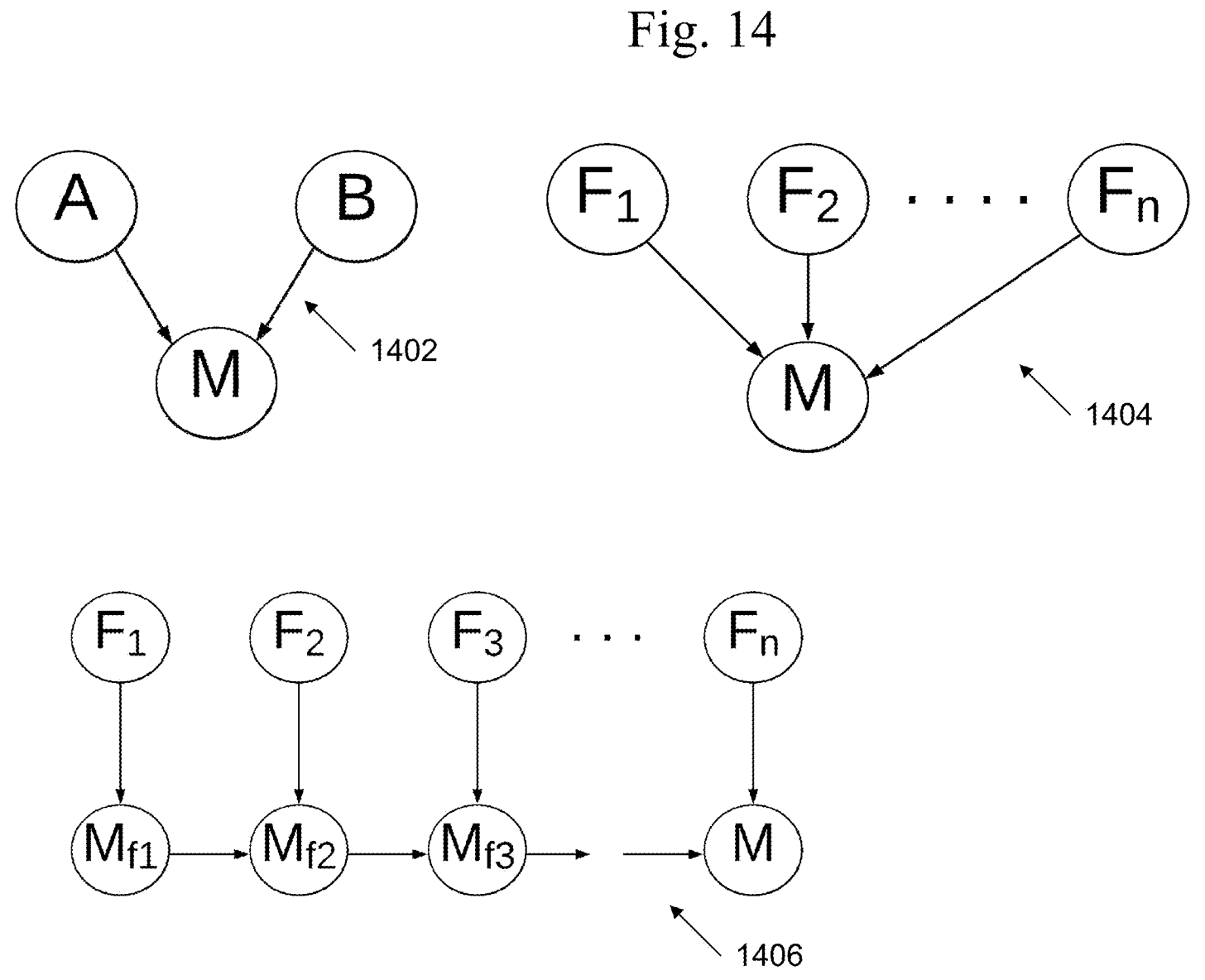

Embodiments may utilize various configurations that can be used for creating the Bayesian belief networks to determine the most appropriate model given the problem formulation features. For example, a converging belief network connection 1404 is shown in FIG. 14. The problem can also be defined as a chain of Mf related variables representing different features of the needed model, each corresponding to a single cause representing different features of the problem formulation, as shown at 1406 in FIG. 14. Network 1406 uses parallel causal independence. In this way, the final state of the model M is dependent on its previous values.

Figure 15:
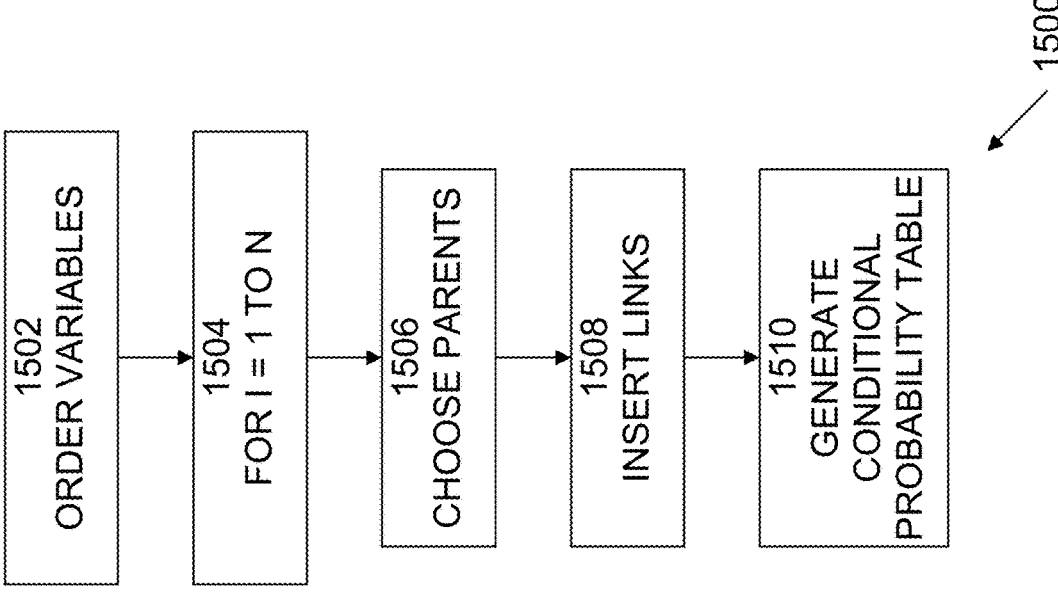
FIG. 15 is an exemplary flow diagram of a process of constructing a Bayesian network, according to embodiments of the present systems and methods.

Embodiments may construct Bayesian Networks using a process 1500, shown in FIG. 15. A mathematical representation is shown below:

$$P(x_1, \ldots, x_n) = P(x_n \mid x_{n-1}, \ldots, x_1)P(x_{n-1}, \ldots, x_1)$$

$$P(x_1, \ldots, x_n) = \prod_{i=1}^{n} P(x_i \mid \text{parents}(X_i))$$

$$P(x_1, \ldots, x_n) = P(x_n \mid x_{n-1}, \ldots, x_1)P(x_{n-1} \mid x_{n-2}, \ldots, x_1) \ldots$$

$$P(x_{n-1} \mid x_{n-2}, \ldots, x_1)$$

-continued $$= \prod_{i=1}^{n} P(x_i \mid x_{i-1}, \ldots, x_1)$$

$$P(X_i \mid X_{i-1}, \ldots, X_1) = P(X_i \mid \text{Parents}(X_i))$$

Process 1500 may determine the set of variables that are required to model the domain. At 1502, the variables $\{X_1, \ldots, X_n\}$ may be ordered such that causes precede effects, for example, according to $P(x_1, \ldots, x_n)=P(x_n|x_{n-1}, \ldots, x_1)P(x_{n-1}, \ldots, x_1)$. At 1504, for i=$_1$ to n, 1506 to 1510 may be performed. At 1506, a minimal set of parents for X i may be chosen, such that $P(X_i|X_{i-1}, \ldots, X_1)=P(X_i|\text{Parents}(X_1))$. At 1508, for each parent, a link may be inserted from the parent to $x_i$. At 1510, a conditional probability table, $P(X_i|\text{Parents}(X_1))$ may be generated.

In order to answer queries on the network, for example, embodiments may use a version of the Enumeration-Ask process 1600, shown in FIG. 16. Likewise, for inference on the network, embodiments may use a different version 1700, shown in FIG. 17.

Exact inference complexity may depend on the type of network, accordingly, embodiments may use approximate inference to reduce complexity. For example, approximate inference processes such as Direct Sampling, Rejection Sampling, and Likelihood Weighting may be used. An example of a Likelihood Weighting process 1800 is shown in FIG. 18.

Instead of generating each sample from scratch, embodiments may use Monte Carlo Markov Chain algorithms, to generate each sample by making a random change to the preceding one. For example, Gibbs Sampling 1900, shown in FIG. 19, is such a starting point approach. A mathematical representation 1902 of Gibbs sampling is also shown.

Embodiments may estimate any desired expectation by ergodic averages—computing any statistic of a posterior distribution using N simulated samples from that distribution:

$$E[f(s)]_p \approx \frac{1}{N}\sum_{i=1}^{N} f\left(s^{(i)}\right)$$

where $\mathcal{P}$ is the posterior distribution of interest, f(s) is the desired expectation, and $f(s^{(i)})$ is the ith simulated sample from $\mathcal{P}$.

Model Combination. For any given situation, Selector 452 may not be constrained to using a single model, but may activate a combination of models for ensemble learning, for example, to minimize bias and variance. Embodiments may use various tools to determine models to combine. For example, embodiments may use cosine similarity, in which the results from different models are represented on a normalized vector space. The general formula for cosine similarity is:

$$\vec{a} \cdot \vec{b} = \|\vec{a}\| \|\vec{b}\| \cos\theta$$

$$\cos\theta = \frac{\vec{a} \cdot \vec{b}}{\|\vec{a}\| \|\vec{b}\|}$$

Accordingly, cos θ may be used as a metric of congruence between different models. However, embodiments may also use less correlated models, which learn different things, to broaden the applicability of the solution.

Application Areas. Embodiments may provide improved flexibility and scalability. For example, embodiments may be adapted for a large array of existing problems, and also extended for new approaches. For example, possible application areas may include, but are not limited to:

Anthropomorphism in Human-Machine Interaction. Personality emulation. There are two facets of anthropomorphism. On the one hand, we can call a system anthropomorphic when it can imitate human characteristics. Due to this capability, embodiments may emulate human personality, according to user preferences, and have, for example, a sarcastic mood or maybe have a very cheerful disposition.

Figure 20:
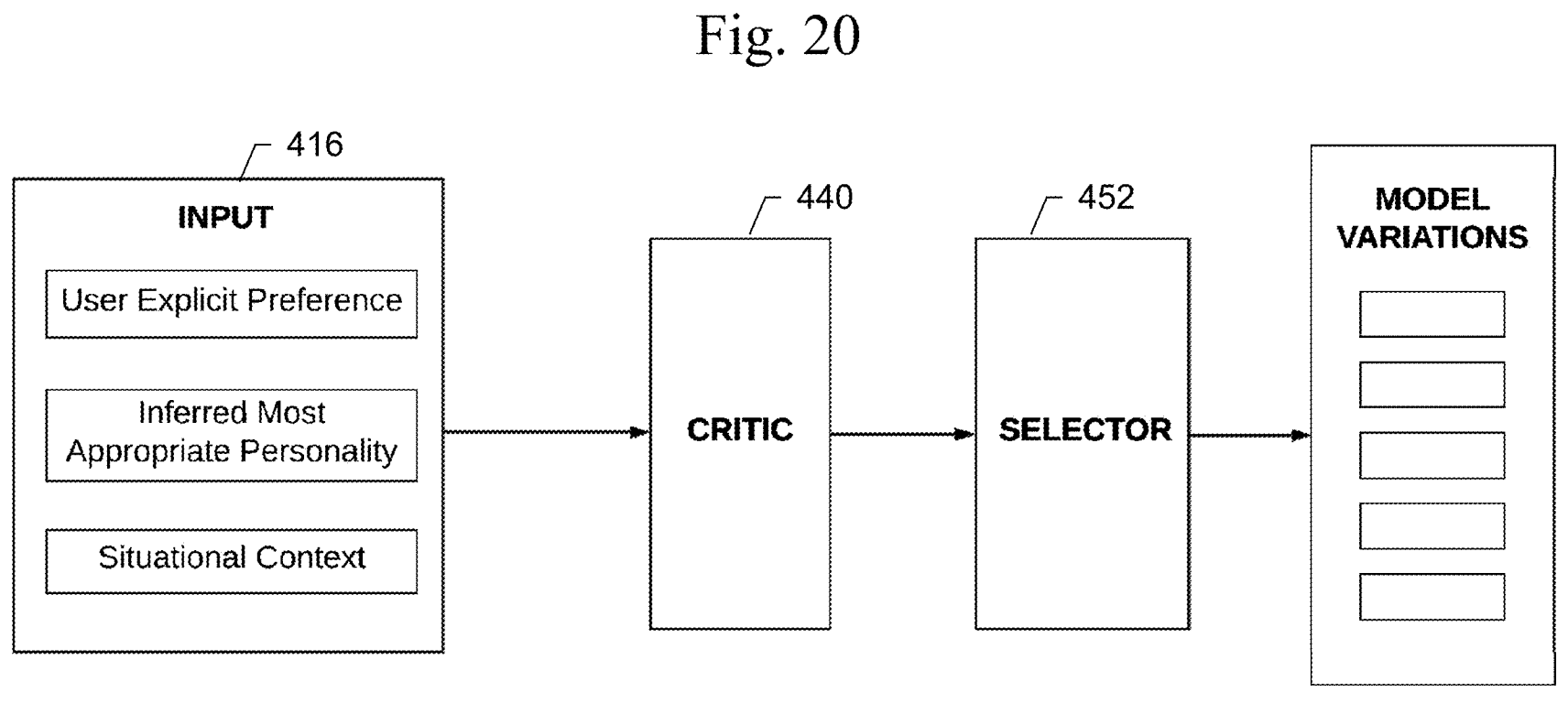

Embodiments may achieve this by having models trained on different datasets to obtain different personality traits in how the system interacts with users. Embodiments may use a critic 440-selector 452 paradigm that will select the best model to be used based on the explicit preference of the user or the inferred most appropriate choice. An example of a critic 440-selector 452 mechanism on a personality layer is shown in FIG. 20.

Emotional intelligence. Embodiments may be anthropomorphic when it adapts to a human's profile. For example, if embodiments act as a learning assistant, they may tailor the content and review methods in a way that best matches the user's learning abilities. For example, when embodiments act as an activity recommender engine, they may adapt recommendations to the user's skills, pace, and time. Embodiments may provide this second type of anthropomorphism by being perceptive about the user's disposition or feelings and adjusting the frequency and type of interaction that is initiated.

Brain Disease Diagnostics and Treatment and Medical Devices for Cognitive Enhancement. Neural modulation solutions for the treatment of neurodegenerative diseases (NDD) may involve the recording of large amounts of data to enable using techniques of machine learning for diagnosing and monitoring of the condition of the brain. Besides their benefit in NDD therapy, neuromodulation techniques may be used for the enhancement of different cognitive functions, such as memory, language, concentration, etc. These tasks may require the processing of large amounts of data employing a variety of AI models. Embodiments may handle these kinds of scenarios as well.

Intention Awareness Manifestation (IAM). Embodiments may provide an intelligent system for the definition, inference and extraction of the user's intent and aims using a comprehensive reasoning framework for determining user intents.

User intent identification becomes significantly important with the increase in technology, the expansion of digital economies and products and diversity in user preferences, which positions a user as a key actor in a system of decisions. Interpretation of such decisions or intent inference may lead to a more open, organized, and optimized society where products and services may be easily adapted and offered based on a forecast of user intent and preferences, such as provided by a recommendation system. Crime and social decay may be prevented using data and intent analysis, such as provided by a prevention system, and the common good may be pursued by optimizing every valuable aspect of user's dynamic lifestyle, such as provided by a lifestyle optimization system. Embodiments may provide these features both at the level of the community and of the individual.

Embodiments of the present systems and methods may be well suited to providing IAM functionality due to the large diversity of data channels and types together with the high complexity and interrelatedness of different ontologies that are involved.

Quantified Self. Quantified self, also known as lifelogging, is a function that tries to incorporate technology into data acquisition on aspects of a person's daily life. People may collect data in terms of electroencephalogram (EEG), electrocardiogram (ECG), breathing monitoring, food consumed, quality of surrounding air, mood, skin conductance, pulse oximetry for blood oxygen level, and performance, whether mental or physical.

The logging of all these parameters results in a large amount of recorded data from which one could really benefit if one can extract meaning through processing the data. Given the diversity of the sensors used and the resulting diversity of the recorded data types, the machine learning models employed for data processing need to be carefully chosen and tuned to enable meaningful results. Embodiments of the present systems and methods may provide a powerful platform that can absorb the input data and automatically find or create the most appropriate model for the given dataset.

The field of quantified self may bring important benefits not only due to the ability of monitoring different aspects of our being but also to the possibility of early disease detection that increases as research in the life sciences progresses.

Automated Manufacturing Systems. Automation in manufacturing can transform the nature of manufacturing employment, and the economics of many manufacturing sectors. Embodiments of the present systems and methods may contribute to the new automation era: rapid advances in robotics, artificial intelligence, and machine learning to enabling machines to match or outperform humans in a range of work activities, including ones requiring cognitive capabilities. Industries can use automation provided by embodiments to address a number of opportunities, including increasing throughput and productivity, eliminating variation, and improving quality, improving agility, and ensuring flexibility, and improving safety and ergonomics.

Energy Management. By implementing autonomous reasoning in energy systems, improvements can be achieved to the efficiency, flexibility, and reliability of a site energy by analyzing, monitoring, and managing a site and associate optimization priorities over time. Embodiments may provide a customer-centric energy system providing improved energy efficiency, cost minimization and reduced $CO_2$ emissions.

Transportation. Embodiments may provide features for automated and connected vehicle technologies and for the development of autonomous cars, connected cars, and advanced driver assistance systems. Embodiments may be applied to autonomous connected vehicles, where vehicles that use multiple communication technologies to communicate with the driver, such as to other cars on the road (vehicle-to-vehicle [V2V]), roadside infrastructure (vehicle-to-infrastructure [V2I]), and the "Cloud" [V2C]. Embodiments may be used to not only improve vehicle safety, but also to improve vehicle efficiency and commute times and facilitate autonomy in use.

Infrastructure. Data Service. A data Processing Service may be responsible for collecting data from different input channels 402, decompressing the data, if necessary, and storing it for later use.

There may be a large number of data channels 402 that send data to system 400. Embodiments may store such data on the Cloud, providing a need for high scalability in recording this data, as well the capability to store a large amount of data.

There are different technologies which can support this. For example, embodiments may use those that provide the constant increase of inputs and high parallelism of incoming data and may be based on the Publish/Subscribe Paradigm. In this specific case of data processing, the inputs may act as data publishers while the system 400, which processes the data, may act as a subscriber.

Figure 21:
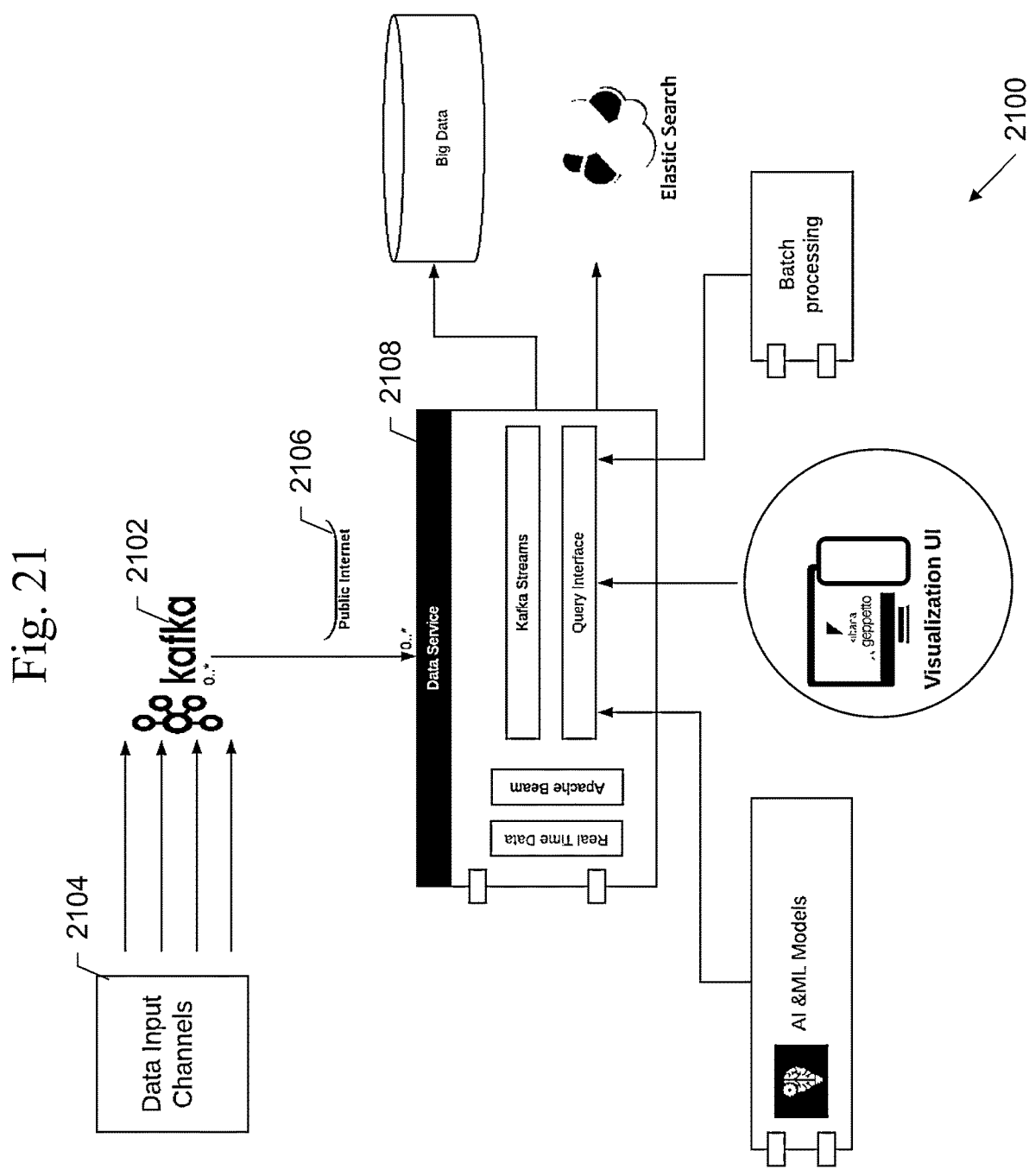
FIG. 21 is an exemplary block diagram of Data ingestion and data processing, according to embodiments of the present systems and methods.

An exemplary embodiment 2100 of architecture and the components that may provide data ingestion and data processing is shown in FIG. 21. This architecture and the components are merely examples. Embodiments may utilize other architectures and components as well.

As shown in the example of FIG. 21, embodiments may include, stream-processing software 2102, such as Apache Kafka, for data streaming and ingestion. Stream-processing software 2102 may provide real-time data pipelines and streaming apps, and may be horizontally scalable, fault-tolerant, and very fast.

Data coming from different input channels 2104 may be distributed for processing over, for example, the Internet 2106, to Data Processing Service 2108, which may be implemented in the Cloud. Embodiments may deploy Data Processing Service 2108 in one or more nodes.

Embodiments may be implemented using, for example, Apache Kafka Security with its versions TLS, Kerberos, and SASL, which may help in implementing a highly secure data transfer and consumption mechanism.

Embodiments may be implemented using, for example, Apache Kafka Streams, which may ease the integration of proxies and Data Processing Service 2108.

Embodiments may be implemented using, for example, Apache Beam, which may unify the access for both streaming data and batch processed data. It may be used by the real time data integrators to visualize and process the real time data content.

Embodiments may utilize a high volume of data and may have large data upload and retrieval performance requirements. Embodiments may use a variety of database technologies, such as OpenTSDB ("OpenTSDB—A Distributed, Scalable Monitoring System"), Timescale ("OpenTSDB—A Distributed, Scalable Monitoring System", "Timescale|an Open-Source Time-Series SQL Database Optimized for Fast Ingest, Complex Queries and Scale"), BigQuery ("Big-Query—Analytics Data Warehouse|Google Cloud"), HBase ("Apache HBase—Apache HBase™ Home"), HDF5 ("HDF5®—The HDF Group"), etc.

Embodiments may be implemented using, for example, Elasticsearch, which may be used as a second index to retrieve data based on different filtering options. Embodiments may be implemented using, for example, Geppetto UI widgets, which may be used for visualizing resources as neuronal activities. Embodiments may be implemented using, for example, Kibana, which is a charting library that may be used on top of Elasticsearch for drawing all types of graphics: bar charts, pie charts, time series charts etc.

Implementation Languages. Embodiments may be implemented using a variety of computer languages, examples of which are shown in FIG. 4. For example, Problem Formalization component 416 may be implemented using Scala, Haskell, and/or Clojure, Qualifier (Critic) component 446 may be implemented using Julia and/or C++, Planner component 446 may be implemented using C++ and/or Domain Specific Languages, Selector component 452 may be implemented using Python and C++, Parallel Executor component

448 may be implemented using Erland and/or C++, Module Scheduler component 454 may be implemented using C++, Solution Processor component 456 may be implemented using C++.

World Knowledge: may be implemented using Scala, Haskell, and/or Clojure, History Knowledge component 424 may be implemented using Scala, Haskell, and/or Clojure, Infrastructor component 475 may be implemented using C++.

Implementation Details. Embodiments may be deployed, for example, on three layers of computing infrastructure: 1) a sensors layer equipped with minimal computing capability may be utilized to accommodate simple tasks (such as average, minimum, maximum), 2) a gateway layer equipped with medium processing capability and memory may be utilized to deploy a pre-trained neural network (approximated values), and 3) a cloud layer possessing substantial processing capability and storage may be utilized to train the models and execute complex tasks (simulations, virtual reality etc.).

Embodiments may employ a diverse range of approximation methods, such as Parameter Value Skipping, Loop Reduction and Memory Access Skipping or others greatly facilitation reduction in complexity and adaptation for non-cloud deployment, such as the gateway layer. The entire processing plan may also utilize techniques from Software Defined Network Processing, Edge Computing Techniques, such as Network Data Analysis and History Based Processing Behaviors Learning using Smart Routers.

In embodiments, the three layer computing infrastructure (cloud, gateway, sensors) may provide flexibility and adaptability for the entire workflow. To provide the required coordination and storage, cloud computing may be used. Cloud Computing is a solution which has been validated by a community of practice as a reliable technology for dealing with complexity in workflow.

In addition to the cloud layer, embodiments may utilize Fog/Edge Computing techniques for the gateway layer and sensors layer to perform physical input (sensors) and output (displays, actuators, and controllers). Embodiments may create small cloud applications, Cloudlets, closer to the data capture points, or nearer to the data source and may be compared with centralized Clouds for determining benefits in terms of costs and quality-of-results. By nature, these cloudlets may be nearer to the data sources and thus minimize network cost.

This method will also enable the resources to be used more judiciously, as idling computing power (CPUs, GPUs, etc.) and storage can be recruited and monetized. These methods have been validated in Volunteer Computing which has been used primarily in academic institutions and in community of volunteers (such as BOINC).

For example, in embodiments, Solution Processor component 456, which runs the solution modules, may be mapped to 3 different layers: (i) sensors layer (edge computing), (ii) gateway layers (in-network processing) and (iii) cloud layer (cloud processing). Starting with sensors layer, the following two layers (gateway layers and cloud layers) may add more processing power but also delay to the entire workflow, therefore depending on task objectives, different steps of the solution plan can be mapped to run on different layers.

Edge Computing implies banks of low power I/O sensors and minimal computing power; In-Network Processing can be pursued via different gateway devices (Phones, Laptops, GPU Routers) which offer medium processing and memory capabilities; Cloud Computing may provide substantial computation and storage.

In embodiments, the learning modules may be optimized for the available computing resources. If computing clusters are used, models may be optimized for speed, otherwise, a compromise between achieving an higher accuracy and computing time may be made.

Figure 23:
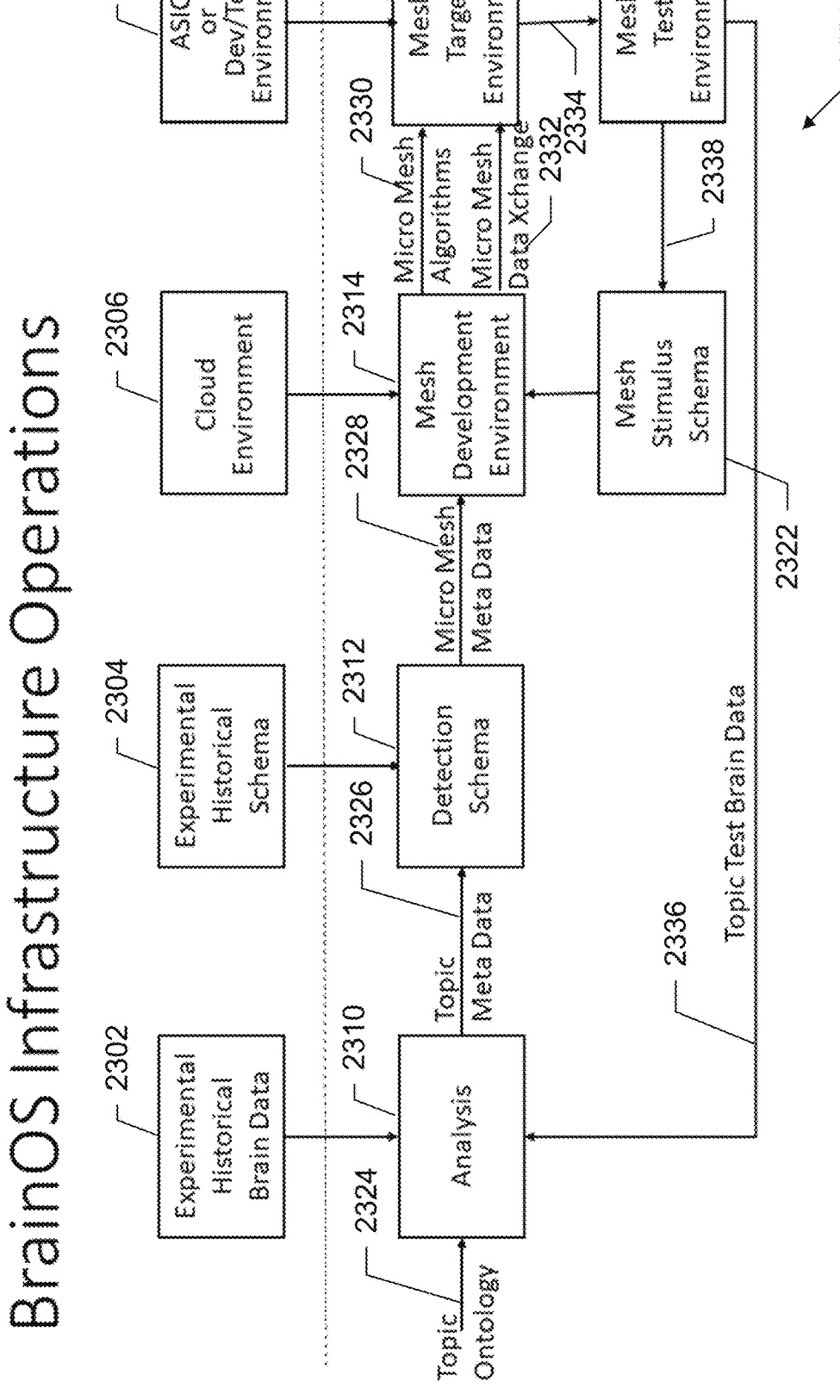
FIG. 23 is an exemplary data flow diagram of a Brain Operating System infrastructure operations, according to embodiments of the present systems and methods.

An exemplary data flow diagram of Brain Operating System infrastructure operations 2300 is shown in FIG. 23. As shown in this example, infrastructure 2300 may include data sources, such as experimental historical brain data 2302, experimental historical schemas 2304, data from the cloud environment 2306, and data from an Application-Specific Integrated Circuit (ASIC) development and/or test environment or other development and/or test environment 2308. Experimental historical brain data 2302 may include data obtained from brain experiments on patients and/or test subjects, including humans and/or animals, such as EEG and/or other brain data. Experimental historical schemas 2304 may include data schemas for organizing and/or categorizing experimental historical brain data 2302. Data from the cloud environment 2306 may include any publicly and/or privately available data that may be obtained that may be relevant to the analysis being performed. Such data may be obtained from private or proprietary databases and/or from public databases, such as may be accessed over the Internet. Data from an Application-Specific Integrated Circuit (ASIC) development and/or test environment or other development and/or test environment 2308 may include data obtained from ASIC or other hardware development and/or test activities, as well as from related or independent software development and/or test activities.

As shown in this example, infrastructure 2300 may further include processing blocks, such as analysis block 2310, detection schema 2312, mesh development environment 2314, mesh target environment 2318, mesh test environment 2320, and mesh stimulus schema 2322. Analysis block 2310 may receive data, such as topic ontology data 2324 and experimental historical brain data 2302, and analyze the received data to generate topic metadata 2326. Detection schema 2312 may receive data, such as generated topic metadata 2326 and experimental historical schemas 2304, and analyze the received data to generate Micro Mesh metadata 2328. Mesh development environment 2314 may receive data, such as generated Micro Mesh metadata 2328 and data from cloud environment 2306, and analyze the received data to generate Micro Mesh algorithms 2330 and Micro Mesh data exchange 2332. Mesh target environment 2318 may receive data, such as generated Micro Mesh algorithms 2330 and Micro Mesh data exchange 2332, and data from Application-Specific Integrated Circuit (ASIC) development and/or test environment or other development and/or test environment 2308, and analyze the received data to generate hardware and/or software design configuration 2334. Mesh test environment 2320 may receive data, such as hardware and/or software design configuration 2334, may test the operation and functionality of the received design configuration and may generate topic test brain data 2336 and data relating to the operation and functionality of the received design 2338. Mesh stimulus schema 2322 may receive data relating to the operation and functionality of the received design 2338 and may generate stimulus data to be input to mesh development environment 2314 to ultimately modify the software design configuration 2334. Mesh test environment 2320 may receive data, such as hardware and/or software design configuration 2334 to improve functionality and performance. Likewise, analysis block 2310 may receive data, such as generated topic test brain data 2336 to improve functionality and performance of the ultimate design.

Figure 24:
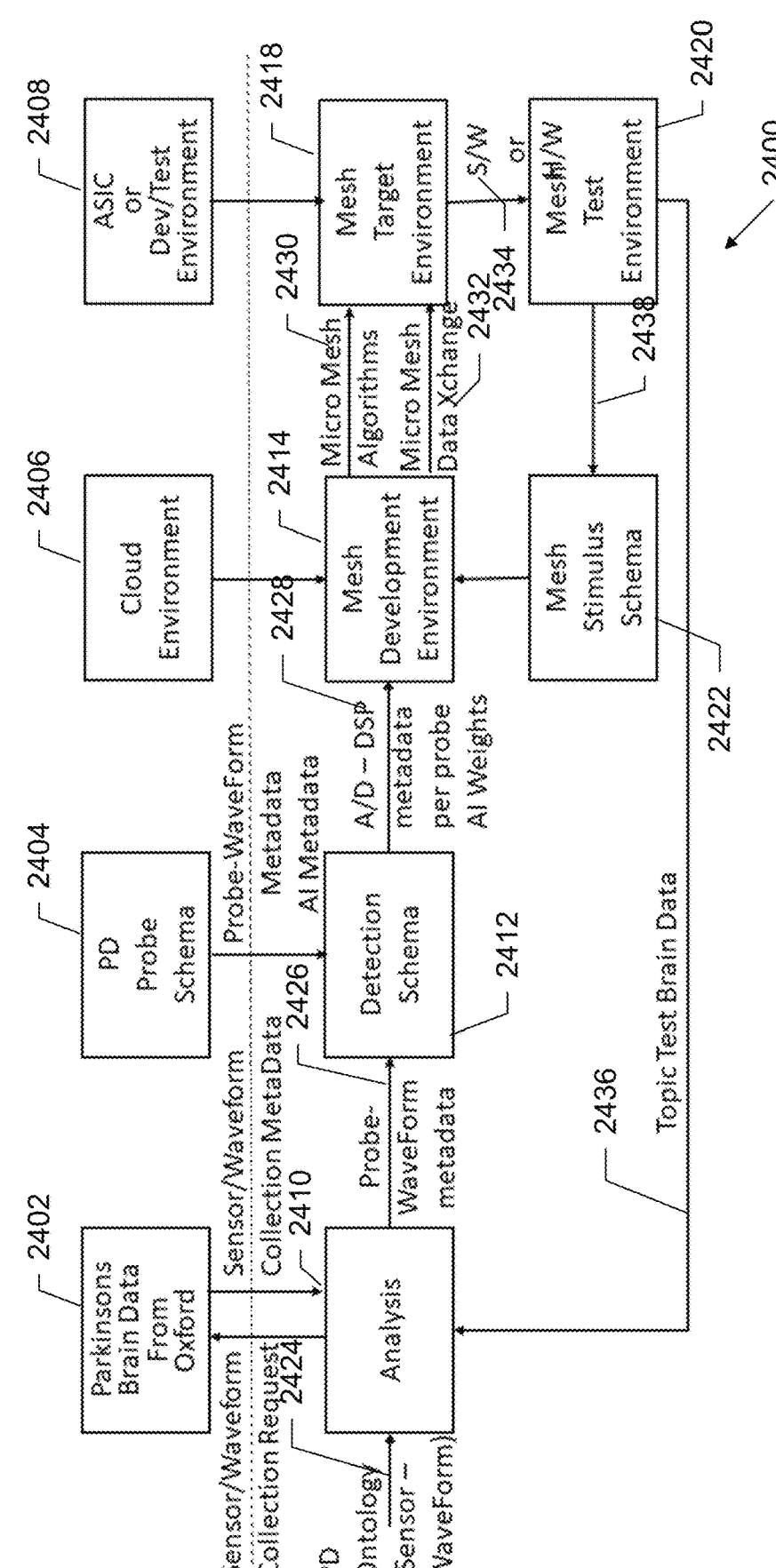
FIG. 24 is an exemplary use case diagram of a Brain Operating System infrastructure, according to embodiments of the present systems and methods.

An exemplary use case 2400 of BrainOS Infrastructure 2300, shown in FIG. 23, is shown in FIG. 24. As shown in this example, exemplary use case 2400 of infrastructure 2300 may include experimental historical brain data 2302, such as Parkinson's Disease brain data 2402 from, for example, Oxford University, experimental historical schemas 2304, such as Parkinson's Disease probe schema 2404, data from the cloud environment 2406, and data from an Application-Specific Integrated Circuit (ASIC) development and/or test environment or other development and/or test environment 2408. Exemplary use case 2400 of infrastructure 2300 may further include analysis block 2410 that may receive data, such as Parkinson's Disease ontology data 2424, may send a sensor/waveform collection request to Parkinson's Disease brain data 2402 and receive and sensor/ waveform collection metadata in response, and analyze the received data to generate probe-waveform metadata 2426. Detection schema 2412 may receive data, such as generated probe-waveform metadata 2426 and probe-waveform metadata and/or Artificial Intelligence (AI) metadata from Parkinson's Disease probe schema 2404, and analyze the received data to generate Analog to Digital (A/D) and Digital Signal Processing (DSP) metadata 2428, which may include per probe data and AI weights. Mesh development environment 2414 may receive data, such as generated A/D and DSP metadata 2428 and data from cloud environment 2406, and analyze the received data to generate Micro Mesh algorithms 2430 and Micro Mesh data exchange 2432. Mesh target environment 2418 may receive data, such as generated Micro Mesh algorithms 2430 and Micro Mesh data exchange 2432, and data from Application-Specific Integrated Circuit (ASIC) development and/or test environment or other development and/or test environment 2408, and analyze the received data to generate hardware and/or software design configuration 2434. Mesh test environment 2420 may receive data, such as hardware and/or software design configuration 2434, may test the operation and functionality of the received design configuration and may generate topic test brain data 2436 and data relating to the operation and functionality of the received design 2438. Mesh stimulus schema 2422 may receive data relating to the operation and functionality of the received design 2438 and may generate stimulus data to be input to mesh development environment 2414 to ultimately modify the software design configuration 2434. Mesh test environment 2420 may receive data, such as hardware and/or software design configuration 2434 to improve functionality and performance. Likewise, analysis block 2410 may receive data, such as generated topic test brain data 2436 to improve functionality and performance of the ultimate design.

In exemplary use case 2400, Electro-encephalogram (EEG) data may be used. Such data may, for example, be provided from Parkinson's Disease brain data 2402 using, for example a database structure. Such a database structure may include, for example, data representing each (anonymized) test, the synchronized timing of the reading, the time at which the EEG data, such as Neurosky data, was obtained, sensor including the trial number, sensor position, sample number (0-255), and sensor value (in micro volts), attention level data, meditation level data, EEG amplitude data, such as amplitude in the 8 commonly-recognized types of EEG frequency bands—delta (0.5-2.75 Hz), theta (3.5-6.75 Hz), low-alpha (7.5-9.25 Hz), high-alpha (10-11.75 Hz), lowbeta (13-16.75 Hz), high-beta (18-29.75 Hz), low-gamma (31-39.75 Hz), and mid-gamma (41-49.75 Hz), raw sample values acquired by the sensor, at a sampling rate of, for example, 512 Hz, signal quality data, task data, such as the task that the subject was doing at the time of the recording, etc.

Figure 25:
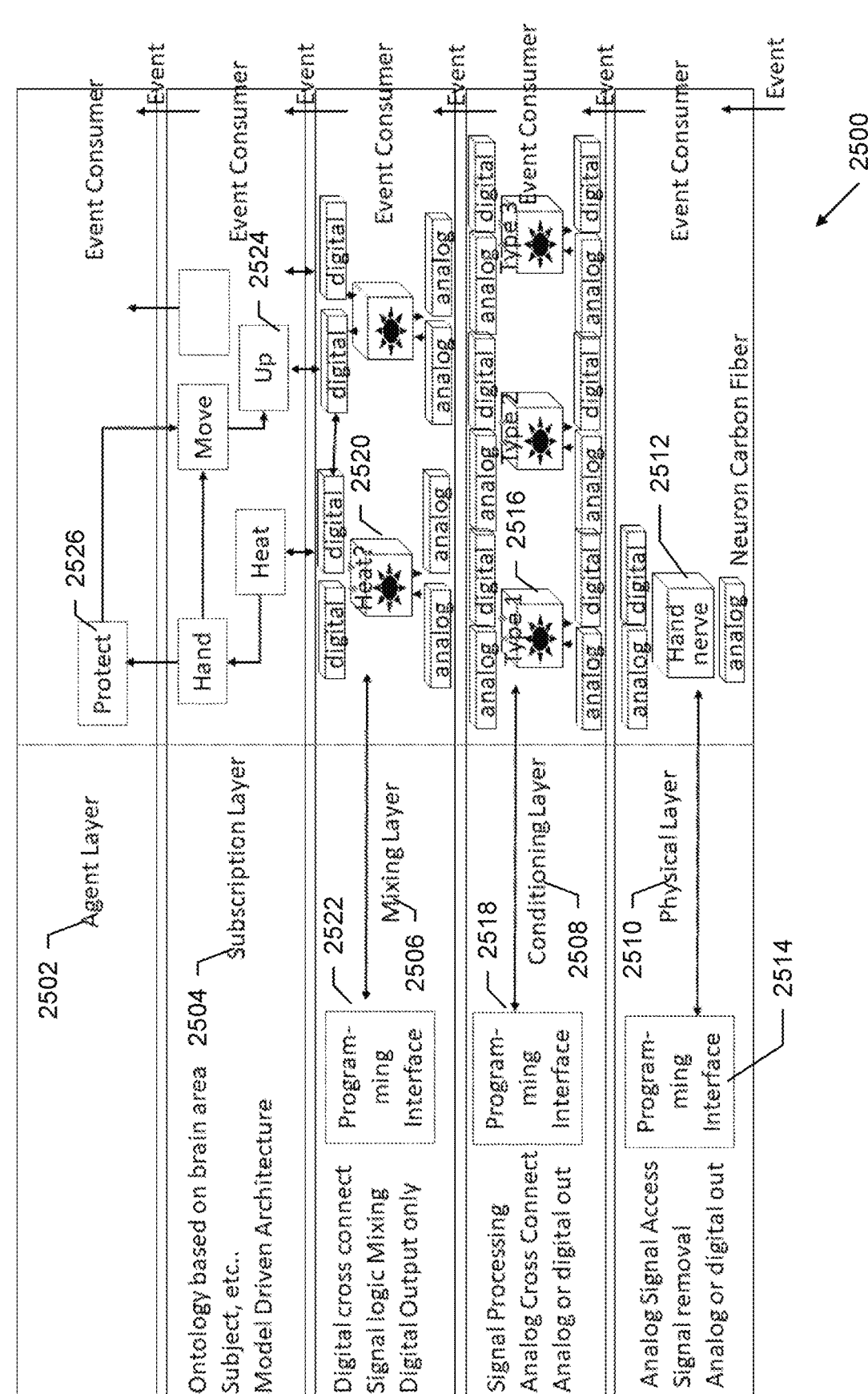
FIG. 25 is an exemplary block diagram of a processing model that may be implemented in the Brain Operating System infrastructure, according to embodiments of the present systems and methods.

An exemplary block diagram of a processing model 2500 that may be implemented in the infrastructure shown in FIG. 23 is shown in FIG. 25. Processing model 2500 may include a plurality of processing layers, such as agent layer 2502, subscription layer 2504, mixing layer 2506, conditioning layer 2508, and physical layer 2510. For example, physical layer 2510 may include hardware and software 2512, for example, hand/nerve sensors, such as neuron carbon fibers, and A/D, D/A, and D/D interfaces. Physical layer 2510 may include a programming interface 2514 to configure the functionality of hardware and software 2512. Physical layer 2510 may perform processing such as analog signal access and signal removal, and may provide analog and/or digital signal output. Conditioning layer 2508 may include multiple instances of hardware and software 2516, such as different types of hardware and software processing, and A/D, D/A, and D/D interfaces. Conditioning layer 2508 may include a programming interface 2518 to configure the functionality of hardware and software 2516. Conditioning layer 2508 may perform processing such as signal processing and analog signal cross connect, and may provide analog and/or digital signal output. Mixing layer 2506 may include multiple instances of hardware and software 2520, such as different types of hardware and software processing, and A/D, D/A, and D/D interfaces. Mixing layer 2506 may include a programming interface 2522 to configure the functionality of hardware and software 2520. Mixing layer 2506 may perform processing such as digital signal cross connect and signal logic mixing, and may provide digital signal output. Subscription layer 2504 may include digital hardware and software 2524 to implement a model driven architecture to perform ontology processing based on parameters such as brain area, subject, etc. Agent layer 2502 may include digital hardware and software 2526 to provide system input and output to users.

Figure 26:
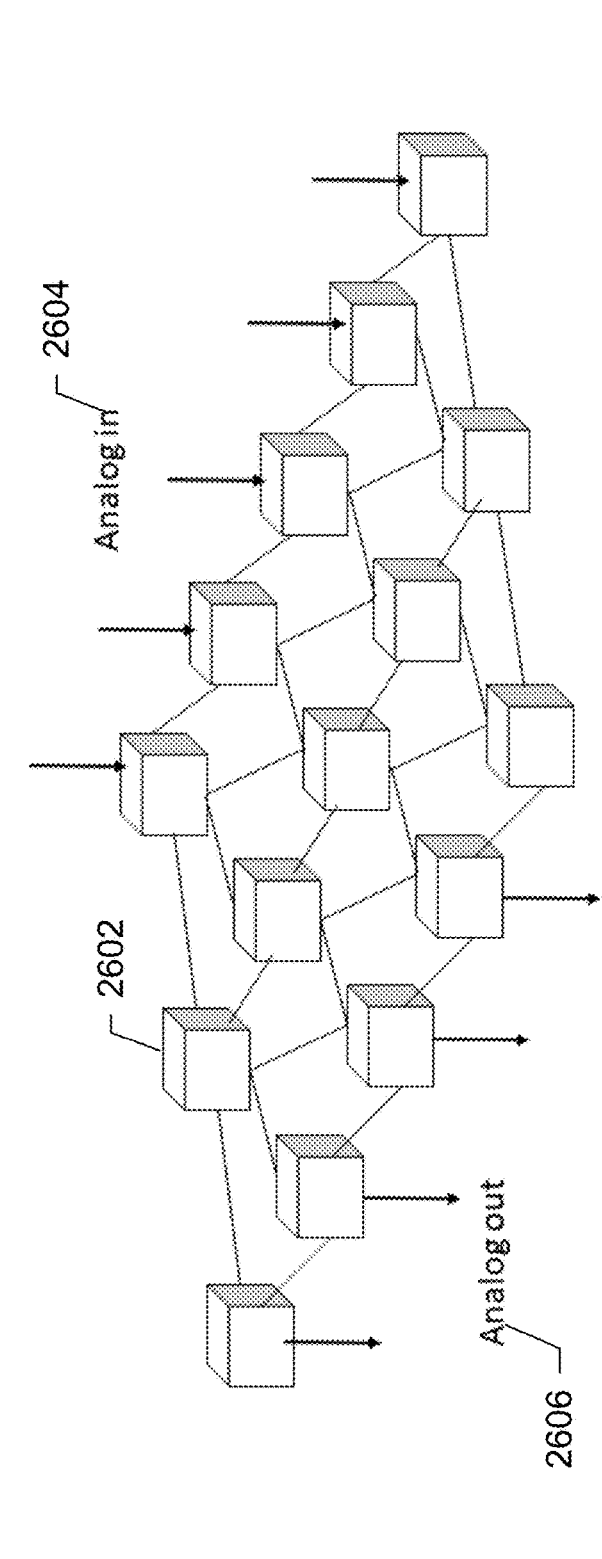
FIG. 26 is an exemplary block diagram of a network of micro-applications, according to embodiments of the present systems and methods.

An exemplary block diagram of a network 2600 of micro-applications is shown in FIG. 26. Network 2600 may include a mesh of small applications or micro-applications 2602. Each micro-application 2602 may interface with a plurality of other micro-applications 2602. Interfaces between micro-applications 2602 may be digital signals or digital representations of analog signals, except at the edges. At the edges, which are the interfaces into and out of network 2600, the input interfaces may be analog in 2604, while the output interfaces may be analog out 2606. Each micro-application may be hardware, software, or a combination of hardware and software.

Figure 27:
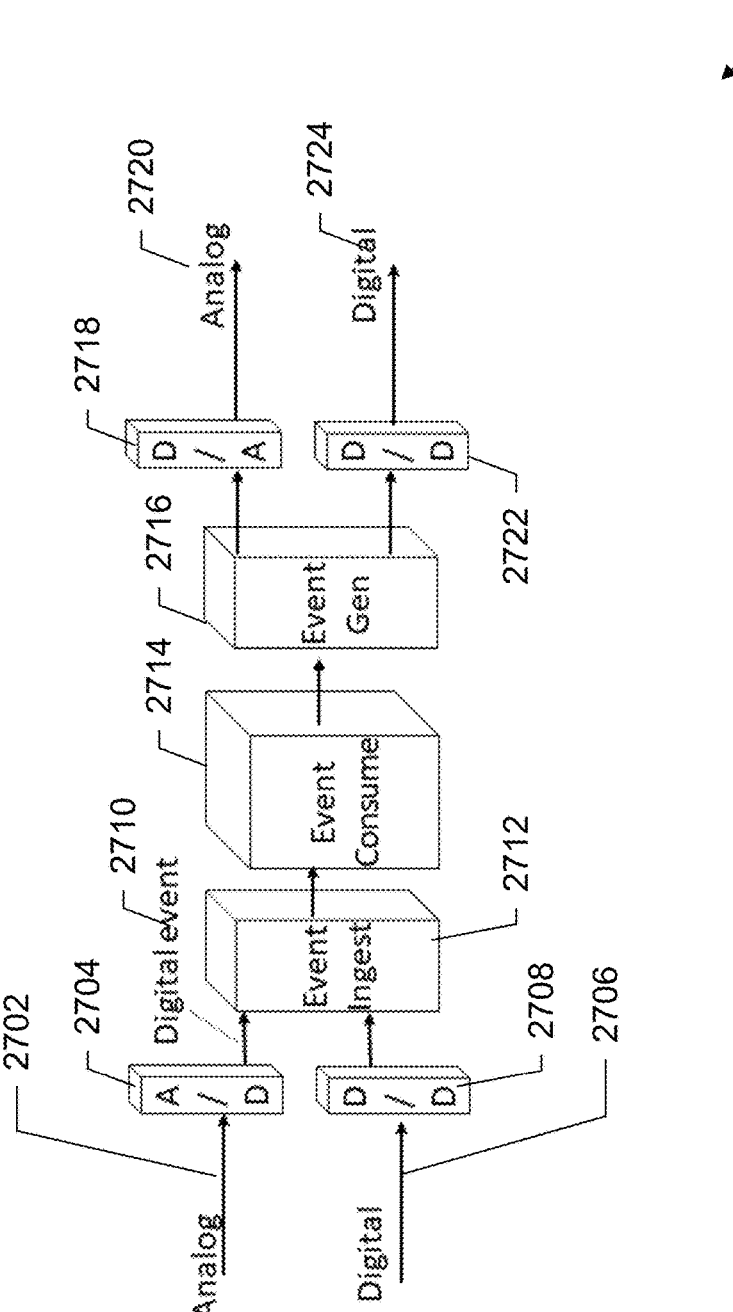
FIG. 27 is an exemplary block diagram of a of micro-application, according to embodiments of the present systems and methods.

Further, each micro-application may have different patterns, or each micro-application may have the same pattern, as shown in the example of FIG. 27. In this example, each micro-application 2700 may have the same pattern, that is, the same components and arrangement of components. In this example, micro-application 2700 may include an analog input 2702 to an A/D converter 2704 and a digital input 2706 to a digital to digital (D/D) interface 2708, each of which may generate digital events 2710. Typically analog input 2702 may be used to receive analog signals at edges of the network of micro-applications, while digital inputs 2706 may be used to receive digital data from other micro-applications. Digital events 2710 may be input to event ingest block 2712, which may receive digital events and process and format the events for consumption by event consume block 2714. Event consume block 2714 may process the event to obtain the relevant information from the event, as well as to perform any computations, algorithms, storage, retrieval, etc. needed to process the event. Based on the results of event consumption from event consume block 2714, event generation block 2716 may generate another event to be output from micro-application 2700 to other micro-applications or out of the network of micro-applications. Digital data representing generated analog events may be sent to digital to analog converter (D/A) 2718, which may output an analog signal representing the analog event on analog output 2720. Digital data representing generated digital events may be sent to D/D interface 2722, which may output a digital signal representing the digital event on digital output 2722. Typically analog outputs 2720 may be used to transmit analog signals at edges of the network of micro-applications, while digital outputs 2724 may be used to transmit digital data to other micro-applications.

Types of processing that may be performed by network 2600 including a plurality of micro-applications 2700 may include:

Simple event processing. An event may immediately trigger an action in the consumer. For example, Azure Functions may be used with a Service Bus trigger, so that a function executes whenever a message is published to a Service Bus topic. Simple event processing may be applicable at the mixing, subscription, and agent layers described above. Here the events are less frequent, say 500 per second. Consumers may respond to only one, and messaging may occur for the event. This may allow consumers to subscribe to multiple topics.

Complex event processing. A consumer may process a series of events, looking for patterns in the event data, using a technology such as Azure Stream Analytics or Apache Storm. For example, readings from an embedded device may be aggregated over a time window, and may generate a notification if the moving average crosses a certain threshold. Complex event processing may be used between a sensor and a human-worn processor and between the human-worn processor and the back end processing. These functions may be tiered and may need to analyze streams of data for patterns. The output of Digital signal processing of A/D complex events may be a stream, then a topic micro-service may pick it up for processing.

Event stream processing. A data streaming platform, such as Azure IoT Hub or Apache Kafka, may be used as a pipeline to ingest events and feed them to stream processors. The stream processors may act to process or transform the stream. There may be multiple stream processors for different subsystems of the application. This approach is a good fit for IoT workloads. Event stream processing may be good for A/D digital streams. Here the A/D converter may output a 10 bit digital value every 60th of a second. Each is an event that is ingested for preprocessing. This may be a low level, tightly coupled to memory application best suited for HSPC VM clusters with DMA Flash memory, or a tightly coupled hardware platform that has been developed.

Figure 28:
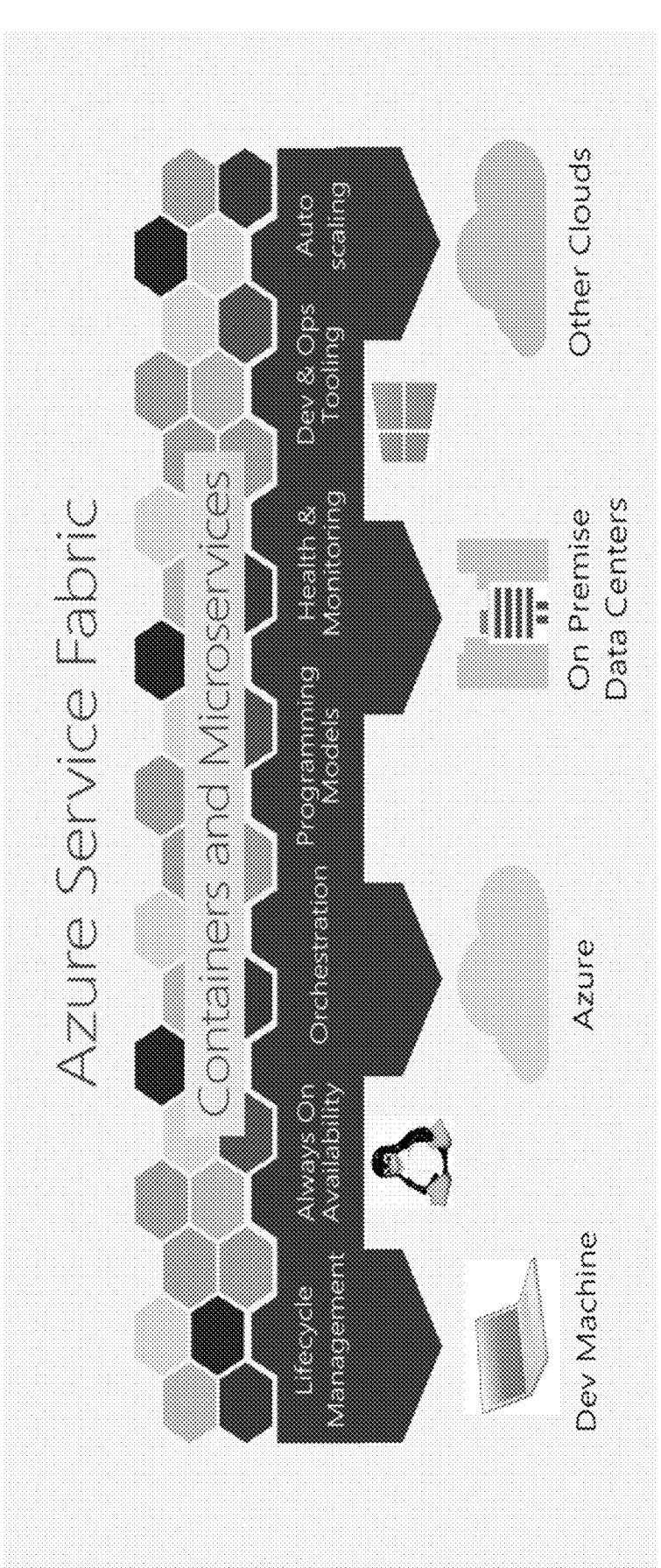
FIG. 28 is an exemplary block diagram of a service fabric, according to embodiments of the present systems and methods.

An exemplary block diagram of a service fabric 2800 that may be used to provide the processing described herein is shown in FIG. 28. In this example, an Azure service fabric, such as may be provided by MICROSOFT® or others is shown. As described by MICROSOFT®, Azure Service Fabric is a distributed systems platform that makes it easy to package, deploy, and manage scalable and reliable microservices and containers. Service Fabric also addresses the significant challenges in developing and managing cloud native applications.

Service Fabric is a container orchestrator for deploying and managing microservices across a cluster of machines, benefiting from the lessons learned running services at massive scale. Service Fabric can deploy applications in seconds, at high density with hundreds or thousands of applications or containers per machine. With Service Fabric, you can mix both services in processes and services in containers in the same application.

Service Fabric provides a sophisticated, lightweight run-time that supports stateless and stateful microservices. A key differentiator of Service Fabric is its robust support for building stateful services, either with Service Fabric built-in programming models or containerized stateful services.

Service Fabric provides support for the full application lifecycle and CI/CD of cloud applications including containers: development through deployment, daily monitoring, management, and maintenance, to eventual decommissioning. Service Fabric is integrated with CI/CD tools such as Azure Pipelines, Jenkins, and Octopus Deploy and can be used with any other popular CI/CD tool.

You can create clusters for Service Fabric in many environments, including Azure or on premises, on Windows Server or Linux. You can even create clusters on other public clouds. The development environment in the Service Fabric SDK is identical to the production environment, with no emulators involved. In other words, what runs on your local development cluster is what deploys to your clusters in other environments.

A key differentiator of Service Fabric is its strong focus on building stateful services. You can use the Service Fabric programming model or run containerized stateful services written in any language or code. You can create Service Fabric clusters anywhere, including Windows Server and Linux on premises and other public clouds, in addition to Azure.

An exemplary block diagram of a system 2900 in which the processing described herein may be implemented is shown in FIG. 29. System 2900 may include sensors 2902, such as EEG sensors providing brain wave signals, sensor input processing 2904, such as A/D converters digitizing the brain wave signals and logic, such as may be implemented in a Field Programmable Gate Array (FPGA) or other hardware or software, an IoT hub 2906, such as an Azure IoT hub, to provide a cloud-hosted solution back end to connect virtually any device, stream analytics 2908, such as Azure stream analytics, to provide real-time analytics service such as an end-to-end serverless streaming pipeline, a micro-application or micro-mesh network 2910, such as an Azure micro-mesh, to provide micro-application processing as described above, which may include, for example, Python apps 2912 and Azure functions 2914, to provide programmable processing, a messaging service 2916, such as Azure service bus, to provide messaging services, and message processing 2918, such as Azure topics.

Figure 30:
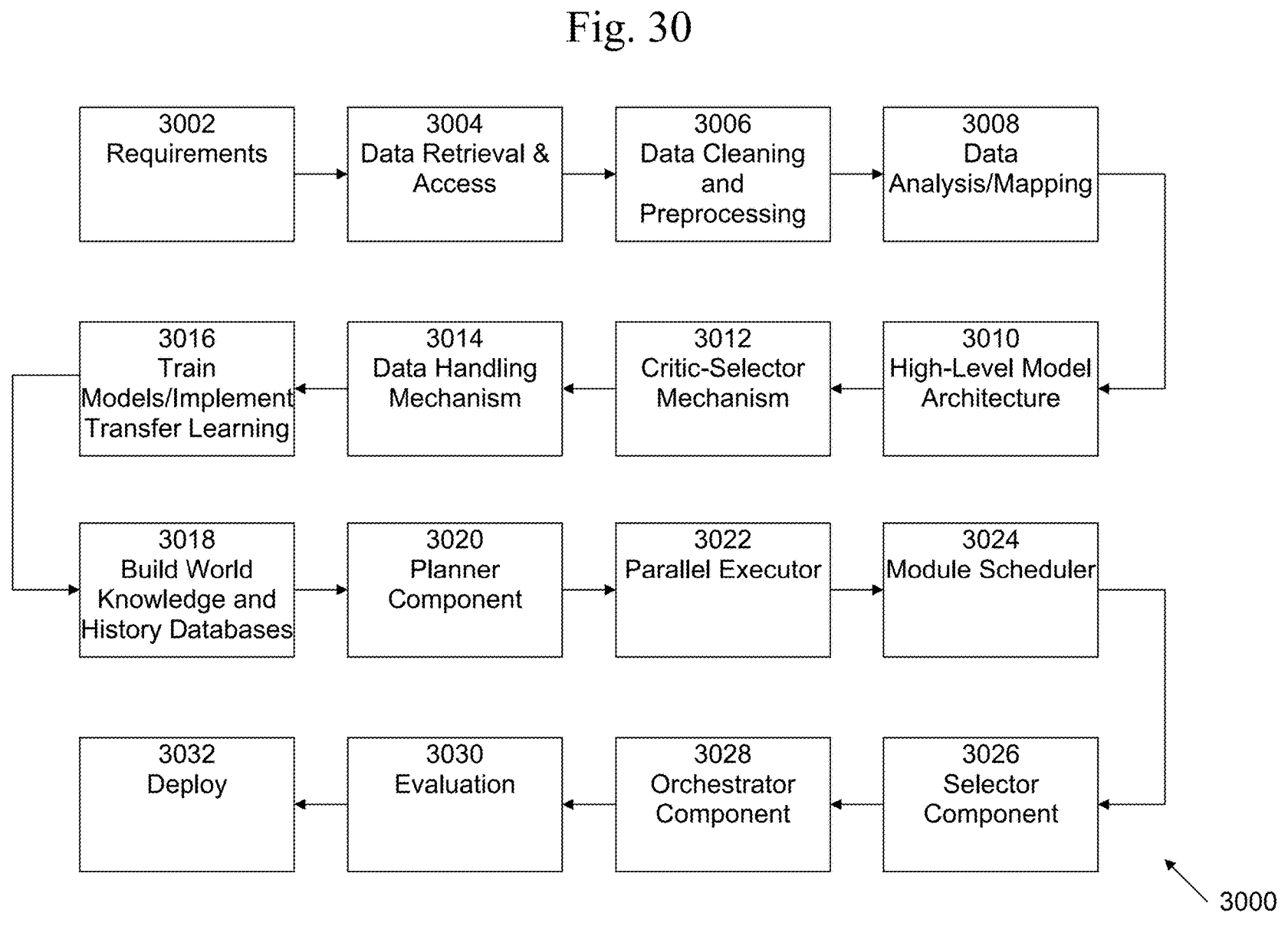

An exemplary process 3000 of Telecommunications System Fault Detection in accordance with embodiments of the present invention is shown in FIG. 30. Process 3000 begins with 3002, in which the requirements for the system and specifications of different data types, faults, failures, and existing systems, etc. may be determined. Further, a systems and infrastructure survey may be used to define and capture the requirements.

At 3004, Data Retrieval & Access may be performed. An organization may upload the performance management and fault management data to an infrastructure, such as Oracle's secure cloud infrastructure, including Oracle Object Storage and Autonomous Data Warehouse. Security protocols may be implemented to ensure data integrity and security.

At 3006, Data Cleaning and Preprocessing may be performed. Here, the data may be cleaned by filtering out irrelevant information, rectifying errors, and addressing any inconsistencies in the data, the data may be normalized and otherwise pre-processed as well. The goal is to ensure high-quality, reliable data that serves as an accurate base of training data for a predictive model. Several different methods and techniques of data cleaning, filtering, pre-processing, normalization, etc., may be used.

At 3008, Data Analysis/Mapping may be performed. BrainOS principles come into play at this stage. After preprocessing, the dataset may be analyzed to interpret patterns within the data, to 'grow' the most suitable configuration. This phase mirrors how a biological brain adapts its neural connections through learning and experience. Computational algorithms may be used to identify unique data signatures and deterministic patterns. Insight may be obtained into what types of failures and faults can be predicted (such as hardware failures, software issues, or network congestion etc.).

At 3010, a High-Level Model Architecture may be designed, including the overarching model architecture and system framework according to the systems requirements identified during discovery and the results of the data analysis and mapping.

At 3012, the Critic-Selector Mechanism may be built. The Critic-Selector Mechanism is responsible for examining the input data and determining the most suitable machine learning model to apply. This is an intelligent system that can synthesize diverse information types—from raw input data to historical process data, to objective markers and more. Embodiments may include an algorithm capable of synthesizing this information and using it to select the most appropriate model for the given data.

At 3014, the Data Handling Mechanism may be built. This mechanism may handle the input data using Machine Learning pipelines. These pipelines may work in both vertical and horizontal directions, effectively distributing and preparing the data for further processing. This mechanism handles all the different kinds of data provided by an Organization.

At 3016, the Models may be trained and Transfer Learning implemented. At this point, model training and/or transfer learning may be performed. Embodiments may create, train, and test models using Organization's data. Further, Embodiments may employ transfer learning—that is, the ability to use knowledge from previous tasks to inform and improve performance on related tasks.

At 3018, the World Knowledge and History Databases may be built. Embodiments may map the architecture and structure of the databases in further detail. Embodiments may logically partition and classify the data into 'world knowledge' and 'BrainOS history' containers. Using information gathered in the discovery stage, all the different types of data that might be encountered may be identified and how the system will automatically clean, filter, process, categorize and store them effectively may be determined. After the database structure is completed, indexing and retrieval may provide intelligently access stored knowledge when needed. Embodiments may involve tagging the stored data with relevant metadata to create a robust retrieval engine capable of automatically extracting information from the databases as needed.

At 3020, the Planner Component may be built. The decision and determination factors may be identified and, using the information gathered during discovery tasks, data analysis and mapping, and work done in processes 3012, 3014, 3016, and 3018, a set of rules and guidelines may be created that will help the system choose the most suitable learning model. This involves an process that takes into account the specific system requirements, data input, as well as the system's history of model usage. An adaptive decision-making framework that adjusts its decisions based on the outcomes of past ones may also be built.

At 3022, the Parallel Executor may be built. This component involves code capable of initiating and managing parallel threads and task partitioning processes that divide tasks into manageable, parallelizable parts. The tasks may be assigned in a manner that optimizes overall system performance. High-demand data tasks are considered to ensure the capability of managing a high volume of parallel tasks without compromising on performance or accuracy.

At 3024, the Module Scheduler may be built. This component involves a task-scheduling algorithm that optimally allocates system resources. Factors may include the dependencies and priorities of different tasks to provide a scheduler that maximizes throughput while minimizing idle time. Embodiments may include a scheduler that is adept at handling telecommunication specific tasks, which may require specific ordering or resource allocation strategies.

At 3026, the Selector Component may be built. Embodiments may include a selection process that can perform several tasks as needed, such as to comb through BrainOS history for suitable models, research external knowledge bases, combine models, and tune models, etc. Each of these may require specific processes in our selector component. For instance, searching the BrainOS history may require a powerful search engine, while researching external sources may require API integrations with various online databases. Ensuring that the selector is tuned to specific fault criteria will mean training it on telecom-specific problems and solution databases. Different specialized Domain Specific Instances of the selector may be optimized for a specific domain knowledge or problem context. For instance, for classification purposes, Support Vector Machine (SVM), K-means clustering, Artificial Neural Networks (ANN) and others may be employed. For time-dependent problems, recurrent architectures, such as recurrent neural networks (RNNs) may be used. For feature engineering problems, independent component analysis (ICA), independent component analysis (PCA), autoencoders (AEs), matrix factorization, and various forms of clustering may be used. For optimization tasks, evolutionary computation, global optimization, naive optimization and other similar techniques may be used.

At 3028, the Orchestrator Component may be built. Embodiments may include a management layer that oversees all other components. The Orchestrator component may be aware of the state of all the other components and make decisions accordingly. It may interface with each component—the input data, the process history, the objective framework and the situational context—and bring all this information together in order to select the most suitable machine learning model for each problem.

At 3030, Evaluation of the system may be performed, for example by Initializing a Test Run: Once the BrainOS model is fully developed, test data provided by the Organization may be prepared. This may involve ensuring that the data is correctly formatted and is compatible with the BrainOS system, but ideally the system will be able to use raw test data. If necessary, the data may be preprocessed and cleaned to eliminate any potential issues that could affect the test results.

At the First Test Iteration the BrainOS system may be fed test data and allowed to execute its processes. These include the Critic-Selector Mechanism, Data handling using Machine Learning pipelines, Model training, and/or transfer learning and producing a final output. This output will be compared to the desired outcomes to assess the accuracy of the BrainOS model.

Analyze Initial Results: The initial output of the model may provide a good sense of how well the system is functioning. The accuracy rate of predictions 24 hours in advance may be specifically evaluated against a threshold, such as 95%, set by the Organization.

Identify Improvements: If the initial accuracy does not meet the required threshold, the model's functions may be examined to identify areas of improvement within each component. This may include tweaking the parameters of the machine learning algorithms, refining the data preprocessing steps, or adjusting the method of how the Selector component chooses the models.

Make Necessary Adjustments: Based on the identified areas of improvement, the BrainOS system may be adjusted as needed. The system may self-learn and adapt. However, for larger, structural changes, modifications may be necessary.

Iterative Testing and Tuning: Once the initial adjustments have been made, another test run may be performed. This process of testing, adjusting, and retesting will continue in an iterative cycle until the model's accuracy meets the threshold. Throughout this process, the system's performance may be continuously monitored and documented to ensure stability and consistency.

Detailed Performance Analysis: Upon reaching the desired accuracy level, a detailed performance analysis may be performed to understand the model's strengths and potential weaknesses. This involves looking at various metrics in addition to accuracy, such as precision, recall, and F1 score. This will provide a more holistic view of the model's performance in preparation for deployment.

Validate Results: After the model reaches the desired threshold accuracy in a 24 hour timeframe, results may be validated with multiple tests and data to ensure consistency. This will demonstrate that the system can reach the target accurately, consistently and reliably.

Document Process and Results: comprehensive documentation may be created outlining the approach, modifications made, as well as the results achieved. This documentation will allow the Organization to fully understand the process and results. It will also serve as a foundation for their decision-making regarding the full-scale integration of BrainOS.

Final Proof of Concept Demonstration: Finally, upon ensuring that the BrainOS system meets the accuracy threshold reliably, the findings, performance metrics, and documentation may be presented to the Organization with a real time demonstration of the system.

At 3032, the operational system may be deployed. During deployed operation, the system may detect a predict faults in the operation of the telecommunication system. Further, the system may automatically correct at least some of the detected faults, automatically prevent occurrence of at least some of the predicted faults, and alert network operators to at least those detected and predicted faults that cannot be automatically corrected or prevented. All detected and predicted faults may be logged, and all detected and predicted faults may be alerted if desired.

Figure 22:
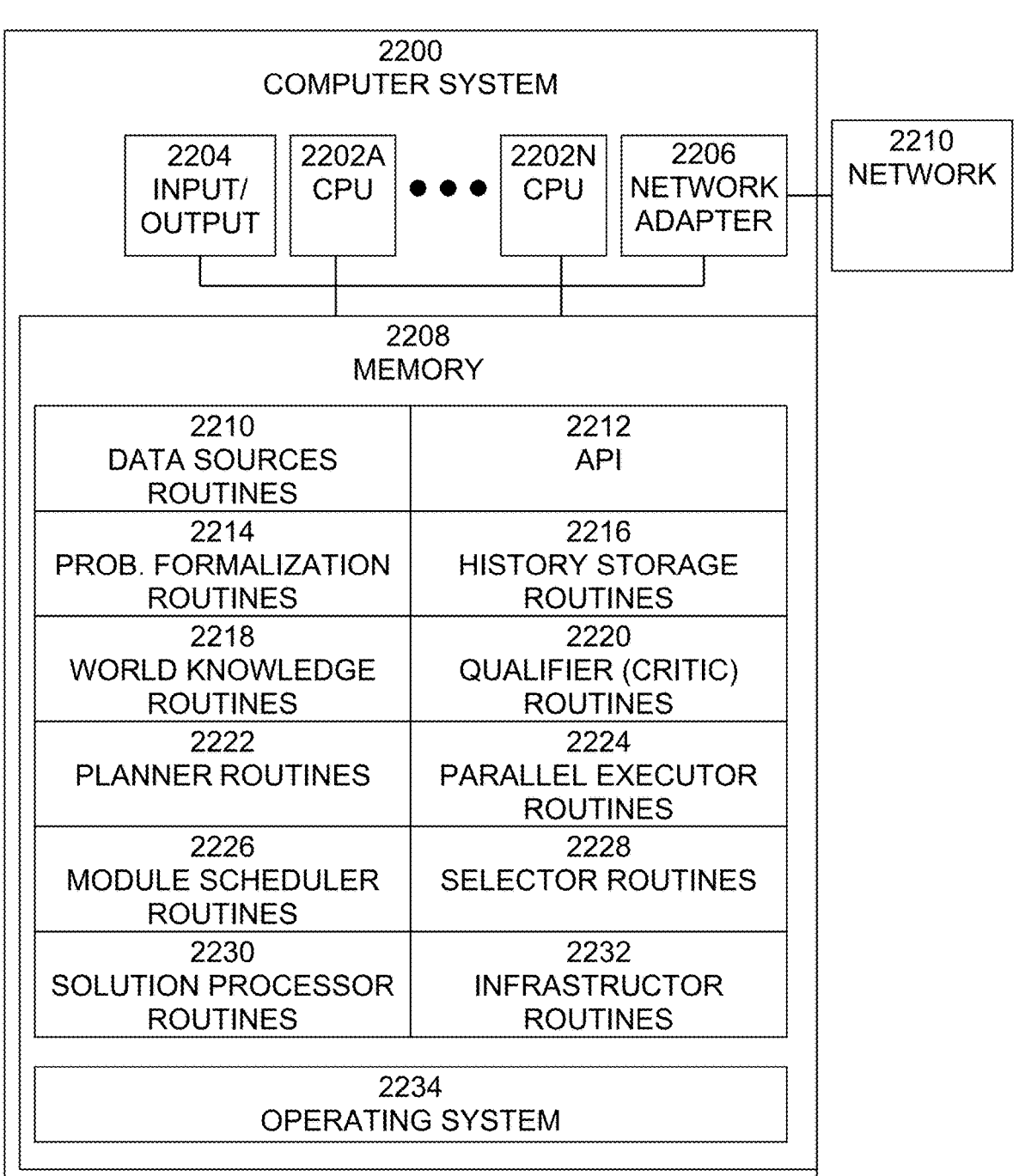
FIG. 22 is an exemplary block diagram of a computer system, in which processes involved in the embodiments described herein may be implemented.

An exemplary block diagram of a computer system 2200, in which processes involved in the embodiments described herein may be implemented, is shown in FIG. 22. Computer system 2200 may be implemented using one or more programmed general-purpose computer systems, such as embedded processors, systems on a chip, personal computers, workstations, server systems, and minicomputers or mainframe computers, or in distributed, networked computing environments. Computer system 2200 may include one or more processors (CPUs) 2202A-2202N, input/output circuitry 2204, network adapter 2206, and memory 2208. CPUs 2202A-2202N execute program instructions in order to carry out the functions of the present communications systems and methods. Typically, CPUs 2202A-2202N are one or more microprocessors, such as an INTEL CORE® processor. FIG. 22 illustrates an embodiment in which computer system 2200 is implemented as a single multiprocessor computer system, in which multiple processors 2202A-2202N share system resources, such as memory 2208, input/output circuitry 2204, and network adapter 2206. However, the present communications systems and methods also include embodiments in which computer system 2200 is implemented as a plurality of networked computer systems, which may be single-processor computer systems, multi-processor computer systems, or a mix thereof.

Input/output circuitry 2204 provides the capability to input data to, or output data from, computer system 2200. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 2206 interfaces device 2200 with a network 2210. Network 2210 may be any public or proprietary LAN or WAN, including, but not limited to the Internet.

Memory 2208 stores program instructions that are executed by, and data that are used and processed by, CPU 2202 to perform the functions of computer system 2200. Memory 2208 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 2208 may vary depending upon the function that computer system 2200 is programmed to perform. In the example shown in FIG. 22, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations.

The present communications systems and methods may include any and all such arrangements.

In the example shown in FIG. 22, memory 2208 may include Data Sources routines 2210, API 2212, Problem Formalization routines 2214, History Storage routines 2216, World Knowledge routines 2218, Qualifier (Critic) routines 2220, Planner routines 2222, Parallel Executor routines 2224, Module Scheduler routines 2226, Selector routines 2228, Solution Processor routines 2230, Infrastructor routines 2232, and operating system 2234. Data Sources routines 2210 may include software to perform the functions of Data Sources component 402, as described above. API 2212 may include software to perform the functions of API 414, as described above. Problem Formalization routines 2214 may include software to perform the functions of Problem Formalization component 416, as described above. History Storage routines 2216 may include software to perform the functions of History Storage component 424, as described above. World Knowledge routines 2218 may include software to perform the functions of World Knowledge component 430, as described above. Qualifier (Critic) routines 2220 may include software to perform the functions of Qualifier (Critic) component 440, as described above. Planner routines 2222 may include software to perform the functions of Planner component 446, as described above. Parallel Executor routines 2224 may include software to perform the functions of Parallel Executor component 448, as described above. Module Scheduler routines 2226 may include software to perform the functions of Module Scheduler component 454, as described above. Selector routines 2228 may include software to perform the functions of Selector component 452, as described above. Solution Processor routines 2230 may include software to perform the functions of Solution Processor component 456, as described above. Infrastructor routines 2232 may include software to perform the functions of Infrastructor component 475, as described above. Other operating system routines 2222 may provide additional system functionality.

As shown in FIG. 22, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented in a computer system comprising a processor, memory accessible by the processor, and computer program instructions stored in the memory and executable by the processor, the computer system interconnected with a telecommunications system, the method comprising:

receiving, at the computer system, data relating to operation of the telecommunication system;

determining, at the computer system, one or more types of failures and/or faults that the computer system is operable to predict based on the data relating to the operation of the telecommunication system;

selecting, at the computer system, at least one machine learning model trained to detect and predict faults in the operation of the telecommunications system based on a combination of the data relating to the operation of the telecommunication system, processes history, and objectives;

obtaining, at the computer system, the at least one machine learning model;

selecting, at the computer system, computing infrastructure upon which to execute the at least one machine learning model, wherein the selected computing infrastructure comprises a mesh of interconnected micro-applications;

executing, at the computer system, the at least one machine learning model using the selected computing infrastructure to detect and predict faults in the operation of the telecommunication system; and generating at least one alert for at least one of the detected and/or predicted faults.

2. The method of claim 1, further comprising automatically preventing at least some of the predicted faults.

3. The method of claim 2, wherein the data relating to operation of the telecommunications system comprises at least one of data from sensors, data from devices, data from servers, data from robots, and data from humans.

4. The method of claim 3, wherein the at least one machine learning model is obtained by generating, at the computer system, a new model based on type, morphology, and parameter information.

5. The method of claim 3, wherein the at least one machine learning model is further obtained by:

determining, at the computer system, a combination of the selected and generated models that produces higher accuracy results than the selected and generated models; and assembling, at the computer system, a combination of the selected and generated models based on the determination of the combination of the selected and generated models that produces higher accuracy results than the selected and generated models.

6. The method of claim 5, wherein the combination of the selected and generated models that produces higher accuracy results than the selected and generated models may be determined by selected and trained heuristics or by a machine learning model.

7. A telecommunication system comprising a computer system comprising a processor, memory accessible by the processor, and computer program instructions stored in the memory and executable by the processor to perform:

receiving, at the computer system, data relating to operation of the telecommunication system;

determining, at the computer system, one or more types of failures and/or faults that the computer system is operable to predict based on the data relating to the operation of the telecommunication system;

selecting, at the computer system, at least one machine learning model trained to detect and predict faults in the operation of the telecommunications system based on a combination of the data relating to the operation of the telecommunication system, processes history, and objectives;

obtaining, at the computer system, the at least one machine learning model;

selecting, at the computer system, computing infrastructure upon which to execute the at least one machine learning model, wherein the selected computing infrastructure comprises a mesh of interconnected micro-applications;

executing, at the computer system, the at least one machine learning model using the selected computing infrastructure to detect and predict faults in the operation of the telecommunication system; and generating at least one alert for at least one of the detected and/or predicted faults.

8. The system of claim 7, further comprising automatically preventing at least some of the predicted faults.

9. The system of claim 8, wherein the data relating to the operation of the telecommunication system comprises at least one of data from sensors, data from devices, data from servers, data from robots, and data from humans.

10. The system of claim 9, wherein the at least one machine learning model is obtained by at least one of:

selecting at least one model from among previously used processed models stored at the computer system;

selecting at least one model from among models obtained from public sources, proprietary sources, or both; and generating a new model based on type, morphology, and parameter information.

11. The system of claim 9, wherein the at least one machine learning model is obtained by at least two of:

selecting at least one model from among previously used processed models stored at the computer system;

selecting at least one model from among models obtained from public sources, proprietary sources, or both;

generating a new model based on type, morphology, and parameter information;

determining a combination of the selected and generated models that produces higher accuracy results than the selected and generated models; and assembling a combination of the selected and generated models based on the determination of the combination of the selected and generated models that produces higher accuracy results than the selected and generated models.

12. The system of claim 11, wherein the combination of the selected and generated models that produces higher accuracy results than the selected and generated models may be determined by selected and trained heuristics or by a machine learning model.

13. A computer program product comprising a non-transitory computer readable storage medium having program instructions embodied therewith, the program instructions executable by a computer system interconnected with a telecommunications system, to cause the computer system to perform a method comprising:

receiving, at the computer system, data relating to operation of the telecommunication system;

determining, at the computer system, one or more types of failures and/or faults that the computer system is operable to predict based on the data relating to the operation of the telecommunication system;

selecting, at the computer system, at least one machine learning model trained to detect and predict faults in the operation of the telecommunications system based on a combination of the data relating to the operation of the telecommunication system, processes history, and objectives;

obtaining, at the computer system, the at least one machine learning model;

selecting, at the computer system, computing infrastructure upon which to execute the at least one machine learning model, wherein the selected computing infrastructure comprises a mesh of interconnected micro-applications;

executing, at the computer system, the at least one machine learning model using the selected computing infrastructure to detect and predict faults in the operation of the telecommunication system; and generating at least one alert for at least one of the detected and/or predicted faults.

14. The computer program product of claim 13, further comprising automatically preventing at least some of the predicted faults.

15. The computer program product of claim 14, wherein the data relating to the operation of the telecommunication system comprises at least one of data from sensors, data from devices, data from servers, data from robots, and data from humans.

16. The computer program product of claim 15, wherein the at least one machine learning model is obtained by at least one of:

selecting, at the computer system, at least one model from among previously used processed models stored at the computer system;

selecting, at the computer system, at least one model from among models obtained from public sources, proprietary sources, or both; and generating, at the computer system, a new model based on type, morphology, and parameter information.

17. The computer program product of claim 15, wherein the at least one machine learning model is obtained by at least two of:

selecting, at the computer system, at least one model from among previously used processed models stored at the computer system;

selecting, at the computer system, at least one model from among models obtained from public sources, proprietary sources, or both;

generating, at the computer system, a new model based on type, morphology, and parameter information;

determining, at the computer system, a combination of the selected and generated models that produces higher accuracy results than the selected and generated models; and assembling, at the computer system, a combination of the selected and generated models based on the determination of the combination of the selected and generated models that produces higher accuracy results than the selected and generated models.

18. The computer program product of claim 17, wherein the combination of the selected and generated models that produces higher accuracy results than the selected and generated models may be determined by selected and trained heuristics or by a machine learning model.

\* \* \* \* \*